(12) United States Patent
Taniguchi et al.

(10) Patent No.: US 9,465,772 B2
(45) Date of Patent: Oct. 11, 2016

(54) CALCULATING DEVICE, CALCULATING SYSTEM, AND COMPUTER PRODUCT

(71) Applicant: FUJITSU LIMITED, Kawasaki-shi, Kanagawa (JP)

(72) Inventors: Tsuyoshi Taniguchi, Kawasaki (JP); Yoshio Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 402 days.

(21) Appl. No.: 14/219,470

(22) Filed: Mar. 19, 2014

(65) Prior Publication Data

US 2014/0207837 A1    Jul. 24, 2014

Related U.S. Application Data

(63) Continuation of application No. PCT/JP2011/071407, filed on Sep. 20, 2011.

(51) Int. Cl.
    *G06F 7/00*      (2006.01)
    *G06F 17/10*     (2006.01)
    *G06N 5/02*      (2006.01)

(52) U.S. Cl.
    CPC ............ *G06F 17/10* (2013.01); *G06N 5/02* (2013.01)

(58) Field of Classification Search
    CPC ............................. G06F 17/10; G06N 5/02
    USPC ................................................ 708/207
    See application file for complete search history.

(56) References Cited

U.S. PATENT DOCUMENTS

| 5,398,299 A | 3/1995 | Ota et al. |
| 2005/0192865 A1* | 9/2005 | Boutilier ............ G06Q 30/0275 705/14.71 |

FOREIGN PATENT DOCUMENTS

JP    2633161    7/1997

OTHER PUBLICATIONS

PCT International Preliminary Report on Patentability mailed Apr. 3, 2014 in corresponding International Application No. PCT/JP2011/071407.
Japanese Office Action dated Jun. 30, 2015 in corresponding Japanese Patent Application No. 2013-534497.
Shibahara et al. "Improvement and Estimate of MTD-f", Information Processing Society Research Report, Japan, Information Processing Society, Aug. 4, 2003, vol. 2003, No. 79, 10 pages.
Japanese Office Action dated Mar. 29, 2016 in corresponding Japanese Patent Application No. 2013-534497.
"Programming in Haskell : Playing Tic-Tac-Toe with a Game Tree", by Onoue, IPSJ Magazine vol. 46 No. 12 Dec. 2005, pp. 1403-1410, Partial Translation: From p. 1409, Fig. 2 and line 1 to line 21.
"Introduction of Computerized Japanese Game 'Go'",by Sei et al., Kyoritsu Shuppan Co., Ltd., 2005, pp. 149-156, Partial Translation: From p. 153, line 20 to p. 156, line 31 and Fig.A.2.

* cited by examiner

*Primary Examiner* — Tan V. Mai
(74) *Attorney, Agent, or Firm* — Staas & Halsey LLP

(57) ABSTRACT

A calculating device selects an action and a corresponding state; acquires an evaluation value by evaluating the combination of the selected action and the selected state; identifies for each selected action, a lowest evaluation value among acquired evaluation values; determines the lowest evaluation value among evaluation values of all the states selected for each action as a minimax candidate, and determines, as a minimax, an evaluation value that is highest among the lowest evaluation values corresponding to the actions; each time an evaluation value is acquired for a combination of a state and an action after the minimax candidate is determined, compares the acquired evaluation value and the minimax candidate, and terminates selection of a state corresponding to the action when the evaluation value is lower than the minimax candidate and selects an unselected action from the action set; and outputs an action corresponding to the determined minimax.

6 Claims, 52 Drawing Sheets

| UNIT (100kW) | | ACTION (E.G., STORAGE BATTERY OPERATION PLAN) | | | | |
|---|---|---|---|---|---|---|
| | | B1 | B2 | B3 | B4 | |
| STATE (E.G., SUPPLY-DEMAND STATUS) | A1 | 4 | 10 | 7 | 5 | |
| | A2 | 3 | 7 | 8 | 6 | |
| | A3 | 2 | 8 | 7 | 3 | |
| | A4 | 3 | 9 | 9 | 2 | |
| MAXIMUM EVALUATION VALUE | | 4 | 10 | 9 | 6 | |
| MINIMAX | | ○ | × | × | × | |

(B)

| UNIT (100kW) | | ACTION (E.G., STORAGE BATTERY OPERATION PLAN) | | | | |
|---|---|---|---|---|---|---|
| | | B1 | B2 | B3 | B4 | |
| STATE (E.G., SUPPLY-DEMAND STATUS) | A1 | 4 | 10 | 7 | 5 | |
| | A2 | 3 | | | | |
| | A3 | 2 | OMITTED | OMITTED | OMITTED | |
| | A4 | 3 | | | | |
| MAXIMUM EVALUATION VALUE CANDIDATE | | - | 10 | 9 | 6 | |
| MAXIMUM EVALUATION VALUE | | 4 | - | - | - | |
| MINIMAX | | ○ | × | × | × | |

FIG.2

| | | ACTION | | | | |
|---|---|---|---|---|---|---|
| | | B1 | ... | Bj | ... | Bm |
| STATE | A1 | C11 | ... | C1j | ... | C1m |
| | : | : | : | : | : | : |
| | Ai | Ci1 | ... | Cij | ... | Cim |
| | : | : | : | : | : | : |
| | An | Cn1 | ... | Cnj | ... | Cnm |
| MAXIMUM EVALUATION VALUE CANDIDATE VCjmax | | | | | | |
| MAXIMUM EVALUATION VALUE Vjmax | | | | | | |
| MINIMAX | | | | | | |

| STATE | | ACTION | | | |
|---|---|---|---|---|---|
| | | B1 | B2 | B3 | B4 |
| | A1 | 4 | | | |
| | A2 | 3 | | | |
| | A3 | 2 | | | |
| | A4 | 3 | | | |
| MAXIMUM EVALUATION VALUE CANDIDATE VCjmax | | - | | | |
| MAXIMUM EVALUATION VALUE Vjmax | | 4 | | | |
| MINIMAX | | △ | | | |

MINIMAX CANDIDATE (B)

| STATE | | ACTION | | | |
|---|---|---|---|---|---|
| | | B1 | B2 | B3 | B4 |
| | A1 | 4 | 10 | | |
| | A2 | 3 | | | |
| | A3 | 2 | | | |
| | A4 | 3 | | | |
| MAXIMUM EVALUATION VALUE CANDIDATE VCjmax | | - | | | |
| MAXIMUM EVALUATION VALUE Vjmax | | 4 | | | |
| MINIMAX | | △ | | | |

COMPARE (C)

| STATE | | ACTION | | | |
|---|---|---|---|---|---|
| | | B1 | B2 | B3 | B4 |
| | A1 | 4 | 10 | | |
| | A2 | 3 | | | |
| | A3 | 2 | OMITTED | | |
| | A4 | 3 | | | |
| MAXIMUM EVALUATION VALUE CANDIDATE VCjmax | | - | 10 | | |
| MAXIMUM EVALUATION VALUE Vjmax | | 4 | - | | |
| MINIMAX | | △ | × | | |

OMIT BECAUSE MAXIMUM VALUE OF B2≥10 (LARGER THAN MINIMAX CANDIDATE)

(D)

| STATE | | ACTION | | | |
|---|---|---|---|---|---|
| | | B1 | B2 | B3 | B4 |
| | A1 | 4 | 10 | 7 | |
| | A2 | 3 | | | |
| | A3 | 2 | OMITTED | | |
| | A4 | 3 | | | |
| MAXIMUM EVALUATION VALUE CANDIDATE VCjmax | | - | 10 | | |
| MAXIMUM EVALUATION VALUE Vjmax | | 4 | - | | |
| MINIMAX | | △ | × | | |

COMPARE (E)

| STATE | | ACTION | | | |
|---|---|---|---|---|---|
| | | B1 | B2 | B3 | B4 |
| | A1 | 4 | 10 | 7 | |
| | A2 | 3 | | | |
| | A3 | 2 | OMITTED | OMITTED | |
| | A4 | 3 | | | |
| MAXIMUM EVALUATION VALUE CANDIDATE VCjmax | | - | 10 | 7 | |
| MAXIMUM EVALUATION VALUE Vjmax | | 4 | - | - | |
| MINIMAX | | △ | × | × | |

OMIT BECAUSE MAXIMUM VALUE OF B3≥7 (LARGER THAN MINIMAX CANDIDATE)

(F)

| STATE | | ACTION | | | |
|---|---|---|---|---|---|
| | | B1 | B2 | B3 | B4 |
| | A1 | 4 | 10 | 7 | 5 |
| | A2 | 3 | | | |
| | A3 | 2 | OMITTED | OMITTED | OMITTED |
| | A4 | 3 | | | |
| MAXIMUM EVALUATION VALUE CANDIDATE VCjmax | | - | 10 | 7 | 5 |
| MAXIMUM EVALUATION VALUE Vjmax | | 4 | - | - | - |
| MINIMAX | | ○ | × | × | × |

OMIT BECAUSE MAXIMUM VALUE OF B4≥5 (LARGER THAN MINIMAX CANDIDATE)

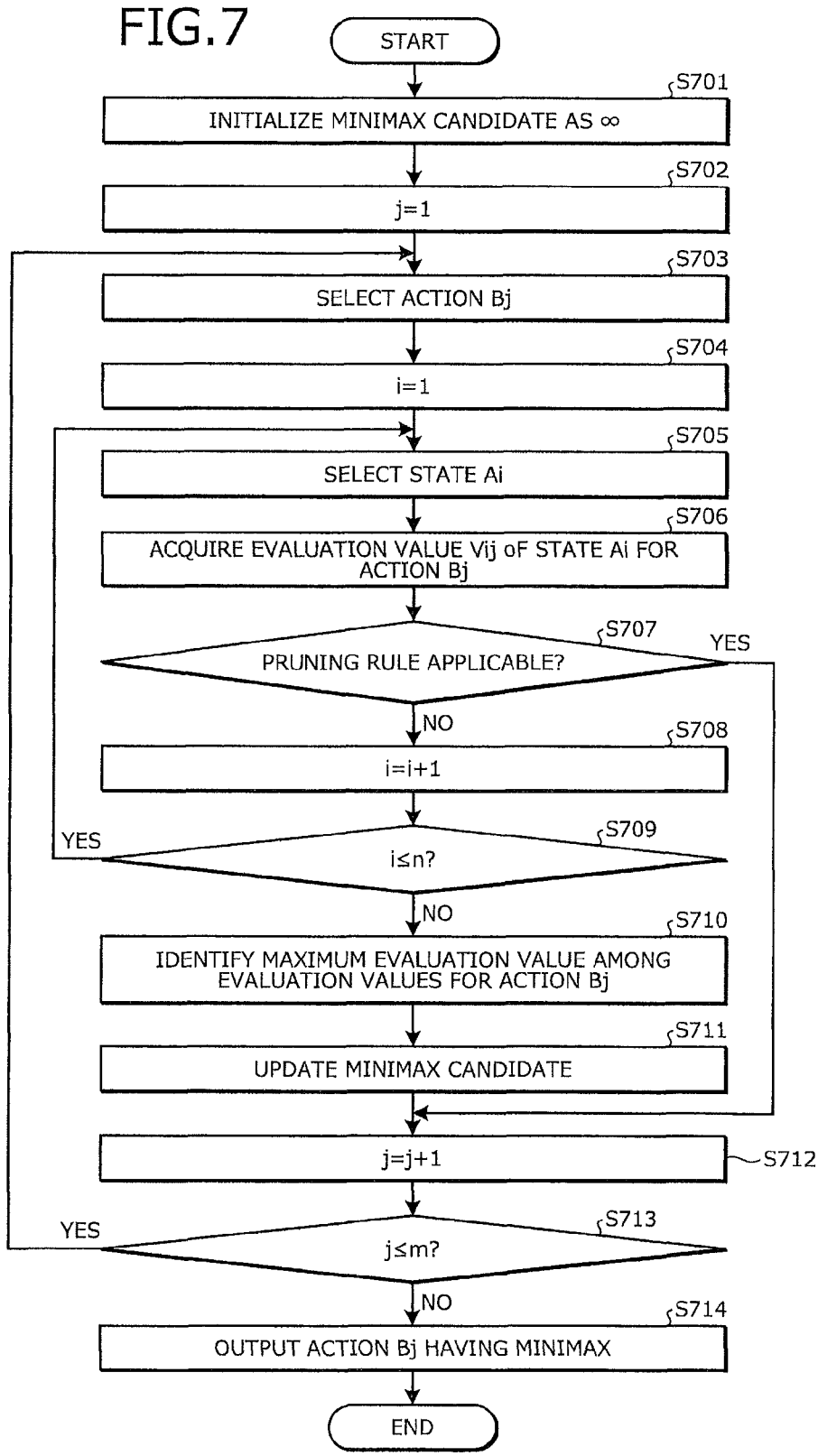

| STATE | | ACTION | | | | T |
|---|---|---|---|---|---|---|
| | | B1 | B2 | B3 | B4 | |
| | A1 | 6 | | | | |
| | A2 | 8 | | | | |
| | A3 | 11 | | | | |
| | A4 | 13 | | | | |
| MAXIMUM EVALUATION VALUE CANDIDATE VCjmax | | - | | | | |
| MAXIMUM EVALUATION VALUE Vjmax | | 13 | | | | |
| MINIMAX | | △ | | | | |

(B)

| STATE | | ACTION | | | | T |
|---|---|---|---|---|---|---|
| | | B1 | B2 | B3 | B4 | |
| | A1 | 6 | 10 | | | |
| | A2 | 8 | 7 | | | |
| | A3 | 11 | 8 | | | |
| | A4 | 13 | 9 | | | |
| MAXIMUM EVALUATION VALUE CANDIDATE VCjmax | | - | - | | | |
| MAXIMUM EVALUATION VALUE Vjmax | | 13 | 10 | | | |
| MINIMAX | | × | △ | | | |

(C)

| STATE | | ACTION | | | | T |
|---|---|---|---|---|---|---|
| | | B1 | B2 | B3 | B4 | |
| | A1 | 6 | 10 | 2 | | |
| | A2 | 8 | 7 | 3 | | |
| | A3 | 11 | 8 | 4 | | |
| | A4 | 13 | 9 | 3 | | |
| MAXIMUM EVALUATION VALUE CANDIDATE VCjmax | | - | - | - | | |
| MAXIMUM EVALUATION VALUE Vjmax | | 13 | 10 | 4 | | |
| MINIMAX | | × | × | △ | | |

(D)

| STATE | | ACTION | | | | T |
|---|---|---|---|---|---|---|
| | | B1 | B2 | B3 | B4 | |
| | A1 | 6 | 10 | 2 | 5 | |
| | A2 | 8 | 7 | 3 | OMITTED | |
| | A3 | 11 | 8 | 4 | OMITTED | |
| | A4 | 13 | 9 | 3 | | |
| MAXIMUM EVALUATION VALUE CANDIDATE VCjmax | | - | - | - | 5 | |
| MAXIMUM EVALUATION VALUE Vjmax | | 13 | 10 | 4 | - | |
| MINIMAX | | × | × | ○ | × | |

OMIT BECAUSE MAXIMUM VALUE OF B4≥5 (LARGER THAN MINIMAX CANDIDATE)

SINCE MINIMAX CANDIDATE (=4) APPEARS IN FINAL PHASE FOR B3, PRUNING IS PERFORMED ONLY FOR B4

(A)

| | ACTION | | | |
|---|---|---|---|---|
| | B1 | B2 | B3 | B4 |
| INDEX i OF EVALUATED STATE | 1 | 1 | 1 | 1 |
| MAXIMUM EVALUATION VALUE CANDIDATE VCjmax | 6 | 10 | 2 | 5 |

(B)

| | ACTION | | | |
|---|---|---|---|---|
| | B1 | B2 | B3 | B4 |
| INDEX i OF EVALUATED STATE | 1 | 1 | 2 | 1 |
| MAXIMUM EVALUATION VALUE CANDIDATE VCjmax | 6 | 10 | 4 | 5 |

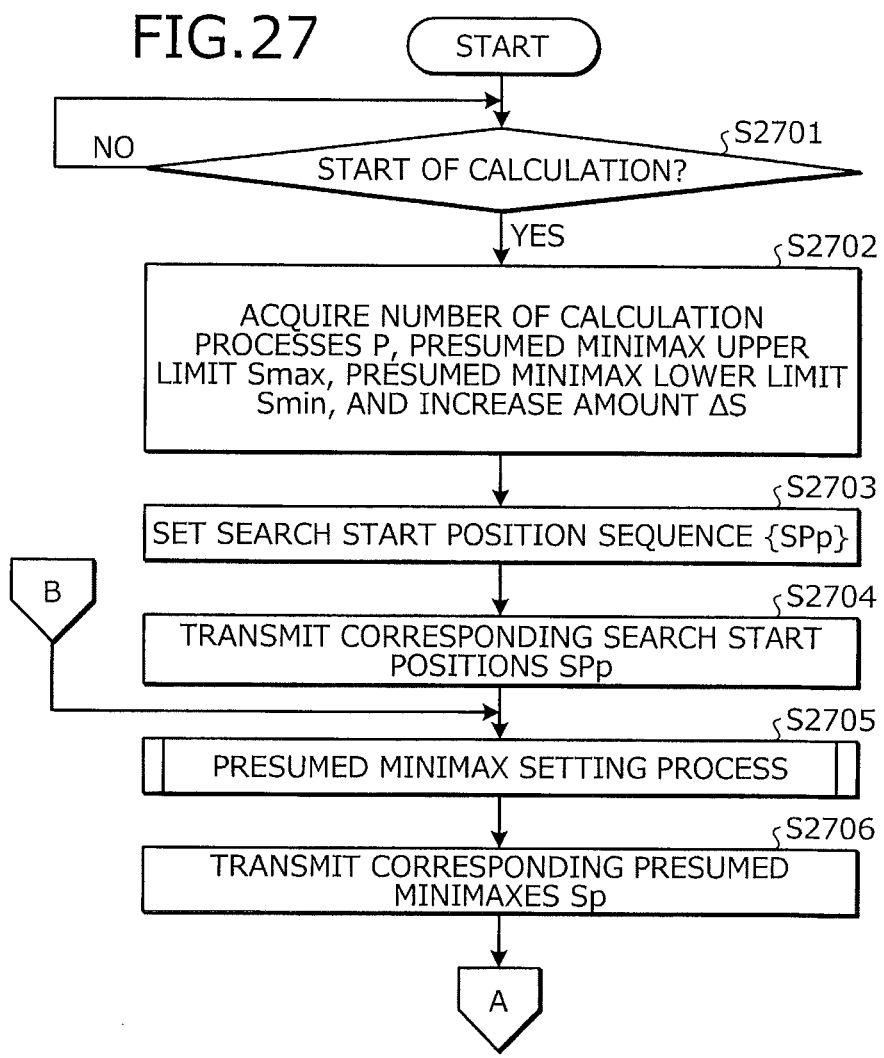

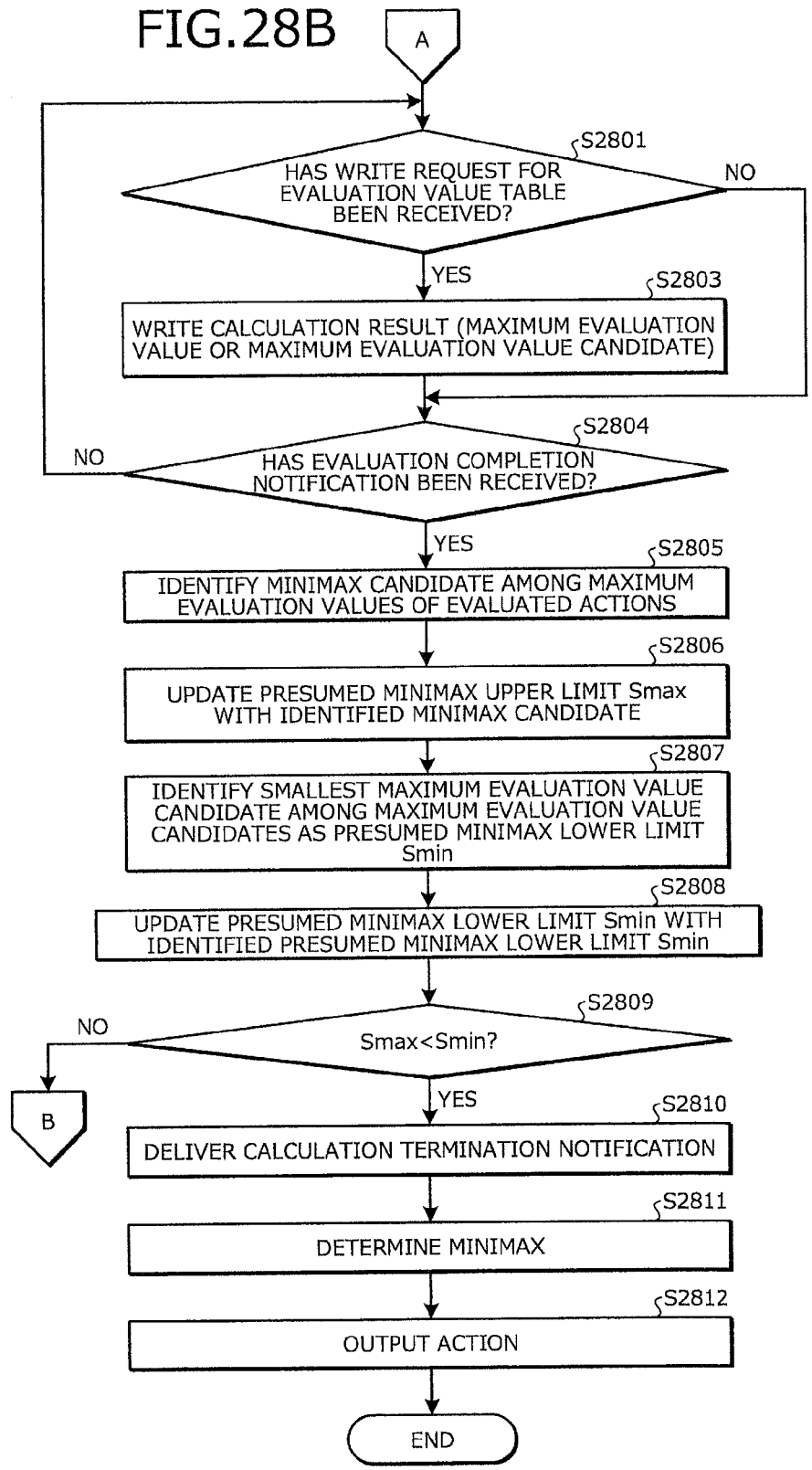

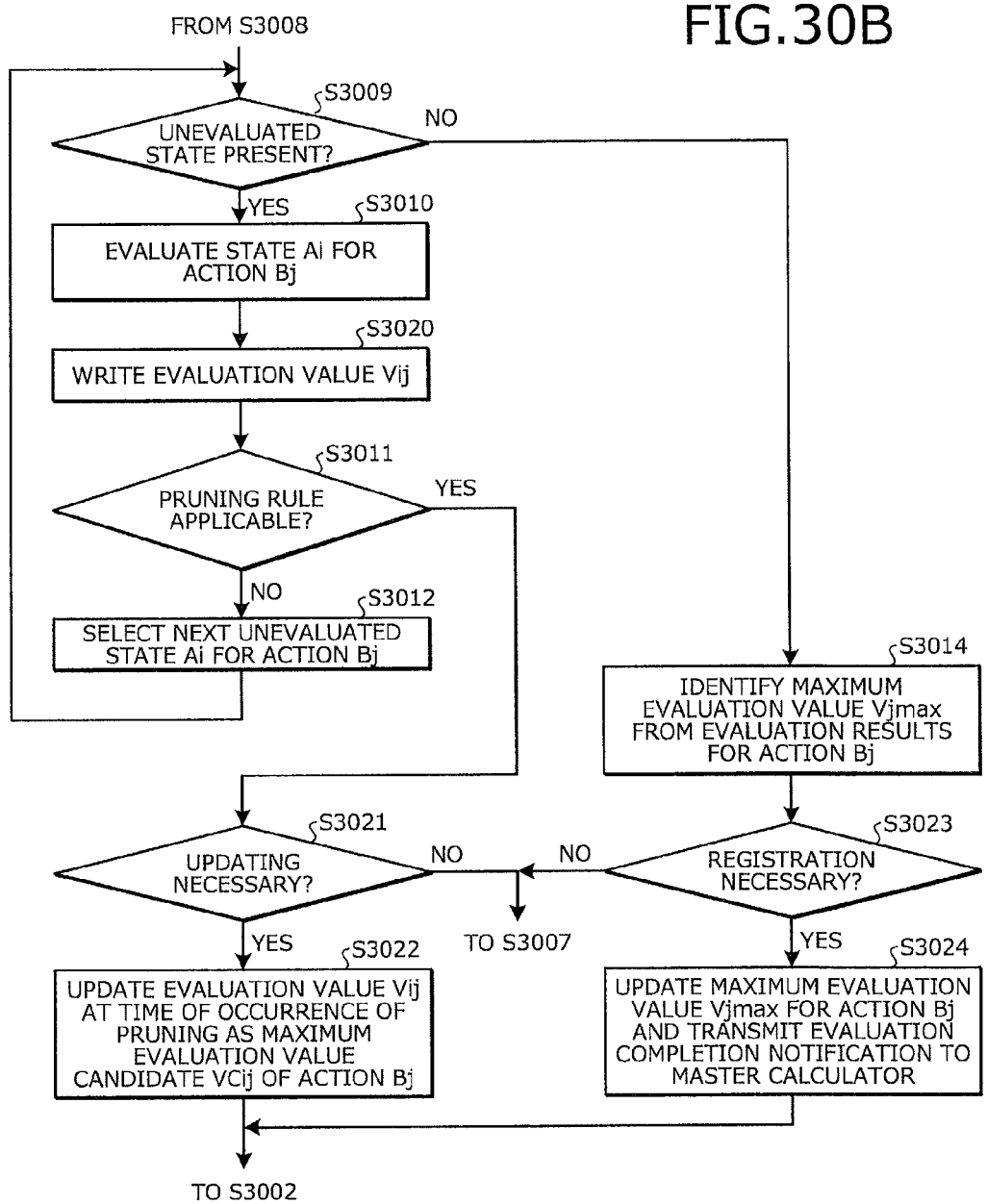

| | SUNLIGHT DURATION BEFORE VARIATION | | | |
|---|---|---|---|---|
| | 0.0 | 0.1-0.5 | 0.6-0.9 | 1.0 |
| 0.0 | 0.86 | 0.45 | 0.13 | 0.00 |
| 0.1 | 0.09 | 0.15 | 0.04 | 0.00 |
| 0.2 | 0.01 | 0.00 | 0.04 | 0.00 |
| 0.3 | 0.00 | 0.07 | 0.00 | 0.03 |
| 0.4 | 0.01 | 0.00 | 0.13 | 0.01 |
| 0.5 | 0.01 | 0.11 | 0.04 | 0.01 |
| 0.6 | 0.00 | 0.00 | 0.13 | 0.01 |
| 0.7 | 0.00 | 0.04 | 0.04 | 0.03 |
| 0.8 | 0.01 | 0.07 | 0.04 | 0.04 |
| 0.9 | 0.01 | 0.04 | 0.08 | 0.08 |
| 1.0 | 0.00 | 0.07 | 0.33 | 0.79 |

(row labels: SUNLIGHT DURATION AFTER VARIATION)

| SUPPLY-DEMAND SCENARIO | EVALUATION VALUE FROM OPTIMUM OPERATION PLAN [kW] | OPTIMUM CONTROL PARAMETER [kW] |
|---|---|---|
| 1 | 36 | 278 |
| 2 | 106 | 314 |
| ⋮ | ⋮ | ⋮ |
| M×N | 78 | 236 |

3116

| INITIAL OPERATION PLAN | CONTROL PARAMETER [kW] |
|---|---|
| 1 | 50 |
| 2 | 60 |
| ⋮ | ⋮ |
| P | 150 |

| INITIAL OPERATION PLAN | SUPPLY-DEMAND SCENARIO | EVALUATION VALUE OF OPTIMUM CORRECTED OPERATION PLAN FOR INITIAL OPERATION PLAN Q [kW] |
|---|---|---|
| 1 | 1 | 34 |
| | 2 | 42 |
| | ⋮ | ⋮ |
| | M×N | 66 |
| 2 | 1 | 0 |
| | 2 | 84 |
| | ⋮ | ⋮ |
| | M×N | 22 |
| ⋮ | ⋮ | ⋮ |
| P | 1 | 22 |
| | 2 | 0 |
| | ⋮ | ⋮ |
| | M×N | 54 |

FIG.38  3119

| INITIAL OPERATION PLAN | SUPPLY-DEMAND SCENARIO | RESPONSE CAPABILITY EVALUATION FOR INITIAL OPERATION PLAN Q [kW] |
|---|---|---|
| 1 | 1 | 2 |
| | 2 | 64 |
| | ⋮ | ⋮ |
| | M×N | 12 |
| 2 | 1 | 36 |
| | 2 | 22 |
| | ⋮ | ⋮ |
| | M×N | 56 |
| ⋮ | ⋮ | ⋮ |
| P | 1 | 14 |
| | 2 | 106 |
| | ⋮ | ⋮ |
| | M×N | 24 |

| SUPPLY-DEMAND SCENARIO | EVALUATION VALUE FROM OPTIMUM OPERATION PLAN [kg-CO2] | OPTIMUM CONTROL PARAMETER [kW] |
|---|---|---|
| 1 | 17 | 278 |
| 2 | 48 | 314 |
| ⋮ | ⋮ | ⋮ |
| M×N | 32 | 236 |

| INITIAL OPERATION PLAN | SUPPLY-DEMAND SCENARIO | EVALUATION VALUE OF OPTIMUM CORRECTED OPERATION PLAN FOR INITIAL OPERATION PLAN Q [kg-$CO_2$] |
|---|---|---|
| 1 | 1 | 16 |
| | 2 | 18 |
| | ⋮ | ⋮ |
| | M×N | 30 |
| 2 | 1 | 0 |
| | 2 | 34 |
| | ⋮ | ⋮ |
| | M×N | 10 |
| ⋮ | ⋮ | ⋮ |
| Q | 1 | 10 |
| | 2 | 0 |
| | ⋮ | ⋮ |
| | M×N | 24 |

| INITIAL OPERATION PLAN | SUPPLY-DEMAND SCENARIO | RESPONSE CAPABILITY EVALUATION FOR INITIAL OPERATION PLAN Q [kg-$CO_2$] |
|---|---|---|
| 1 | 1 | 1 |
| | 2 | 30 |
| | ⋮ | ⋮ |
| | M×N | 2 |
| 2 | 1 | 17 |
| | 2 | 14 |
| | ⋮ | ⋮ |
| | M×N | 22 |
| ⋮ | ⋮ | ⋮ |
| Q | 1 | 7 |
| | 2 | 48 |
| | ⋮ | ⋮ |
| | M×N | 8 |

| SUPPLY-DEMAND SCENARIO | EVALUATION VALUE FROM OPTIMUM OPERATION PLAN [MILLION YEN] | OPTIMUM CONTROL PARAMETER [kW] |
|---|---|---|
| 1 | 36 | 278 |
| 2 | 106 | 314 |
| ⋮ | ⋮ | ⋮ |
| M | 78 | 236 |

| INITIAL OPERATION PLAN | SUPPLY-DEMAND SCENARIO | EVALUATION VALUE OF OPTIMUM CORRECTED OPERATION PLAN FOR INITIAL OPERATION PLAN Q [MILLION YEN] |
|---|---|---|
| 1 | 1 | 34 |
|   | 2 | 42 |
|   | ⋮ | ⋮ |
|   | M×N | 66 |
| 2 | 1 | 0 |
|   | 2 | 84 |
|   | ⋮ | ⋮ |
|   | M×N | 22 |
| ⋮ | ⋮ | ⋮ |
| Q | 1 | 22 |
|   | 2 | 0 |
|   | ⋮ | ⋮ |
|   | M×N | 54 |

| INITIAL OPERATION PLAN | SUPPLY-DEMAND SCENARIO | RESPONSE CAPABILITY EVALUATION FOR INITIAL OPERATION PLAN Q [MILLION YEN] |
|---|---|---|
| 1 | 1 | 2 |
| | 2 | 64 |
| | ⋮ | ⋮ |
| | M×N | 12 |
| 2 | 1 | 36 |
| | 2 | 33 |
| | ⋮ | ⋮ |
| | M×N | 56 |
| ⋮ | ⋮ | ⋮ |
| Q | 1 | 14 |
| | 2 | 106 |
| | ⋮ | ⋮ |
| | M×N | 24 |

| OPERATION PLAN ID | OPERATION MODES OF TIME PERIODS ||||| 
|---|---|---|---|---|---|
| | 0-6 | 6-10 | 10-14 | 14-18 | 18-24 |
| 1 | 1 | 1 | 4 | 4 | 1 |
| 2 | 1 | 4 | 4 | 4 | 1 |
| 3 | 1 | 1 | 7 | 4 | 1 |
| 4 | 1 | 4 | 7 | 4 | 1 |
| 5 | 1 | 1 | 4 | 7 | 1 |
| 6 | 1 | 4 | 4 | 7 | 1 |
| 7 | 1 | 1 | 7 | 7 | 1 |
| 8 | 1 | 4 | 7 | 7 | 1 |
| ⋮ | ⋮ | ⋮ | ⋮ | ⋮ | ⋮ |
| P | 1 | 4 | 4 | 7 | 7 |

| MODE BEFORE SWITCHING | MODE AFTER SWITCHING | SWITCHING COST [kWh] |
|---|---|---|
| 1 | 4 | 14 |
| 4 | 7 | 15 |
| 1 | 7 | 28 |
| 7 | 4 | 5 |
| 4 | 1 | 2 |
| 7 | 1 | 5 |

FIG.60

| TIME PERIOD | OPERATION MODE CANDIDATE |
|---|---|
| 0-6 | 1 |
| 6-10 | 1, 4 |
| 10-14 | 4, 7 |
| 14-20 | 4, 7 |
| 20-24 | 1, 4, 7 |

FIG.61

COMMUNICATION DEMAND BEFORE VARIATION

| COMMUNICATION DEMAND AFTER VARIATION | 0-20 | 20-40 | 40-60 | 60-80 | 80- |
|---|---|---|---|---|---|
| N(10, 1) | 40 | 20 | 5 | 5 | 0 |
| N(30, 2) | 30 | 40 | 10 | 15 | 10 |
| N(50, 3) | 20 | 30 | 50 | 30 | 20 |
| N(70, 4) | 10 | 10 | 30 | 40 | 40 |
| N(90, 5) | 0 | 0 | 5 | 10 | 30 |

UNIT: %

FIG.62

| COMMUNI-CATION SUPPLY-DEMAND SCENARIO | EVALUATION VALUE FROM OPTIMUM OPERATION PLAN [kWh] | OPTIMUM OPERATION PLAN |
|---|---|---|
| 1 | 160 | 14 (4 4 7 4 1) |
| 2 | 157 | 16 (4 7 7 4 1) |
| ⋮ | ⋮ | ⋮ |
| M | 118 | 2 (4 4 4 1 1) |

FIG.63

| OPERATION MODE FROM 6 TO 10 O'CLOCK | COMMUNI-CATION SUPPLY-DEMAND SCENARIO | EVALUATION VALUE OF OPTIMUM CORRECTED OPERATION PLAN FOR OPERATION PLAN Q | REGRET VALUE OF OPTIMUM CORRECTED OPERATION PLAN FOR OPERATION PLAN Q |
|---|---|---|---|
| 1 | 1 | 204 | 44 |
|   | 2 | 193 | 36 |
|   | ---- | ---- | ---- |
|   | M |  | 0 |
| 4 | 1 | 160 | 0 |
|   | 2 | 157 | 0 |
|   | ---- | ---- | ---- |
|   | M | 151 | 33 |

CALCULATING DEVICE, CALCULATING SYSTEM, AND COMPUTER PRODUCT

CROSS REFERENCE TO RELATED APPLICATIONS

This application is a continuation application of International Application PCT/JP2011/071407, filed on Sep. 20, 2011 and designating the U.S., the entire contents of which are incorporated herein by reference.

FIELD

The embodiments discussed herein are related to a calculating device, a calculating system, and a computer product that search information.

BACKGROUND

A minimax calculation by a minimax (mini-MAX) method is used particularly in an action deciding problem of deciding an action to take, and is based on the minimax loss criterion in which an action minimizing the maximum loss in possible states or an action maximizing the minimum ensured benefit in possible states is decided as an action to be taken for an uncertain future state. The minimax calculation is used not only for action deciding problems based on the minimax loss criterion but also for various industrial purposes. For example, if a grade (degree of conformance to true) of each term on the left side of Fuzzy logic expressions (a set of expressions in the form of "if A and B then X") is given in relation to Fuzzy control of a home electrical appliance or a vehicle, the minimum value thereof is defined as a grade value on the right side to obtain the maximum value on the right side in a disclosed technique. For example, refer to Japanese Patent No. 2633161.

In an action deciding problem based on the minimax loss criterion, a set of maximum evaluation values V1max, . . . Vjmax, . . . Vmmax, each of which corresponds a maximum value among the evaluation values indicating losses when taking a specific action Bj in possible states A1 to An, should be obtained for each action Bj among actions B1 to Bm in order to determine the action that minimizes that maximum evaluation value. Accordingly, m×n evaluation values must be obtained.

However, even if the conventional technique described above is applied, m×n evaluation values must be obtained in the action deciding problem, causing a problem that a large amount of time is required for finding a solution to the action deciding problem.

SUMMARY

According to an aspect of an embodiment, a calculating device includes a memory apparatus that stores an action set including a plurality of actions and a state set including a plurality of states corresponding to the actions included in the action set; and a processor configured to select an action from the action set and select from the state set, a state that corresponds to the selected action; acquire an evaluation value by evaluating the combination of the selected action and the selected state; identify for each selected action, a lowest evaluation value that is lowest among acquired evaluation values; determine the lowest evaluation value among evaluation values of all the states selected for each action as a minimax candidate, and determine, as a minimax, an evaluation value that is highest among the lowest evaluation values corresponding to the actions; at each time an evaluation value is acquired for a combination of a state and an action after the minimax candidate is determined, compare the acquired evaluation value and the minimax candidate, and terminate selection of a state corresponding to the action when the evaluation value is lower than the minimax candidate and to select an action from unselected actions included in the action set; and output an action corresponding to the determined minimax.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory view of an example of a solution to an action deciding problem based on the minimax loss criterion;

FIG. 2 is an explanatory view of an example of a search space;

FIG. 3 is an explanatory view of a solution to the action deciding problem based on the minimax loss criterion according to a first embodiment;

FIG. 7 is a flowchart of an example of a minimax search process procedure by the calculator 402 according to the first embodiment;

FIG. 8 is an explanatory view of a minimax search example in the first embodiment;

FIG. 27 is a flowchart of an example of a minimax search process procedure (first half) by the master calculator 1500;

FIG. 28B is a flowchart of another example of the minimax search process procedure (second half) by the master calculator 1500;

FIG. 30B is a flowchart (part two) of the example of the minimax search process procedure by the slave calculator 150p;

FIG. 37 is an explanatory view of an example of a corrected operation evaluation table 3118 depicted in FIG. 31;

FIG. 38 is an explanatory view of an example of a response capability evaluation table 3119 depicted in FIG. 31;

FIG. 50 is an explanatory view of an example of the corrected operation evaluation table in the case of using the environmental load reduction effect;

FIG. 51 is an explanatory view of an example of a response capability evaluation table 3119;

FIG. 52 is an explanatory view of an example of the optimum operation evaluation table 3116 in the case of using the cost reduction effect;

FIG. 53 is an explanatory view of an example of the corrected operation evaluation table 3118 in the case of using the cost reduction effect;

FIG. 54 is a diagram of an example of the response capability evaluation table 3119;

FIG. 60 is an explanatory diagram of the search ranges covered;

FIG. 61 is an explanatory view of an example of a variation probability table for generating communication demand scenarios;

FIG. 62 is an explanatory view of an example of a created optimum operation plan; and FIG. 63 is an explanatory view of an evaluation result.

DESCRIPTION OF EMBODIMENTS

Figure 4:
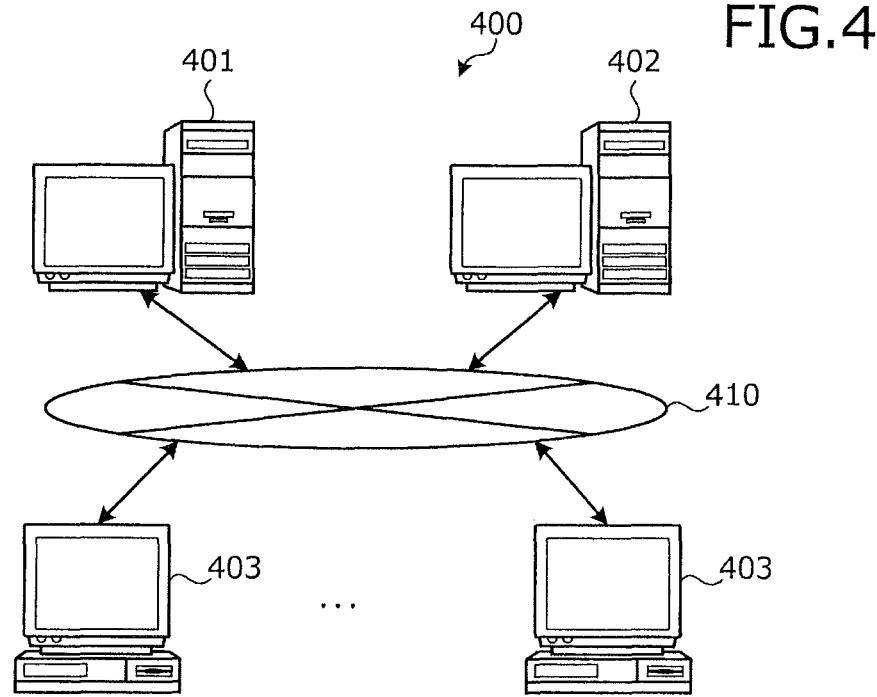
FIG. 4 is an explanatory view of a system configuration example of a calculator system according to the first embodiment.

Embodiments of a calculator, a calculator system, a computer product, and a search method will be described in detail with reference to the accompanying drawings. A theory about rational decision-making under uncertainty will first be described.

One theory about rational decision-making under uncertainty is a statistical decision theory. In the statistical decision theory, levels of uncertainty of future states directly related to a decision problem are categorized into the following four stages, and plans for actions to be taken under respective levels of uncertainty are determined and proposed:

(1) case of decided future: when the state (or environment) of a future system can be predicted with certainty;

(2) case with risk: when all the possible future states and the probability distribution thereof can be predicted;

(3) case with (narrowly-defined) uncertainty: although the possible future states can entirely be recognized, the probability distribution thereof cannot be predicted; and (4) obscure case: when a possible future state is not known.

In the case of (1), since it is only necessary to evaluate the use of alternative action plans for expected future situations and select the action plan for which the maximum utility is indicated, this results in a simple evaluation problem of a utility function.

In the case of (4), organized knowledge is insufficient. Among the cases having some degree of uncertainty, in the case of (2), the probability distribution can be utilized to decide an action according to an expected value criterion, a stability criterion, a maximum likelihood value criterion, a desired level criterion, etc.

In the case of (3), although the possible future states can be recognized and evaluation values of utility of the states can be estimated, the future state distribution cannot be estimated. Such a situation often occurs in practical problems. Decision criteria in this case are proposed as the Laplace criterion, the Wald criterion (max-min gain criterion), the max-max gain criterion, the Hurwicz criterion, the Savage criterion (minimax loss criterion), etc.

In the decision-making problem in the case with narrowly-defined uncertainty, the number of situations and the number of actions may be enormous and costs may be required for utility calculations in some situations. For example, this is a situation in which although it is desired to decide the optimum operation plan from among operation plan candidates for a social infrastructure system, the utilities of operation plans for states must be calculated for decision-making through simulation because the probability distribution of the possible future states and the utility function are not certain.

For example, this corresponds to a problem of deciding a control parameter of peak-cut operation using a storage battery such that maximum peak power throughout the year can be reduced in an office introducing solar power generation so as to reduce costs through reductions in contracted power. Although the peak power reduction with a storage battery is generally achieved through discharge control based on a preset peak-cut target value (discharging electricity without causing electric power demand exceeding a target value), if the peak power is reduced by using both the solar power generation and the storage battery, both the solar power generation output and the electric power demand vary due to weather conditions and therefore, it is not easy to set an suitable target value.

For example, even when a target value is set based on a typical daily supply-demand pattern for a certain weather condition, the target value is likely to be unsuitable for a target value for a day of another weather condition and therefore, a suitable discharge target value must be set with consideration of various supply-demand patterns that may occur throughout the year. In other words, deciding a target value that enables efficient reduction in maximum peak power throughout the year comes to solving a problem of properly deciding an "action", i.e., the discharge target value, for a "state", i.e., various supply-demand statuses.

If the probability distribution of states and the utility function are known, various theories (such as linear programming, nonlinear programming, and dynamic programming) can be utilized. If the probability distribution of states and the utility function are not known, after calculating utilities of all the states for actions, the maximum and minimum values, etc. must be calculated and a decision must be made according to any criterion. In this embodiment, a solution is efficiently found to an action deciding problem based on the minimax loss criterion employed when probability distribution of states and the utility function are not known.

In this embodiment, an evaluation value of a state Ai for an action Bj is denoted by Vij. For example, an evaluation value of a state A3 for an action B1 is denoted by V31. A table specifying positions of respective states for each action is referred to as a "search space".

<Solution to Action Deciding Problem According to Minimax Loss Criterion>

FIG. 1 is an explanatory view of an example of a solution to an action deciding problem based on the minimax loss criterion. In FIG. 1, a storage battery operation plan is taken as an example of the action and a supply-demand status is taken as an example of the state.

FIG. 1 depicts an action deciding problem based on the minimax loss criterion in a search space of the action count m=4 and the state count n=4. In (A) of FIG. 1, 4×4=16 evaluation values are obtained and a maximum evaluation value is obtained for each action. As a result, among the maximum evaluation values V1max (=4), V2max (=10), V3max (=9), and V4max (=6) of the actions B1 to B4, the minimum value V1max (=4) is selected as the minimax. As a result, it is found that the optimum storage battery operation plan is the action B1 with a peak power of 400 [kw], which is the lowest value among the maximum peak power.

On the other hand, in (B) of FIG. 1, in the process of sequentially evaluating states for a selected action, when it is ascertained that a maximum evaluation value of evaluation for a possible state of the currently selected action cannot be the minimax, the evaluation of subsequent states for the currently selected action is terminated. In this description, such termination of evaluation is referred to as "pruning".

In particular, a basic concept for efficiently finding the minimax is to utilize information acquired in the course of evaluation of actions to terminate the evaluation of an action unlikely to be optimal, thereby improving the efficiency of the minimax search. A condition for pruning (pruning rule) is as follows.

Pruning Rule: In the process of sequentially calculating the utilities of the states A1 to An for a given action Bj, the lowest value of maximum evaluation values found in previously performed evaluation calculations for different actions B1 to B(j−1) is defined as a minimax candidate. With regard to this minimax candidate, if the utility (evaluation value) of the state Ai under evaluation exceeds the minimax candidate, the action Bj is determined to not be suitable and the evaluation for the action Bj is terminated.

The pruning rule means that because an action for which a state worse than the already known worst case cannot be a suitable action, further evaluation is not performed, thereby omitting calculations for actions that include a maximum evaluation value that is not the minimax. By using the pruning rule, the minimax can be searched for while calculations for actions that are not suitable are omitted.

For example, in (B) of FIG. 1, it is assumed that the calculations for the states A1 to A4 are completed for the action B1 and that the maximum evaluation value V1max=4 is found. The minimax candidate is four at this time point. The evaluation value V12 of the state A1 for the action B2 is ten. In this case, since the maximum evaluation value V2max of the action B2 is determined to be greater than or equal to ten at this time point, the value is greater than the minimax candidate of four.

Since the maximum evaluation value V2max of the action B2 is no longer expected to be the minimax even if the states A2 to A4 other than the state A1 are evaluated, the need for evaluating the states A2 to A4 other than the state A1 is eliminated. As described above, by determining the actions having the maximum evaluation value V2max that cannot be the minimax based on the minimax candidate emerging in the course of calculations, unnecessary calculations for calculating the minimax are omitted. In (B) of FIG. 1, calculations are omitted in the same way for the actions B3 and B4.

As a result, in (B) of FIG. 1, the minimax can be obtained by obtaining only seven evaluation values and thus, nine (=16−7) evaluations are pruned as compared to (A) of FIG. 1. Therefore, the calculation load of the minimax search can be reduced and the minimax can efficiently be searched for.

(First Embodiment)

A calculator, a calculator system, a search program, and a search method for searching information according to a first embodiment will be described. The first embodiment is an example of obtaining a solution to an action deciding problem, based on the minimax loss criterion with a calculator as depicted in (B) of FIG. 1.

<Example of Search Space>

FIG. 2 is an explanatory view of an example of a search space. A search space T is a data table storing evaluation values Vij, maximum evaluation value candidates VCjmax, maximum evaluation values Vjmax, and the minimax and is stored in a memory apparatus. An evaluation value Vij is stored at a position Cij specified by a state Ai for an action Bj. In the initial state, the evaluation value Vij is not stored at the position Cij. Similarly, the maximum evaluation value candidates VCjmax, the maximum evaluation values Vjmax, and the minimax are not stored.

FIG. 3 is an explanatory view of a solution to the action deciding problem based on the minimax loss criterion according to the first embodiment. FIG. 3 depicts details of the solution to the action deciding problem based on the minimax loss criterion depicted in (B) of FIG. 1. In records of the minimax in the search space T of FIGS. 2 and 3, "Δ" means a minimax candidate and "o" means the minimax.

First, (A) depicts a state in which respective evaluation values of the states A1 to A4 for the action B1 are obtained. In this case, the maximum evaluation value V1max for the action B1 is the evaluation value V11=4 of the state A1. Since the maximum evaluation value or the maximum evaluation value candidates has/have not obtained for all the actions B1 to B4 at this time point, the minimax is not determined, and the maximum evaluation value V1max for the action B1 is defined as the minimax candidate.

In the state depicted in (B), it is assumed that the action B2 is selected and that the state A1 is evaluated. The evaluation value V12 in this case is assumed to be "10". The maximum evaluation value V1max=4 of the minimax candidate and the evaluation value V12=10 are compared. In this case, since the maximum evaluation value V2max of the action B2 is determined to be greater than or equal to 10 at this time point, the value is greater than the minimax candidate of 4.

In the state depicted in (C), since the maximum evaluation value V2max of the action B2 is no longer expected to be the minimax even if the states A2 to A4 other than the state A1 are evaluated, the need for evaluating the states A2 to A4 other than the state A1 is eliminated. As a result, the pruning is performed to omit the evaluation of the states A2 to A4.

In the state depicted in (D), it is assumed that the action B3 is selected and that the state A1 is evaluated. The evaluation value V13 in this case is assumed to be "7". The maximum evaluation value V1max=4 of the minimax candidate and the evaluation value V13=7 are compared. In this case, since the maximum evaluation value V3max of the action B3 is determined to be greater than or equal to 7 at this point, the value is greater than the minimax candidate of 4.

In the state depicted in (E), since the maximum evaluation value V3max of the action B3 is no longer expected to be the minimax even if the states A2 to A4 other than the state A1 are evaluated, the need for evaluating the states A2 to A4 other than the state A1 is eliminated. As a result, the pruning is performed to omit the evaluation of the states A2 to A4.

In the state depicted in (F), the evaluation is performed in the same way for the action B4. In particular, since the maximum evaluation value V4max of the action B4 is no longer expected to be the minimax even if the states A2 to A4 other than the state A1 are evaluated, the need for evaluating the states A2 to A4 other than the state A1 is eliminated. As a result, the pruning is performed to omit the evaluation of the states A2 to A4. As a result, since nine (=16−7) evaluations are pruned as described in (B) of FIG. 1, the calculation load of the minimax search can be reduced.

As described, by omitting the calculation of states that are for an action that is unpromising (that includes a maximum evaluation value higher than the minimax) and that need not be evaluated, an efficient minimax search can be implemented. In particular, all the states are evaluated, without omission, in the evaluation of the maximum evaluation values for actions that include the minimax desired to be found. Meanwhile, by utilizing the minimax candidate acquired in the course of calculations to thereby omit the evaluation of the actions that do not need calculation, efficient evaluation can be realized while the minimax is certainly found as is the case with the evaluation without the pruning as depicted in (A) of FIG. 1.

Although the calculation of deciding the action that minimizes the maximum evaluation value of the states A1 to A4 is taken as an example in the description, even when the action maximizing the minimum evaluation value of the states A1 to A4 is decided, the search process can be made more efficient in the same procedure (with the inverse magnitude relation). Even when the action minimizing (maximizing) an n-th largest (smallest) evaluation value of the states A1 to A4 is decided, the search process can be made more efficient in the same procedure by replacing the process of obtaining the maximum evaluation value for the action such that the n-th largest (smallest) evaluation value is obtained.

<System Configuration Example>

FIG. 4 is an explanatory view of a system configuration example of a calculator system according to the first embodiment. The calculator system has a calculator 401, a calculator 402, and terminals 403 mutually communicably connected through a network 410 such as a local area network (LAN), a wide area network (WAN) and the Internet.

The calculator 401 is a computer that calculates an evaluation value of a given state Ai for a given action Bj in an action deciding problem based on the minimax loss criterion. For example, if it is desired to solve the action deciding problem about a storage battery operation plan, a simulation is performed with a storage battery operation plan defined as an "action" and a supply-demand status as a "state". In this case, the minimax is the minimum electric power in the maximum electric power group made up of the maximum evaluation values of the actions, and the storage battery operation plan at the minimax is the optimum action. As a result, the operation plan that makes the value of the maximum electric power as small as possible regardless of the realized supply-demand status Ai can be efficiently searched for, and the maximum electric power can be suppressed with high probability.

Alternatively, the calculator 401 may perform the simulation with a company strategy as an "action" and an economic condition as a "state". In this case, the minimax is the minimum loss in the maximum loss group made up of the maximum evaluation values of the actions, and the company strategy at the minimax is the optimum action. As a result, the company strategy for that makes the value of the maximum loss as small as possible regardless of the realized economic condition Ai can be efficiently search, and the maximum loss can be suppressed with high probability. As described, what is defined as the "action" and what is defined as the "state" depends on the simulation on the calculator 401. The simulation on the calculator 401 will be described later in detail.

The calculator 402 is a computer that searches for the minimax as depicted in FIGS. 2 and 3. When the calculator 402 evaluates a given state Ai for a given action Bj, two methods are available. One method is to request calculation of the evaluation value of the given state Ai for the given action Bj through the network 410 to the calculator 401 and acquire the evaluation value through the network 410 from the calculator 401. In the other method, the simulation function of the calculator 401 is implemented by the calculator 402 and the calculator 402 calculates the evaluation value of the given state Ai for the given action Bj. In the latter case, the calculator 401 is not necessary.

The terminals 403 are computers that send a search request for the minimax through the network 410 to the calculator 402 and receive the action resulting in the minimax through the network 410 from the calculator 402. The calculator 402, in addition to receiving search requests from the terminals 403, may also receive a search request when the calculator 402 is directly operated. In this case, the calculator 402 outputs the action resulting in the minimax on a display apparatus etc.

<Hardware Configuration Example of Computer>

Figure 5:
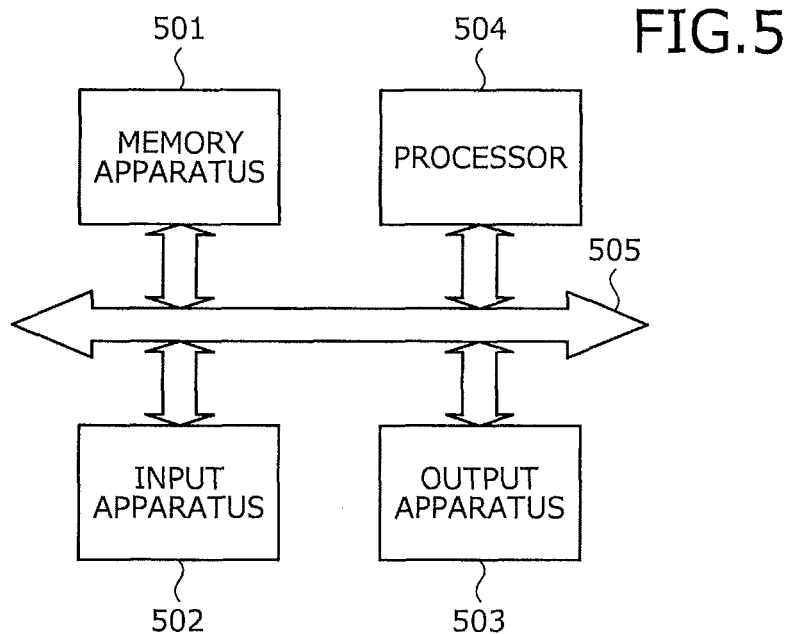
FIG. 5 is a block diagram of a hardware configuration example of a computer (calculators 401, 402, and terminals 403) according to the first embodiment.

FIG. 5 is a block diagram of a hardware configuration example of a computer (the calculators 401, 402, and the terminals 403) according to the first embodiment. The computer is made up of a memory apparatus 501, an input apparatus 502, an output apparatus 503, and a processor 504 (central processor), connected through a bus 505.

The memory apparatus 501 stores data and programs (a boot program, an operating system, applications). The memory apparatus 501 is used as a work area for the processor 504. The memory apparatus 501 in the calculator 402 stores the search space T depicted in FIG. 2. For example, a read only memory (ROM), a random access memory (RAM), a flash memory, a magnetic disk drive, an optical disk drive, etc., are employed as the memory apparatus 501.

The input apparatus 502 inputs data and instructions from an external source. The input data and instructions are stored to the memory apparatus 501 and delivered to the processor 504. For example, the input apparatus 502 may be a keyboard, operation keys, a mouse, a touch panel, a scanner, a camera, and a communication interface.

The output apparatus 503 outputs data delivered from the processor 504. For example, a display, a printer, a speaker, and a communication interface are employed as the output apparatus 503.

The processor 504 is responsible for general control of the computer. The processor 504 reads programs in the memory apparatus 501 and executes instructions. The processor 504 reads data in the memory apparatus 501 and writes data into the memory apparatus 501. The processor 504 delivers a calculation result to the output apparatus 503 according to an instruction.

<Functional Configuration Example of Calculator 402>

Figure 6:
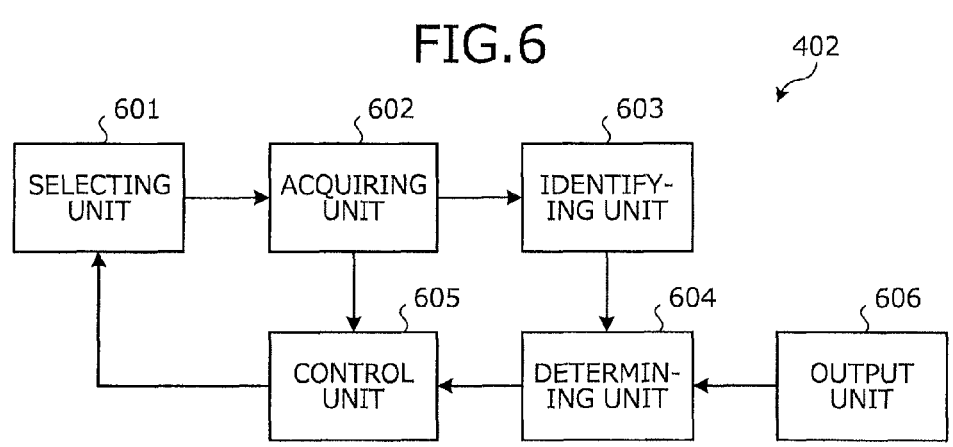
FIG. 6 is a block diagram of a functional configuration example of the calculator 402 according to the first embodiment.

FIG. 6 is a block diagram of a functional configuration example of the calculator 402 according to the first embodiment. The calculator 402 includes a selecting unit 601, an acquiring unit 602, an identifying unit 603, a determining unit 604, a control unit 605, and an output unit 606. For example, functions of the selecting unit 601 to the output unit 606 are implemented by causing the processor 504 to execute a program stored in the memory apparatus 501 depicted in FIG. 5.

The selecting unit 601 selects an action from the action set and selects a state corresponding to the selected action from the state set. For example, the selecting unit 601 sequentially selects an action from the action set in the search space T stored in the memory apparatus 501 and sequentially selects a state of the state set corresponding to the selected action. For example, the selecting unit 601 sequentially selects an unselected action Bj from among the actions B1 to Bn. The selecting unit 601 sequentially selects a state Ai for the currently selected action Bj.

Therefore, the selecting unit 601 sequentially selects an unselected state Ai unless the pruning rule is applied for the selected action Bj. If the pruning rule is applied, the selecting unit 601 selects the next unselected action according to an instruction from the control unit 605 even when an unselected state Ai remains for the currently selected action Bj.

If no state Ai to be selected remains without application of the pruning rule, the selecting unit 601 selects an action that remains unselected. If no unselected action Bj is present, the selecting unit 601 terminates the selection process.

The acquiring unit 602 acquires an evaluation value indicative of evaluation of a state selected by the selecting unit 601. For example, the acquiring unit 602 sequentially acquires an evaluation value of a state selected for an action selected by the selecting unit 601 and stores the evaluation value into the search space T. For example, if the calculator 401 calculates evaluation values, the acquiring unit 602 transmits to the calculator 401, a request for evaluation of the state Ai selected for the selected action Bj. The acquiring unit 602 receives and stores the evaluation value Vij transmitted from the calculator 401 at the position Cij in the search space T.

On the other hand, if the calculator 402 calculates evaluation values, the acquiring unit 602 calculates the evaluation value Vij of the state Ai selected for the selected action Bj and stores the evaluation value Vij at the position Cij in the search space T.

The identifying unit 603 identifies the lowest evaluation value among the evaluation values acquired by the acquiring unit 602. For example, if the acquiring unit 602 acquires evaluation values corresponding to all the states in the state set for one of the selected actions, the identifying unit 603 identifies the maximum evaluation value from those evaluation values for that selected action. For example, as depicted in (A) of FIG. 3, if the evaluation values V11 to V14 of the states A1 to A4 are acquired for the action B1, the maximum evaluation value V1max is identified from the evaluation values V11 to V14. As for the other actions B2 to B4, the evaluation values for each of those actions are also acquired in the same manner as is the case with the action B1 unless the pruning is performed, the respective maximum evaluation values V1max to V4max are identified.

On the other hand, if the pruning is performed, the identifying unit 603 identifies the evaluation value when the pruning is performed, as the maximum evaluation value candidate VCjmax. For example, as depicted in (B) and (C) of FIG. 3, since the pruning is performed at the evaluation value V21 for the action B2, the evaluation value V21 is identified as the maximum evaluation value candidate VC2max for the action B2.

The determining unit 604 determines, as a minimax candidate, the lowest evaluation value among the evaluation values of all the states selected for a given action and determines, as the minimax, the evaluation value of the highest evaluation among the lowest evaluation values corresponding to the actions. For example, the determining unit 604 determines, as the minimax candidate, the lowest value among the maximum evaluation values identified by the identifying unit 603 in the action set that has already been selected. For example, when the currently selected action is the action Bj, the determining unit 604 provisionally determines, as the minimax candidate, the lowest value among the maximum evaluation values acquired without performing the pruning from the actions B1 to B(j−1). In particular, for example, when the currently selected action is the action B3, if the maximum evaluation values V1max and V2max are acquired for the actions B1 and B2 without performing the pruning, the value that is lower between the maximum evaluation values V1max and V2max is decided as the minimax candidate.

If no action to be selected is present, the determining unit 604 determines the minimax candidate to be the minimax. For example, the determining unit 604 determines the minimax candidate at the time of completion of evaluation for the actions B1 to Bn to be the minimax. For example, since the minimax candidate at the time of completion of evaluation for the actions B1 to B4 is V1max=4 in the example of FIG. 3, V1max=4 is determined as the minimax.

The control unit 605 compares an evaluation value of each state selected for another action after the determination of the minimax candidate and the minimax candidate each time an evaluation value is acquired, and if the evaluation value is a value of evaluation lower than the minimax candidate, the control unit 605 controls the selecting unit 601 to terminate the selection of a state for the corresponding action and to select an action from among unselected actions included in the action set. For example, if an evaluation value of a state selected for the currently selected action is larger than the minimax candidate, the control unit 605 controls the selecting unit 601 to terminate the selection of an unselected state for the currently selected action and to select an unselected action from the action set. In other words, the control unit 605 applies the pruning rule described to control the selection by the selecting unit 601.

For example, the control unit 605 compares the evaluation value Vij of the state Ai for the currently selected action Bj and the minimax candidate at the current time point. If the evaluation value Vij is larger than the minimax candidate, the control unit 605 causes the selecting unit 601 to select an unselected action. For example, if the selecting unit 601 selects the action Bj by incrementing an index j of the action Bj from j=1 by one at the completion of selection of all the states A1 to An, the control unit 605 forcibly increments the index j when the pruning rule is applied. For example, since the pruning rule is applied to the evaluation value V12 of the state A1 for the action B2 as depicted in FIG. 3, the selecting unit 601 is caused to select the next unselected action B3.

The control unit 605 stores the evaluation value Vij when the pruning rule is applied, as the maximum evaluation value candidate VCij for the action Bj into the search space T. Therefore, if an unselected action is randomly selected, the control unit 605 identifies an action having neither the maximum evaluation value nor the maximum evaluation value candidate stored in the search space T and notifies the selecting unit 601. As a result, the selecting unit 601 is allowed to select an unselected action.

The output unit 606 outputs the action corresponding to the minimax determined by the determining unit 604. For example, the output unit 606 outputs the name (e.g., a character string indicative of the action such as "storage battery operation plan 1") of the action having the determined minimax. The (value of) minimax or the (name of) state may be output in addition to the action. In the example depicted in FIG. 3, for example, {action B1, state A1, minimax=4} is output as an output result. The output unit 606 outputs such an output result to the output apparatus 503 or the memory apparatus 501. The output result output to the output apparatus 503 is output (displayed on a screen, printed, transmitted to another apparatus, or output as sound) according to the output apparatus 503. The output result output to the memory apparatus 501 is stored to the memory apparatus 501.

<Example of Minimax Search Process Procedure by Calculator 402>

FIG. 7 is a flowchart of an example of a minimax search process procedure by the calculator 402 according to the first embodiment. Although the index j of the action Bj and the index i of the state Ai are incremented from one in the description of the example depicted in FIG. 7, the indexes may be decremented from n and m. Alternatively, the unselected action Bj and state Ai may randomly be selected. In the case of random selection, for example, a selection flag may be set at the selected positions Cij to prevent redundant selection.

If an action likely to be optimal is empirically known through heuristics, etc., the actions B1 to Bm may be given priority and selected in descending order of priority. As a result, if a nearly optimum minimax candidate is found, subsequent evaluations of actions can efficiently be performed. If a state is known that has high evaluation (high loss) for every action, the states A1 to An may be given priority and selected in descending order of priority. As a result, the worst state can be evaluated preferentially to judge, at an earlier timing, the actions that cannot be the minimax.

First, the calculator 402 initializes the minimax candidate as ∞ (infinity) (step S701). The calculator 402 sets the index j of the action Bj to j=1 (step S702) and causes the selecting unit 601 to select the action Bj (step S703). The calculator 402 sets the index i of the state Ai to 1=1 (step S704) and causes the selecting unit 601 to select the state Ai (step S705). As a result, the position Cij is identified. The calculator 402 causes the acquiring unit 602 to acquire the evaluation value Vij of the state Ai for the action Bj (step S706). The acquired evaluation value Vij is stored at the position Cij of the search space T.

The calculator 402 causes the control unit 605 to judge whether the pruning rule is applicable to the evaluation value Vij (step S707). For example, the control unit 605 judges whether the evaluation value Vij is greater than the minimax candidate. If no action has already been selected, the pruning rule is applied since the minimax candidate is set to the initial value=∞ (infinity).

If the pruning rule is not applicable (step S707: NO), the calculator 402 causes the selecting unit 601 to increment the index i of the state Ai (step S708), and judges whether i≤n is satisfied (step S709). If i≤n is satisfied (step S709: YES), since an unselected Ai remains, the procedure returns to step S705 and the calculator 402 causes the selecting unit 601 to select a state Ai.

On the other hand, if i≤n is not satisfied (step S709: NO), since the evaluation values of all the states A1 to An have been acquired for the action Bj, the calculator 402 causes the identifying unit 603 to identify the maximum evaluation value Vjmax among the evaluation values V1j to Vnj for the action Bj (step S710). The identified maximum evaluation value Vjmax is stored in the search space T.

The calculator 402 updates the minimax candidate (step S711). In other words, the calculator 402 causes the determining unit 604 to determine, as the minimax candidate, the minimum evaluation value among the maximum evaluation values acquired thus far. The calculator 402 then increments the index j of the action Bj (step S712).

On the other hand, if the pruning rule is applicable at step S707 (step S707: YES), the procedure goes to step S712. In other words, the loop of steps S708, S709, and S705 to S709 and steps S710 and S711 are skipped. Therefore, unnecessary calculations can be suppressed to accelerate the minimax search.

After step S712, the calculator 402 judges whether j≤m is satisfied (step S713). In other words, the calculator 402 judges whether an unselected action Bj is present. If j≤m is satisfied (step S713: YES), the procedure goes to step S703 and the calculator 402 causes the selecting unit 601 to select an action Bj. On the other hand, if j≤m is not satisfied (step S713: NO), the calculator 402 causes the determining unit 604 to set the current minimax candidate as the minimax and causes the output unit 606 to output the action Bj having the minimax (step S714). A sequence of the process is then terminated.

Thus, according to the first embodiment, evaluation is omitted for an action Bj that need not be evaluated in the sense that the maximum evaluation value of the action Bj cannot be the minimax. As a result, a decision can rapidly be made based on the minimax loss criterion. Particularly when the number (count) n of possible future states Ai and the number (count) m of actions of each of the states Ai are enormous, the load of the evaluation value calculation for the actions Bj having the states Ai becomes significant. Therefore, when the pruning is performed as in the first embodiment, the calculation loads of the calculators 401 and 402 can be reduced.

(Second Embodiment)

A second embodiment will be described. In the first embodiment, the unselected actions Bj are selected in some way and the applicability of the pruning rule is judged for each selected state to enable the acceleration of the minimax search process. In this case, until a minimax candidate close to the actual minimax is incidentally discovered, calculations that should be able to be terminated cannot be terminated if an effective pruning rule has been set and therefore, the effective search should be possible cannot be realized sufficiently.

FIG. 8 is an explanatory view of a minimax search example in the first embodiment. In FIG. 8, as depicted in (A) to (C), the pruning rule is not applied to the actions B1 to B3 and the evaluation values are acquired for all the states A1 to A4. The pruning rule is finally applied to the state A1 for the action B4 as depicted in (D), and the pruning of the states A2 to A4 are performed. Therefore, if the minimax candidate=4 can be found at an early stage of search, the pruning rule is be applied more effectively.

Therefore, in the second embodiment, a given value S is assumed as the minimax. The value S assumed as the minimax is referred to as a "presumed minimax". Thus, in the second embodiment, the presumed minimax S is used to efficiently perform the search by utilizing the pruning rule and, when it is determined whether the presumed minimax S is the minimax, if the presumed minimax S is not the minimax, the presumed minimax S is updated, and this determination is repeated until the minimax is finally found.

If the presumed minimax S can be properly set, an efficient minimax search using the pruning rule can be realized without performing calculations for actions with a poor evaluation until a minimax candidate close to the actual minimax is found. Even when the presumed minimax S cannot be properly set, if the presumed minimax S is set lower than the actual minimax, termination of calculation consequent to the pruning rule can be expected for a large number of actions. Therefore, a long execution time is not required for determining that the presumed minimax S is not the minimax. Since the information of the state evaluated in the determination is reutilized in the subsequent search, the calculation time does not increase as compared to when the pruning is not performed.

In the second embodiment, the presumed minimax S is set lower than the actual minimax and an efficient search using the pruning rule is performed. The information acquired in the search is used for updating the presumed minimax S such that the presumed minimax S comes closer to the actual minimax before the search is continued. Therefore, whether the presumed minimax S is the minimax has to be determined first. If the presumed minimax S is not the minimax, the pruning is performed for all the actions including the action having the maximum evaluation value defined as the minimax although the presumed minimax S itself is not the minimax. Therefore, the following minimax negative condition is utilized.

Minimax Negative Condition: If the presumed minimax S is not the minimax, no minimum value candidate for the maximum evaluation value is found (the pruning occurs) for any of the actions.

Figure 9:
FIG. 9 is an explanatory view of a presumed minimax negative condition.

FIG. 9 is an explanatory view of the presumed minimax negative condition. In the example depicted in FIG. 9, the maximum evaluation value V3max=4 of the action B3 is the minimax. In FIG. 9, if the presumed minimax S is set to S=2, the maximum evaluation values V1max to V4max of the actions B1 to B4 are larger than the presumed minimax S. As a result, the presumed minimax S=2 is not the minimax (S≠4) and thus, a maximum evaluation value is in none of the actions B1 to B4. Therefore, no minimum value candidate for the maximum evaluation value is found and termination consequent to pruning occurs.

In particular, if the minimax negative condition is satisfied as a result of evaluation of all the actions B1 to Bm, this means that the minimax is not found. Therefore, in the second embodiment, the presumed minimax S is updated by ΔS in this case and the same process is executed again. If the presumed minimax S exceeds the actual minimax, the pruning does not occur in the action Bj having the maximum evaluation value defined as the minimax and therefore, the minimax can be found.

Therefore, the search using the presumed minimax S less than or equal to the actual minimax is performed multiple times in the minimax search in the second embodiment unless the presumed minimax S exceeds the actual minimax. Thus, if the evaluation of the state Ai already performed for each action Bj is performed in an overlapping manner, the calculation amount may be smaller when the pruning is not performed in some cases. Therefore, in the second embodiment, an evaluated state table is prepared and relevant information is recorded in the evaluated state table. Details of the evaluated state table will be described later.

In the second embodiment, although it does not take long to determine that the presumed minimax S is not the minimax when the presumed minimax S is set lower, the nearly-ideal efficient minimax search can be realized if the presumed minimax S can be set to a value close to the actual minimax at the earliest possible stage. Therefore, a presumed minimax lower limit Smin is defined as a lower search limit for the minimax acquired in the course of minimax search so as to bring the presumed minimax S close to the actual minimax at the earliest possible stage.

Presumed minimax lower limit Smin: It is assumed that evaluations of several states are acquired for the actions B1 to Bm and that the maximum evaluation value candidates of the actions B1 to Bm are known. The presumed minimax lower limit Smin is the lowest value among the maximum evaluation value candidates of the actions. The minimax search in the case of application of the second embodiment will be described hereinafter in terms of the evaluation values depicted in FIG. 9.

Figure 10:
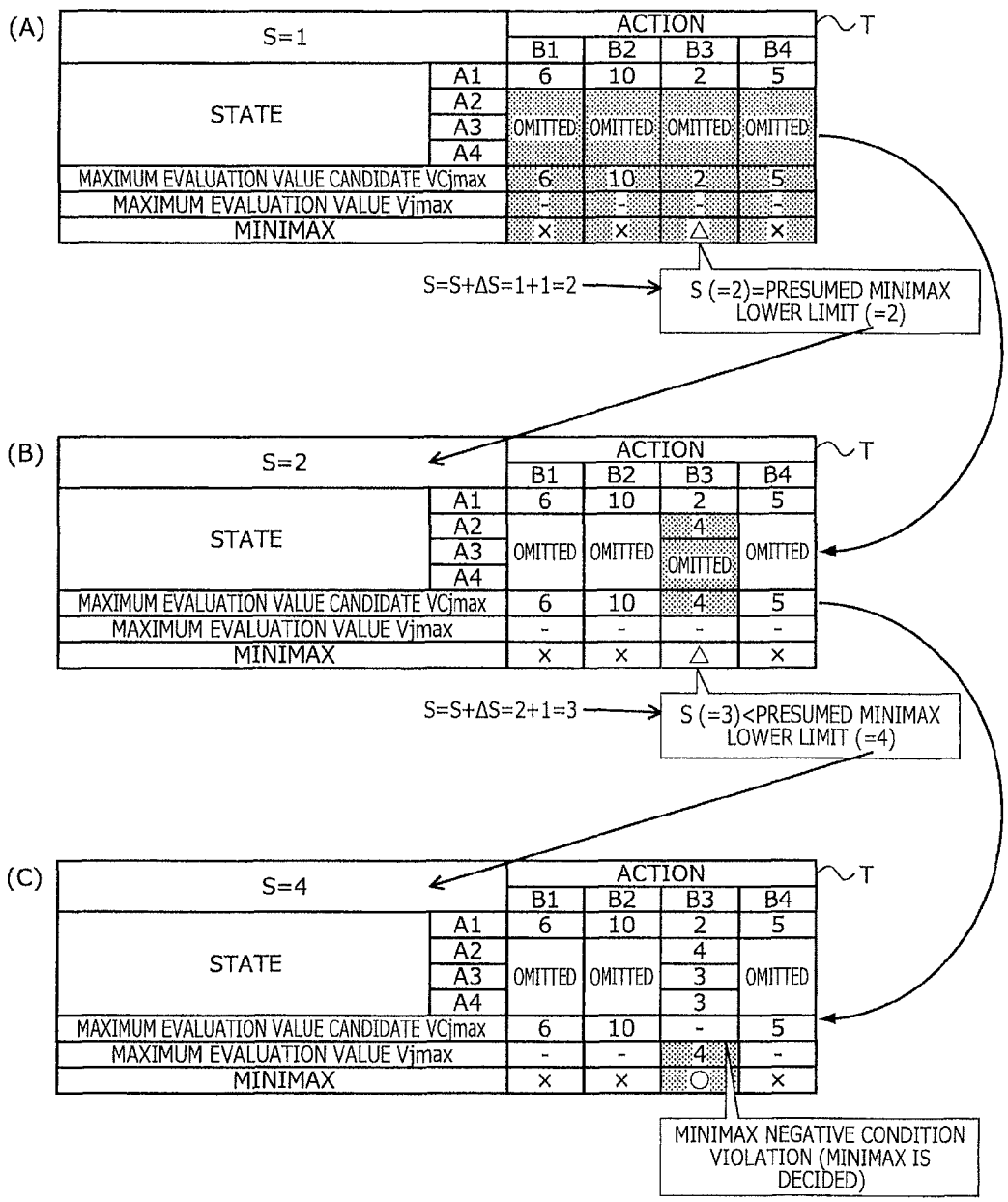
FIG. 10 is an explanatory view of a solution to the action deciding problem based on the minimax loss criterion according to a second embodiment.

FIG. 10 is an explanatory view of a solution to the action deciding problem based on the minimax loss criterion according to the second embodiment. First, in (A), the presumed minimax S is set to S=1 and an increase amount ΔS is set to ΔS=1. As a result of the application of the pruning rule using the presumed minimax S, the evaluation values V11 to V14 of the state A1 for the actions B1 to B4 are acquired in order of the actions B1 to B4. Since the evaluation values V11 to V14 are larger than the presumed minimax S (=1), the presumed minimax S is not the actual minimax and the presumed minimax negative condition is satisfied. Therefore, the evaluation values V11 to V14 are defined as the maximum evaluation value candidates VC11 to VC14. Since the presumed minimax lower limit Smin is the lowest value among the maximum evaluation value candidates VC11 to VC14, Smin=V3max=2 is satisfied.

Since the presumed minimax negative condition is observed at the presumed minimax S (=1), the increase amount ΔS is added to update the presumed minimax S to S=2. It is then judged whether S<Smin is satisfied by the updated presumed minimax S(S=2) and the presumed minimax lower limit Smin. If the S<Smin is satisfied, i.e., if the presumed minimax lower limit Smin is larger than the presumed minimax S, the presumed minimax lower limit Smin is closer to the actual minimax and therefore, the presumed minimax S is updated to the value of the presumed minimax lower limit Smin. In (A), since S=Smin, the presumed minimax S is not updated to the value of the presumed minimax lower limit Smin.

In (B), it is judged whether the pruning rule is applied to the evaluation values V11 to V14. Since the presumed minimax S is S=2 in (B), the pruning of the states A2 to A4 is performed for the actions B1, B2, and B4. On the other hand, since the evaluation value V13 of the state A1 for the action B3 is V13=2, V13=S is satisfied. Therefore, the pruning is not performed for the action B3. The next unselected state A2 is subsequently selected for the action B3 and the evaluation value V23 is acquired. It is assumed that the evaluation value V23 is V23=4.

Since the evaluation value V23 (=4) is larger than the presumed minimax S(S=2), the pruning of the states A3 and A4 is performed for the action B3. As a result, since the presumed minimax negative condition is observed at the presumed minimax S (=2), the increase amount ΔS is added again to update the presumed minimax S to S=3. It is then judged whether S<Smin is satisfied by the updated presumed minimax S (S=3) and the presumed minimax lower limit Smin (=4).

In this case, since the S<Smin is satisfied, the presumed minimax lower limit Smin is closer to the actual minimax and therefore, the presumed minimax S is updated to the value of the presumed minimax lower limit Smin. In (C), S=Smin=4 is satisfied.

In (C), as is the case with (B), it is judged whether the pruning rule is applied to the evaluation values V11 to V14. Since the presumed minimax S is S=4 in (C), the pruning of the states A2 to A4 is performed for the actions B1, B2 and B4. On the other hand, since the evaluation value V13 of the state A1 for the action B3 is V13=2, V13<S is satisfied. Therefore, the pruning is not performed for the action B3. The next unselected state A2 is subsequently selected for the action B3 and the evaluation value V23 is acquired. It is assumed that the evaluation value V23 is V23=4. The evaluation value V23 also satisfies V23=S. Therefore, the pruning is not performed for the action B3.

The pruning does not occur for the evaluation values V33 and V43 of the states A3 and A4 for the action B3. Therefore, because the action B3 is an action violating the minimax negative condition, the maximum evaluation value V23=4 among the evaluation values V13 to V43 of the action B3 is defined as the minimax. Although three evaluation values of the states A2 to A4 can be omitted for the action B4 in the example depicted in FIG. 8, the acquisition of nine values of the states A2 to A4 can be omitted for the actions B1, B2, and B4. Thus, the minimax can be searched for more efficiently as compared to the first embodiment and the calculation loads of the calculators 401 and 402 can be reduced.

<Functional Configuration Example of Calculator 402>

Figure 11:
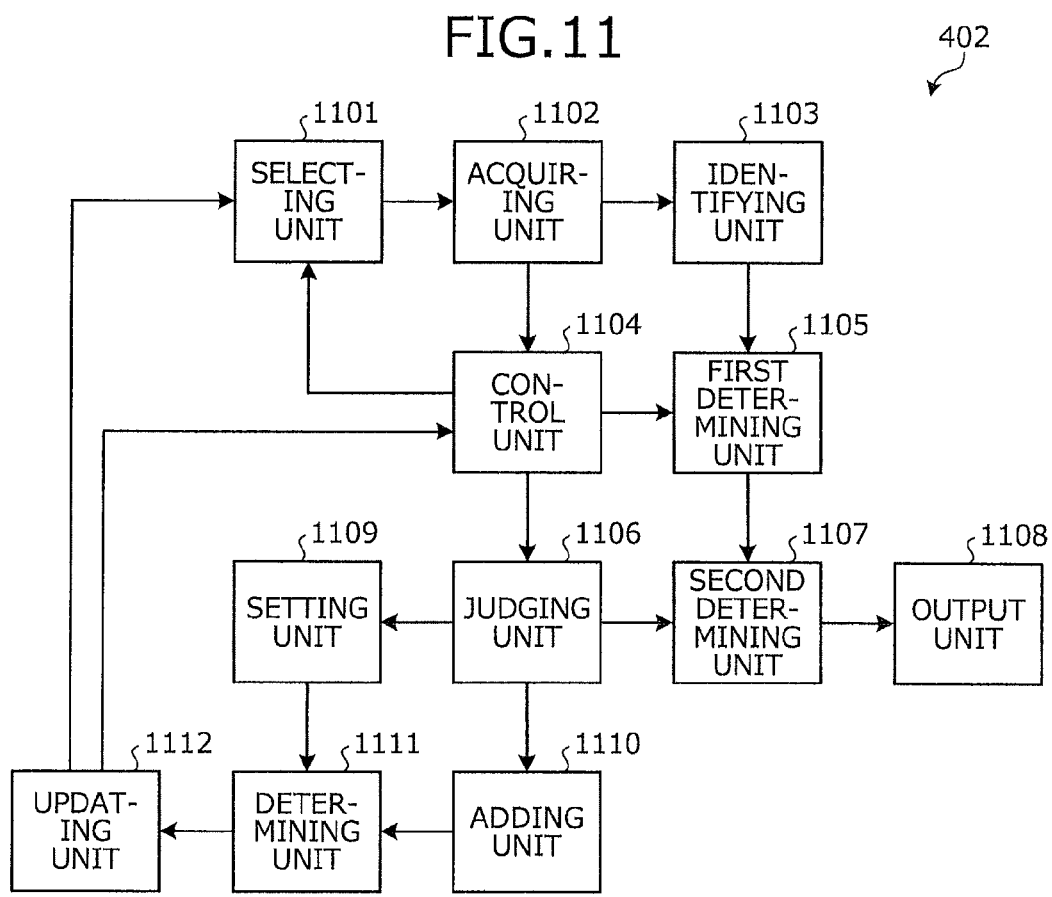
FIG. 11 is a block diagram of a functional configuration example of the calculator 402 according to the second embodiment.

FIG. 11 is a block diagram of a functional configuration example of the calculator 402 according to the second embodiment. The calculator 402 includes a selecting unit 1101, an acquiring unit 1102, an identifying unit 1103, a control unit 1104, a first determining unit 1105, a judging unit 1106, a second determining unit 1107, an output unit 1108, a setting unit 1109, an adding unit 1110, a determining unit 1111, and an updating unit 1112. For example, the functions of the selecting unit 1101 to the updating unit 1112 are implemented by causing the processor 504 to execute a program stored in the memory apparatus 501 depicted in FIG. 5. The selecting unit 1101, the acquiring unit 1102, and the identifying unit 1103 are the same as the selecting unit 601, the acquiring unit 602, and the identifying unit 603 of the first embodiment and therefore, will not be described.

In the second embodiment, the presumed minimax S is stored in the memory apparatus 501. The presumed minimax S is assumed to be set to a value sufficiently lower than the actual minimax in the initial state. This increases the opportunities for applying the pruning rule even in a search unable to find the minimax, and an efficient search can be expected. Although no problem occurs even when the presumed minimax S is set higher than the actual minimax, the pruning cannot be utilized efficiently if the set presumed minimax S is not suitable in terms of realizing an efficient search.

If the evaluation value Vij of the action Bj and the state Ai currently selected is less than or equal to the presumed minimax S, the control unit 1104 controls the selecting unit 1101 to select an unselected state for the currently selected action. In other words, if the evaluation value Vij is less than or equal to the presumed minimax S, the pruning rule is not satisfied and therefore, the selecting unit 1101 is caused to select an unselected state.

If it is judged that the evaluation value Vij of the action Bj and the state Ai currently selected is larger than the presumed minimax S, the control unit 1104 controls the selecting unit 1101 to terminate the selection of an unselected state for the selected action and select an unselected action. In this case, the pruning rule is satisfied and therefore, an unselected action is selected.

For example, if the selecting unit 1101 selects the action Bj by incrementing the index j of the action Bj from j=1 by one at a timing coinciding with the completion of selection of all the states A1 to An, the control unit 1104 forcibly increments the index j when the pruning rule is applied. For example, since the pruning rule is applied to the evaluation value V11 of the state A1 for the action B1 as depicted in FIG. 10, the selecting unit 1101 is caused to select the next unselected action B2.

The first determining unit 1105 determines as the minimax candidate the minimum evaluation value among the maximum evaluation values identified by the identifying unit 1103 for the actions for which selection is not terminated by the control unit 1104. For example, if the actions without termination are the actions B1 and B2, the smallest maximum evaluation value is decided as the minimax candidate between the maximum evaluation value V1max of the evaluation values V11 to V41 of the action B1 and the maximum evaluation value V2max of the evaluation values V12 to V42 of the action B2. The deciding process by the first determining unit 1105 is executed until a violation of the minimax negative condition occurs.

If an action to be selected is not present, the judging unit 1106 judges whether selection has been terminated for all the actions by the control unit 1104. For example, the judging unit 1106 judges whether the minimax negative condition is observed. If selection has been terminated for all the actions, the minimax negative condition is observed and the actual minimax is not found at this time point. On the other hand, if selection is not terminated for any action, the minimax negative condition is violated and it is ascertained that the actual minimax is found.

If the judging unit 1106 judges that the selection is not terminated for any action, the second determining unit 1107 determines as the minimax the minimum candidate decided by the first determining unit 1105 for the action without termination of selection. For example, if the minimax negative condition is violated, the smallest maximum evaluation value of the maximum evaluation values of the actions without termination of selection is already decided as the minimax candidate by the first determining unit 1105. Therefore, the second determining unit 1107 decides the minimum candidate as the minimax.

The output unit 1108 outputs the action having the minimax decided by the second determining unit 1107. For example, the output unit 1108 outputs the name (e.g., a character string indicative of the action such as "storage battery operation plan 1") of the action having the minimax decided. The (value of) minimax or the (name of) state may be output in addition to the action. In the example of FIG. 3, for example, {action B1, state A1, minimax=4} is output as an output result. The output unit 1108 outputs such an output result to the output apparatus 503 or the memory apparatus 501. The output result output to the output apparatus 503 is output (displayed on a screen, printed, transmitted to another apparatus, or read in voice) depending on the output apparatus 503. The output result output to the memory apparatus 501 is stored in the memory apparatus 501.

If the judging unit 1106 judges that the selection has been terminated for all the actions, the setting unit 1109 sets the minimum evaluation value among the evaluation values of the actions when the selection is terminated by the control unit 1104 as the presumed minimax lower limit Smin indicating the lower limit of the presumed minimax S. Therefore, if the minimax negative condition is observed, the setting unit 1109 sets the presumed minimax lower limit.

For example, since the selection is terminated, i.e., the pruning occurs, for the actions B1 to B4 in (A) of FIG. 10, the minimum evaluation value V13 (=2) is set as the presumed minimax lower limit Smin, among the evaluation values V11 (=6), V12 (=10), V13 (=2), and V14 (=5) at the time of occurrence of the pruning.

If the judging unit 1106 judges that the selection has been terminated for all the actions, the adding unit 1110 adds the predetermined increase amount ΔS to the presumed minimax S. Therefore, if the minimax negative condition is observed, the adding unit 1110 adds the predetermined increase amount ΔS to the presumed minimax S.

For example, since the selection has been terminated, i.e., the pruning occurs, for the actions B1 to B4 in (A) of FIG. 10, the adding unit 1110 adds the increase amount ΔS (=1) to the current presumed minimax S (=1) to set the presumed minimax S (=2). The increase amount ΔS is set to a value that is not too large. If the increase amount ΔS is set to a large value, the presumed minimax S is set by the setting unit 1110 as a value too large for the actual minimax, finally resulting in inefficient calculations. Therefore, although the increase amount ΔS can arbitrarily be set, the value thereof is preferably set such that an increment width of the increase can finely be set. Therefore, ΔS=1 is used in this example.

The determining unit 1111 determines whether the presumed minimax lower limit Smin set by the setting unit 1109 is larger than the presumed minimax S after the addition by the adding unit 1110. If the presumed minimax lower limit Smin is larger than the presumed minimax S, the presumed minimax lower limit Smin is closer to the actual minimax.

If it is determined that the presumed minimax lower limit Smin is larger than the presumed minimax S after the addition by the adding unit 1110, the updating unit 1112 updates the presumed minimax S to the value of the presumed minimax lower limit. As a result, the presumed minimax S can be brought closer to the actual minimax. Therefore, efficient pruning can be performed.

If it is determined that the presumed minimax lower limit Smin is less than or equal to the presumed minimax S after the addition by the adding unit 1110, the updating unit 1112 handles the presumed minimax S after the addition as the latest presumed minimax S.

In either case, when the updating unit 1112 updates the presumed minimax S, the evaluation values are selected, acquired (excluding already acquired evaluation values) and identified, and the minimax candidate is decided again by the selecting unit 1101, the acquiring unit 1102, the identifying unit 1103, and the first determining unit 1105. The control unit 1104 makes a judgment about the termination of selection, using the latest presumed minimax S.

As a result, if the judging unit 1106 makes a judgment about the minimax negative condition and the minimax negative condition is observed, the process is executed again by the setting unit 1109, the adding unit 1110, the determining unit 1111, and the updating unit 1112. As described, the process is recursively executed until the minimax negative condition is violated and, if the minimax negative condition is finally violated, the second determining unit 1107 determines the latest minimax candidate as the minimax, which is output by the output unit 108.

<Evaluated State Table>

Figure 12:
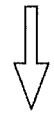
FIG. 12 is an explanatory view of an example of the contents of an evaluated state table.

FIG. 12 is an explanatory view of an example of the contents of the evaluated state table. In FIG. 12, an evaluated state table 1200 stores an index i of an evaluated state and a maximum evaluation value candidate VCjmax for each action. The evaluated state table 1200 stores the index i of the state Ai at the time of occurrence of the pruning for the currently selected action Bj and the evaluation value Vij at the time of occurrence of the pruning as the maximum evaluation value candidate VCjmax. The setting unit 1109 sets the lowest value among the maximum evaluation value candidates VCjmax as the presumed minimax lower limit Smin.

In FIG. 12, (A) depicts the contents in the case of the example depicted in (A) of FIG. 10. In this case, the lowest value among the maximum evaluation value candidates VCjmax is the evaluation value V13=2 of the state A1 for the action B3 (i.e., the maximum evaluation value candidate VC3max of the action B3 at this time point). Therefore, the presumed minimax lower limit Smin=2 is set.

In FIG. 12, (B) depicts the contents in the case of the examples depicted in (B) and (C) of FIG. 10. In this case, the lowest value among the maximum evaluation value candidates VCjmax is the evaluation value V23=4 of the state A1 for the action B3 (i.e., the maximum evaluation value candidate VC3max of the action B3 at this time point). Therefore, the presumed minimax lower limit Smin=4 is set.

<Example of Minimax Search Process Procedure by Calculator 402>

Figure 13:
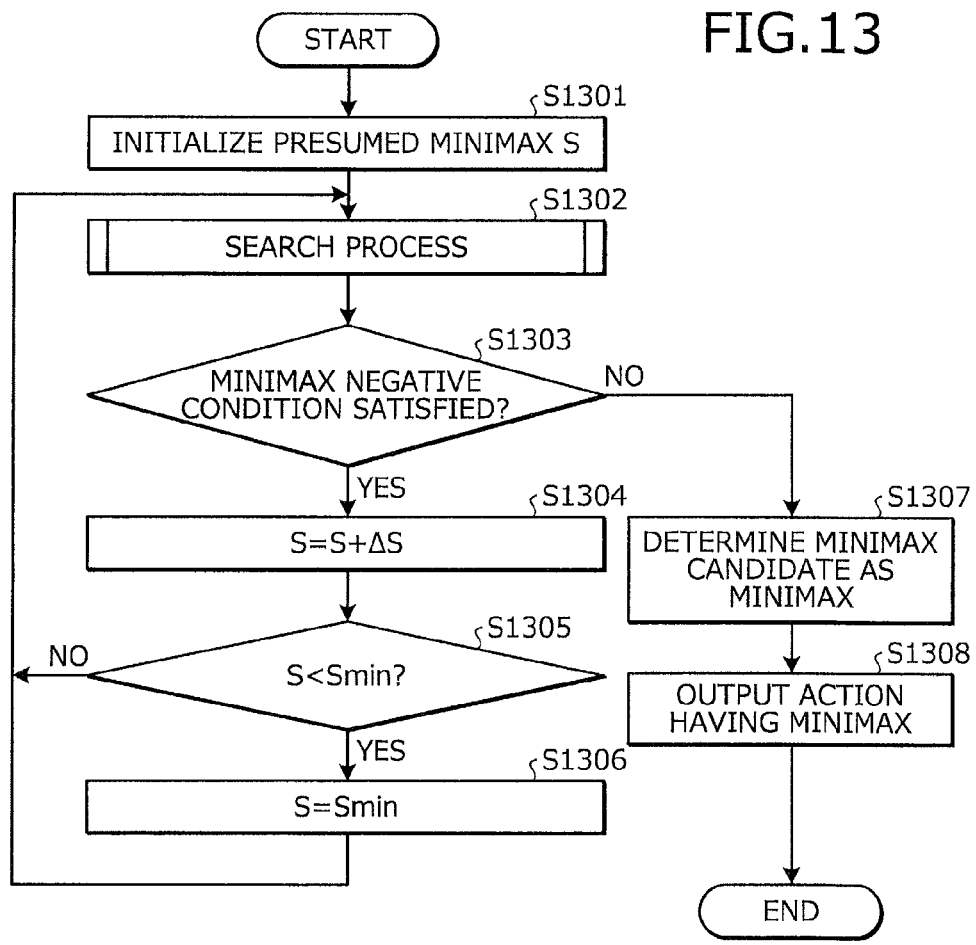
FIG. 13 is a flowchart of an example of minimax search process procedure by the calculator 402 according to the second embodiment.

FIG. 13 is a flowchart of an example of minimax search process procedure by the calculator 402 according to the second embodiment. First, the calculator 402 initializes the presumed minimax S (step S1301). As described above, the presumed minimax S is initialized to a value at a level enabling effective utilization of the pruning. The calculator 402 executes a search process (step S1302).

In the search process (step S1302), for each action, the maximum evaluation value Vjmax is searched for if the pruning does not occur, or the maximum evaluation value candidate VCjmax for is searched if the pruning occurs. The smallest maximum evaluation value Vjmax of the maximum evaluation values Vjmax is defined as the minimax candidate. Details of the search process (step S1302) will be described later with reference to FIG. 14.

The calculator 402 causes the judging unit 1106 to judge whether the minimax negative condition is satisfied (step S1303). In other words, it is determined whether pruning has occurred for all the actions. If the minimax negative condition is satisfied (step S1303: YES), this means that pruning has occurred for all the actions. In this case, the calculator 402 causes the adding unit 1110 to add the increase amount ΔS to the presumed minimax S.

The calculator 402 judges whether the presumed minimax lower limit Smin is larger than the presumed minimax S after the addition (step S1305). If the presumed minimax lower limit Smin is less than or equal to the presumed minimax S after the addition (step S1305: NO), the procedure goes to step S1302. In this case, the search process (step S1302) is executed again with the presumed minimax S after the addition.

On the other hand, if the presumed minimax lower limit Smin is larger than the presumed minimax S after the addition (step S1305: YES), the calculator 402 causes the updating unit 1112 to update the presumed minimax S to the presumed minimax lower limit Smin (step S1306). The procedure goes to step S1302. In this case, the search process (step S1302) is executed again with the presumed minimax S updated to the presumed minimax lower limit Smin. Therefore, the presumed minimax can be brought closer to the actual minimax and efficient pruning is performed.

If the minimax negative condition is not satisfied at step S1303 (step S1303: NO), the second determining unit 1107 determines the minimax candidate as the minimax (step S1307) and the output unit 1108 outputs the action having the minimax (step S1308). A sequence of the process is then terminated.

Figure 14:
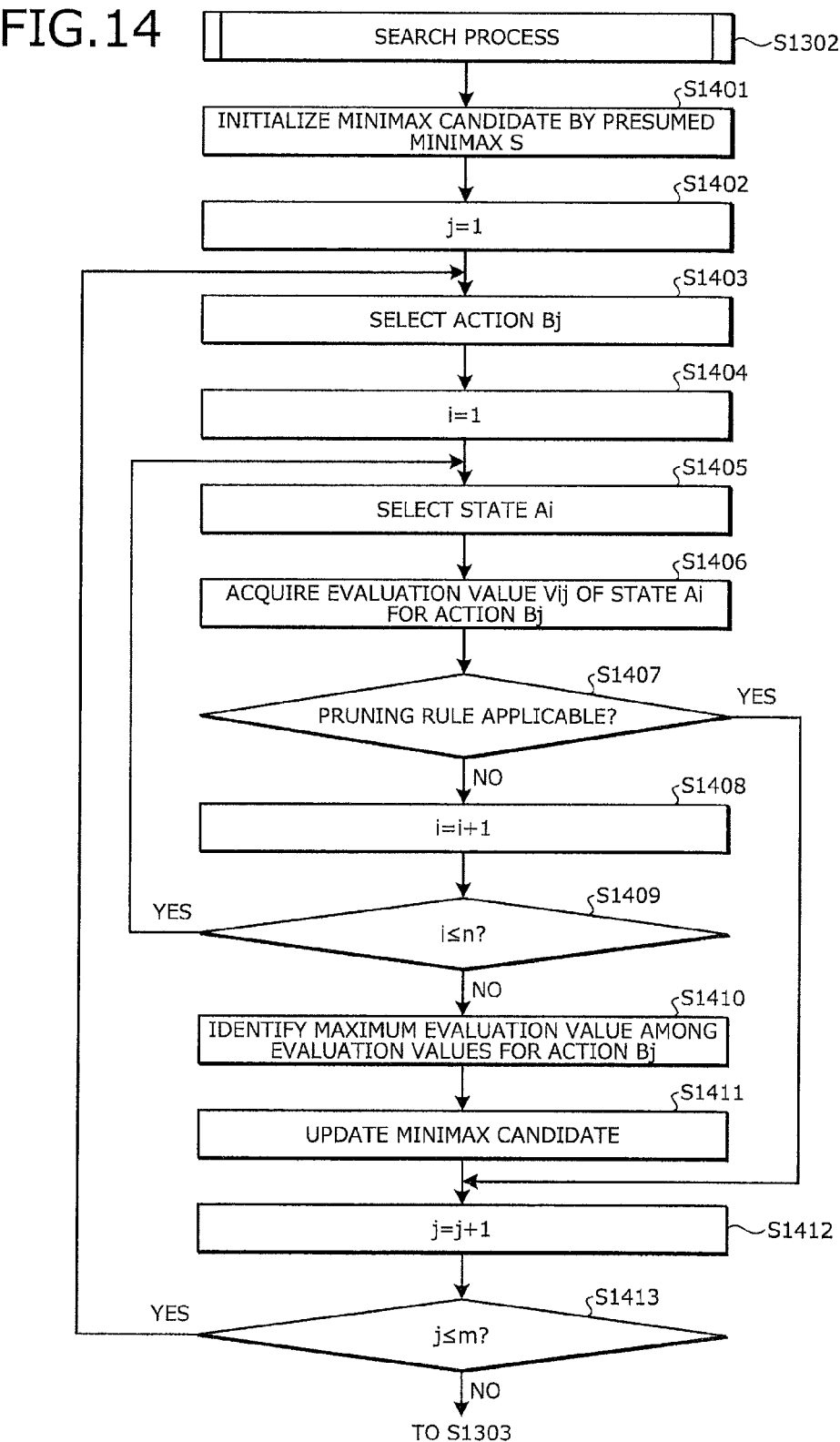
FIG. 14 is a flowchart of a detailed example of a process procedure of a search process (step S1302) depicted in FIG. 13.

FIG. 14 is a flowchart of a detailed example of a process procedure of the search process (step S1302) depicted in FIG. 13. Although the index j of the action Bj and the index i of the state Ai are incremented from one in the description of the example depicted in FIG. 14, the indexes may be decremented from n and m. Alternatively, the unselected action Bj and state Ai may randomly be selected. In the case of random selection, for example, a selection flag may be set at the selected positions Cij to prevent redundant selection.

If an action likely to be optimal is empirically known through heuristics, etc., the actions B1 to Bm may be given priority and selected in descending order of priority. As a result, if a nearly optimum minimax candidate is found, the subsequent evaluation of action can be performed efficiently. If a state is known that has high evaluation (high loss) for every action, the states A1 to An may be given priority and selected in descending order of priority. As a result, the worst state can be evaluated preferentially at an earlier timing to judge the actions that cannot be the minimax.

In FIG. 14, first, the calculator 402 initializes the minimax candidate by the presumed minimax S (step S1401). The calculator 402 sets the index j of the action Bj to j=1 (step S1402) and causes the selecting unit 1101 to select the action Bj (step S1403). The calculator 402 sets the index i of the state Ai to i=1 (step S1404) and causes the selecting unit 1101 to select the state Ai (step S1405). As a result, the position Cij is identified. The calculator 402 causes the acquiring unit 1102 to acquire the evaluation value Vij of the state Ai for the action Bj (step S1406). The acquired evaluation value Vij is stored at the position Cij of the search space T. If the evaluation value Vij is already acquired, this is not performed.

The calculator 402 causes the control unit 1104 to judge whether the pruning rule is applicable to the evaluation value Vij (step S1407). For example, it is judged whether the evaluation value Vij is greater than the presumed minimax S. If no action is already selected, the pruning rule is applied since the presumed minimax S is set.

If the pruning rule is not applicable (step S1407: NO), the calculator 402 causes the selecting unit 1101 to increment the index i of the state Ai (step S1408), and judges whether i≤n is satisfied (step S1409). If i≤n is satisfied (step S1409: YES), since an unselected Ai remains, the procedure returns to step S1405 and the calculator 402 causes the selecting unit 1101 to select the state Ai.

On the other hand, If i≤n is not satisfied (step S1409: NO), since the evaluation values of all the state A1 to An are acquired for the action Bj, the calculator 402 causes the identifying unit 1103 to identify the maximum evaluation value Vjmax among the evaluation values V1j to Vnj of the action Bj (step S1410). The identified maximum evaluation value Vjmax is stored in the search space T.

The calculator 402 updates the minimax candidate (step S1411). In other words, the calculator 402 causes the first determining unit 1105 to decide the minimum evaluation value in the maximum evaluation values as the minimax candidate if the minimum evaluation value in the maximum evaluation values acquired so far is smaller than the minimax candidate initialized at step S1401. The calculator 402 then increments the index j of the action Bj (step S1412).

On the other hand, if the pruning rule is applicable at step S1407 (step S1407: YES), the procedure goes to step S1412. In other words, the loop of steps S1408, S1409, and S1405 to S1407 and steps S1410 and S1411 are skipped. Therefore, wasteful calculations can be suppressed to accelerate the minimax search.

After step S1412, the calculator 402 judges whether j≤m is satisfied (step S1413). In other words, it is judged whether an unselected action Bj is present. If j≤m is satisfied (step S1413: YES), the procedure returns to step S1403 and the calculator 402 causes the selecting unit 1101 to select the action Bj. On the other hand, if j≤m is not satisfied (step S1413: NO), the procedure goes to step S1303 and it is judged whether the minimax negative condition is satisfied. A sequence of the process is then terminated.

Therefore, according to the second embodiment, since the presumed minimax S is set in advance, the minimax can be found efficiently without performing calculations for actions with poor evaluation until finding the pruning rule capable of the efficient search. For example, if the actual minimax or a sufficiently small value greater than or equal to the actual minimax is set as the initial value of the presumed minimax S, the acquisition of evaluation values of actions other than the actions to be selected can be terminated according to the pruning rule.

Therefore, according to the second embodiment, even without presupposed knowledge about setting of the initial value of the pruning rule, the minimax can efficiently be found by repeatedly executing the process of determining whether the presumed minimax S is the minimax at high speed.

(Third Embodiment)

A third embodiment will be described. The third embodiment is an example of executing the minimax search based on the presumed minimax S in parallel processing by using multiple calculators. The evaluation of the states Ai of the actions Bj is naturally performed in a distributed manner, and information useful for finding the minimax is also collected in a distributed manner and shared to utilize the information itself for collecting the information. As a result, an efficient search that can be realized with a single character can be implemented.

Even if an improper presumed minimax S is set for performing a search, a single calculator must execute processes of all the actions Bj and may be unable to collect information beneficial for finding the minimax. By utilizing multiple calculators, information useful for finding the minimax can be shared by the multiple calculators to execute the process for finding the useful information itself in a distributed manner. If a search is performed with improper settings, resetting to a more proper search can be performed by utilizing the information itself for collecting the information.

The main purpose of utilizing multiple calculators is to evaluate the states Ai in a distributed manner and to collect in a distributed manner and share a presumed minimax upper limit Smax indicative of the upper limit of the presumed minimax S and the presumed minimax lower limit Smin so as to improve collection efficiency and search the minimax in a comprehensive manner. The process of finding the minimax is not necessarily limited to one calculator, and the multiple calculators overall execute the process for finding the minimax.

<System Configuration Example>

Figure 15:
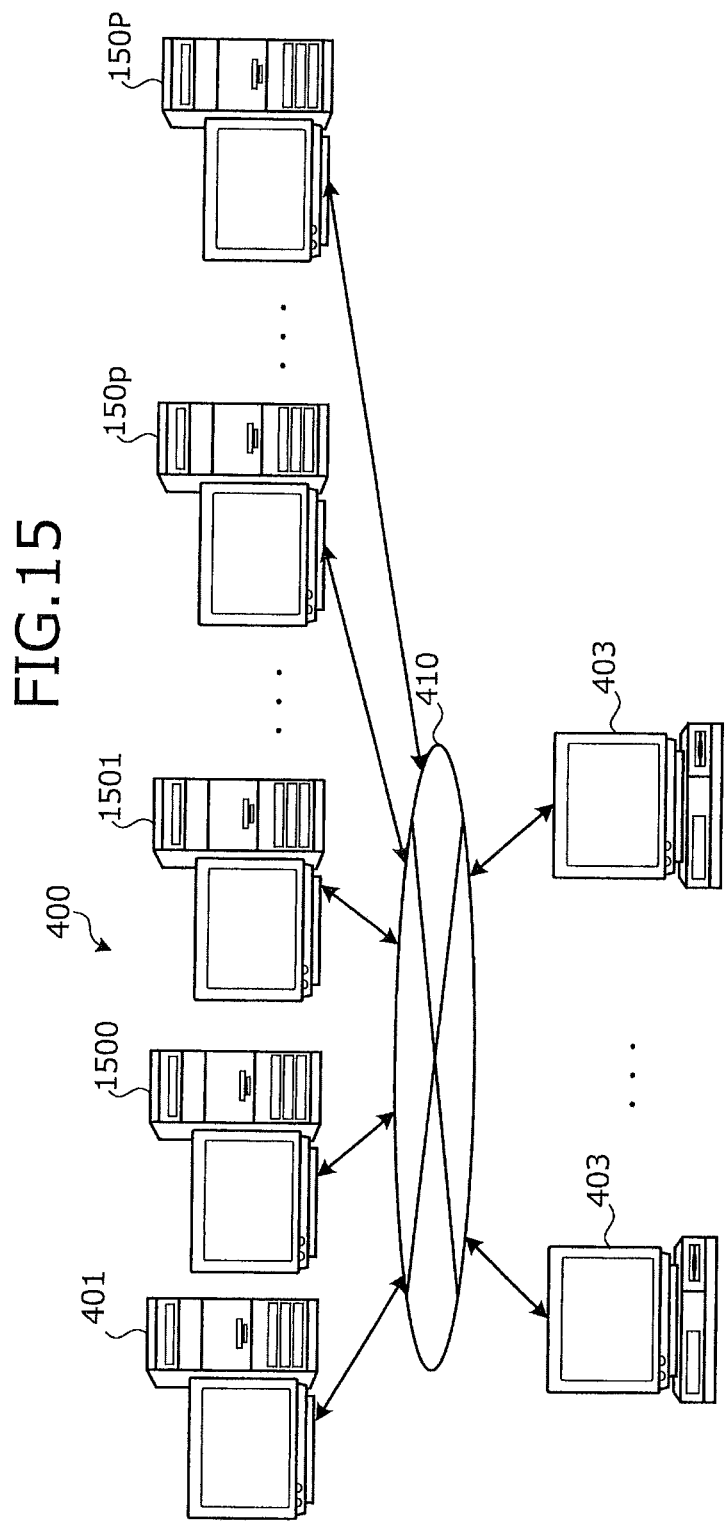
FIG. 15 is an explanatory view of a system configuration example of a calculator system according to a third embodiment.

FIG. 15 is an explanatory view of a system configuration example of a calculator system according to the third embodiment. The same constituent elements depicted in FIG. 4 are denoted by the same reference numerals used in FIG. 4 and will not be described. The calculator system has a calculator acting as a master (master calculator 1500) and multiple (P) calculators acting as slaves (slave calculators 1501 to 150P) connected to a network 410. The hardware configuration examples of the master calculator 1500 and the slave calculators 150p are the same as the first embodiment.

When a message of calculation termination (evaluation completion notification) is received from the slave calculators 1501 to 150P, the master calculator 1500 transmits the presumed minimax to the slave calculators 1501 to 150P to restart calculation. The communication between the master calculator 1500 and the slave calculator 150p is performed through one-to-one bidirectional communication (e.g., MPI_SEND/MPI_RECV) using the processor 504 of the master calculator 1500 and the processor 504 of the slave calculator 150p.

In the third embodiment, the master calculator 1500 manages the presumed minimax upper limit Smax, the presumed minimax lower limit Smin, and the evaluation values Vij of the states Ai for the actions Bj collected by the slave calculators 150P. The master calculator 1500 controls a setting range of the presumed minimax S with the presumed minimax upper limit Smax and the presumed minimax lower limit Smin, and resets the presumed minimax S in the course of a search such that the information collection efficiency is improved. As a result, the presumed minimax upper limit Smax and the presumed minimax lower limit Smin useful for finding the minimax can be collected. Therefore, the search efficiency is significantly improved as compared to the minimax search performed by a single calculator.

<Minimax Parallel Search Example>

A minimax parallel search example according to the third embodiment will be described in time series with reference to FIGS. 16 to 24. In FIGS. 16 to 24, by way of example, the number of slave calculators is P=2. As is the case with the first and second embodiments, the action count m=4 and the state count n=4 are used in the description. In the third embodiment, the slave calculators 150p have a search space T specified by an action Bj and a state Ai and the master calculator 1500 has an evaluation value table T0 storing the maximum evaluation value candidates VCjmax or the maximum evaluation value Vjmax for each action Bj. Although the slave calculators 150p are physical machines in this description, the slave calculators 150p may be presumed machines.

Figure 16:
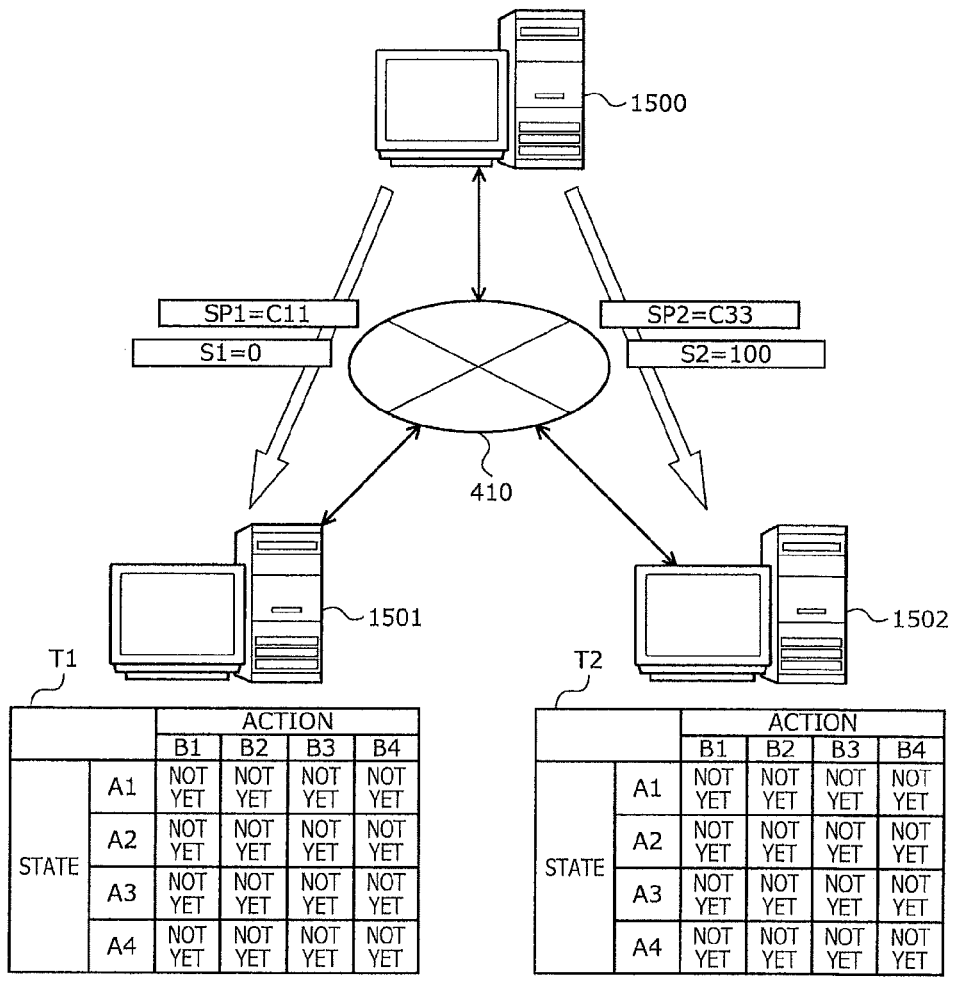
FIG. 16 is an explanatory view of a minimax parallel search example (part one) according to the third embodiment.

FIG. 16 is an explanatory view of the minimax parallel search example (part one) according to the third embodiment. In FIG. 16, the master calculator 1500 generates a search start position sequence {SPp}. The search start position sequence {SPp} is a data sequence having search start positions SPp arranged to the number P of the slave calculators 150p. It is noted that p is the number identifying the slave calculators 150p. The search start position SPp is the position Cij in the search space T and is different for each of the slave calculators 150p.

As described later in detail, the search start positions SPp are preferably arranged at regular intervals at diagonal positions of a search space Tp so as to avoid acquisition of the evaluation values Vij at the same positions Cij. In this example, the search start position sequence {SPp} has a search start position SP1 of the slave calculator 1501 and a search start position SP2 of the slave calculator 1502. By way of example, the search start position SP1 is a position C11 and the search start position SP2 is a position C33. The master calculator 1500 delivers the search start positions SP1 and SP2 to the respective slave calculators 1501 and 1502. The slave calculators 1501 and 1502 receive the respective search start positions SP1 and SP2. The slave calculators 1501 and 1502 acquire the evaluation values from the received search start positions.

The master calculator 1500 generates a presumed minimax sequence {Sp}. The presumed minimax sequence {Sp} is a data sequence having presumed minimaxes S arranged to the number P of the slave calculators 150p. It is noted that p is the number identifying the slave calculators. In this example, the presumed minimax sequence {Sp} has a presumed minimax S1 of the slave calculator 1501 and a presumed minimax S2 of the slave calculator 1502. S1≠S2 is satisfied.

As described later in detail, the master calculator 1500 is represented by an arithmetic progression having the presumed minimax Smin as a first term, the increase amount ΔS as an increment, and the number P of elements. In this example, P=2, S1=0, and S2=100 are used. The master calculator 1500 delivers the presumed minimaxes S1 and S2 to the respective slave calculators 1501 and 1502. The slave calculators 1501 and 1502 receive the respective presumed minimaxes S1 and S2. The evaluation values Bij are not yet acquired in the search spaces T1 and T2 of the slave calculators 1501 and 1502.

Figure 17:
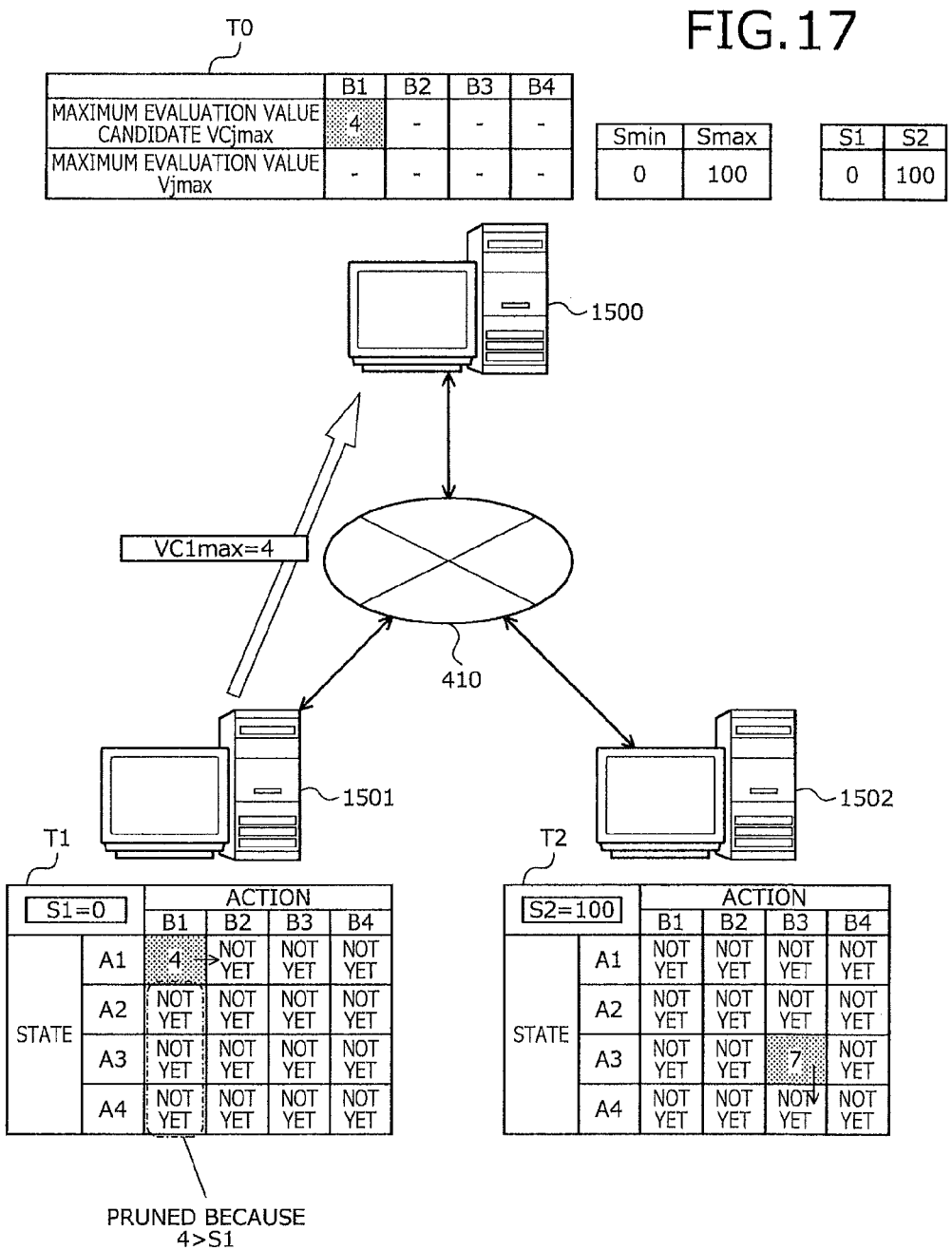
FIG. 17 is an explanatory view of the minimax parallel search example (part two) according to the third embodiment.

FIG. 17 is an explanatory view of the minimax parallel search example (part two) according to the third embodiment. In FIG. 17, the slave calculator 1501 acquires the evaluation value Vij from the received search start position SP1=C11. In this example, the evaluation value V11=4 of the position C11 is acquired. Since the evaluation value V11=4 is larger than the received presumed minimax S1, the pruning rule is applied. Therefore, the evaluation of the states A2 to A4 for the action B1 is skipped and states are selected in order from the state A1 for the action B2.

Because of the termination of evaluation for the action B1, the slave calculator 1501 transmits the evaluation value V11=4 at the time of occurrence of the pruning as the maximum evaluation value candidate VC1max for the action B1 to the master calculator 1500. The master calculator 1500 receives and writes the maximum evaluation value candidate VC1max=4 from the slave calculator 1501 into the evaluation value table T0.

The slave calculator 1502 similarly acquires the evaluation value Vij from the received search start position SP2=C33. In this example, the evaluation value V33=7 of the position C33 is acquired. Since the evaluation value V33=7 is less than or equal to the received presumed minimax S2, the pruning rule is not applied. Therefore, the next state A4 is selected to perform the evaluation of the state A4 for the action B3.

Figure 18:
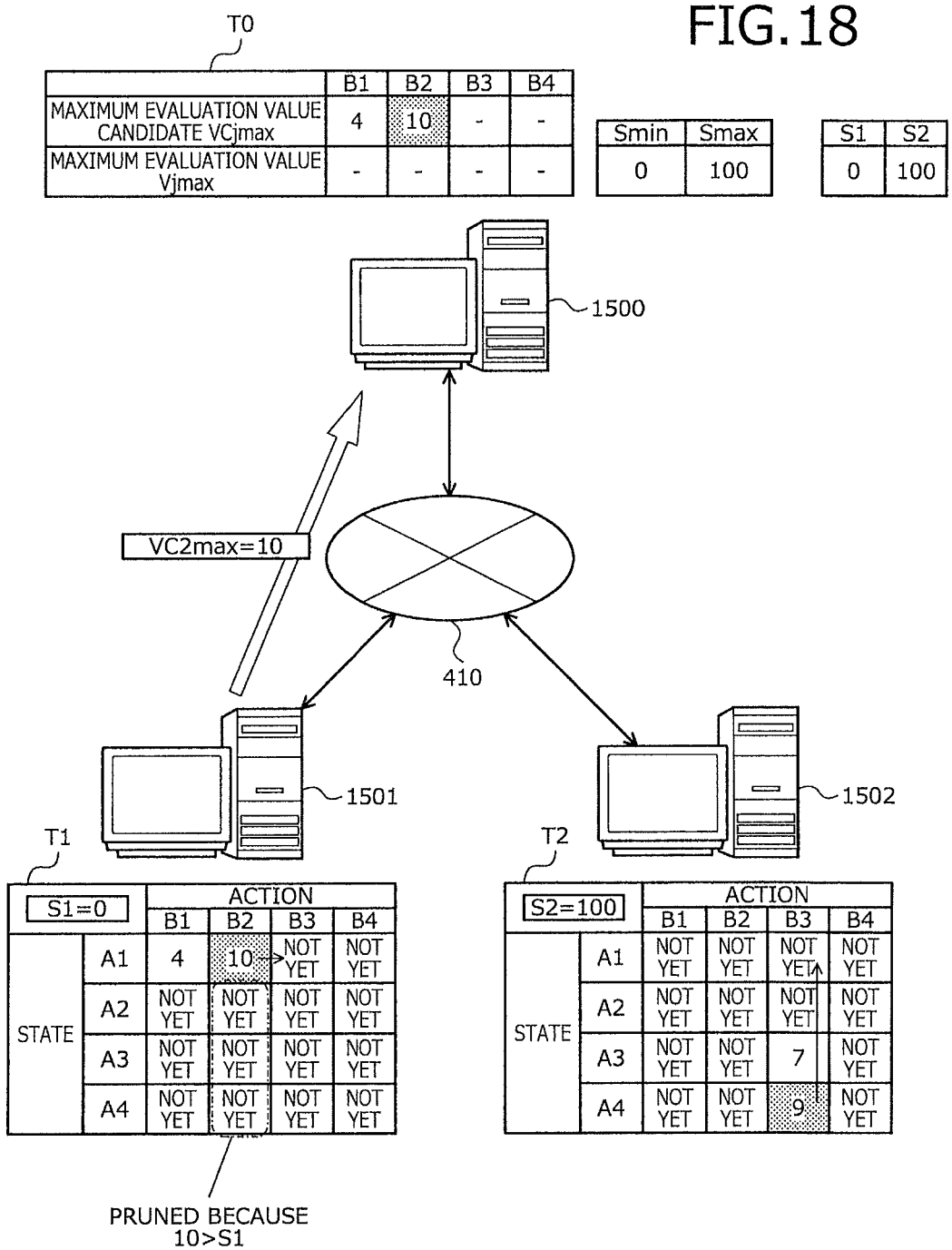
FIG. 18 is an explanatory view of the minimax parallel search example (part three) according to the third embodiment.

FIG. 18 is an explanatory view of the minimax parallel search example (part three) according to the third embodiment. In FIG. 18, because of the termination of the evaluation for the action B1 due to the pruning, the slave calculator 1501 acquires the evaluation value Vij from the position C12. In this example, the evaluation value V12=10 of the position C12 is acquired. Since the evaluation value V12=10 is larger than the presumed minimax S1, the pruning rule is applied. Therefore, the evaluation of the states A2 to A4 for the action B2 is skipped and states are selected in order from the state A1 for the action B3.

Because of the termination of evaluation for the action B2, the slave calculator 1501 transmits the evaluation value V12=10 at the time of occurrence of the pruning as the maximum evaluation value candidate VC2max for the action B2 to the master calculator 1500. The master calculator 1500 receives and writes the maximum evaluation value candidate VC2max=10 from the slave calculator 1501 into the evaluation value table T0.

The slave calculator 1502 acquires the evaluation value V43=9 of the state A4 selected for the action B3. Since the evaluation value V43=9 is less than or equal to the presumed minimax S2, the pruning rule is not applied. Therefore, the next state A1 is selected to perform the evaluation of the state A1 for the action B3.

Figure 19:
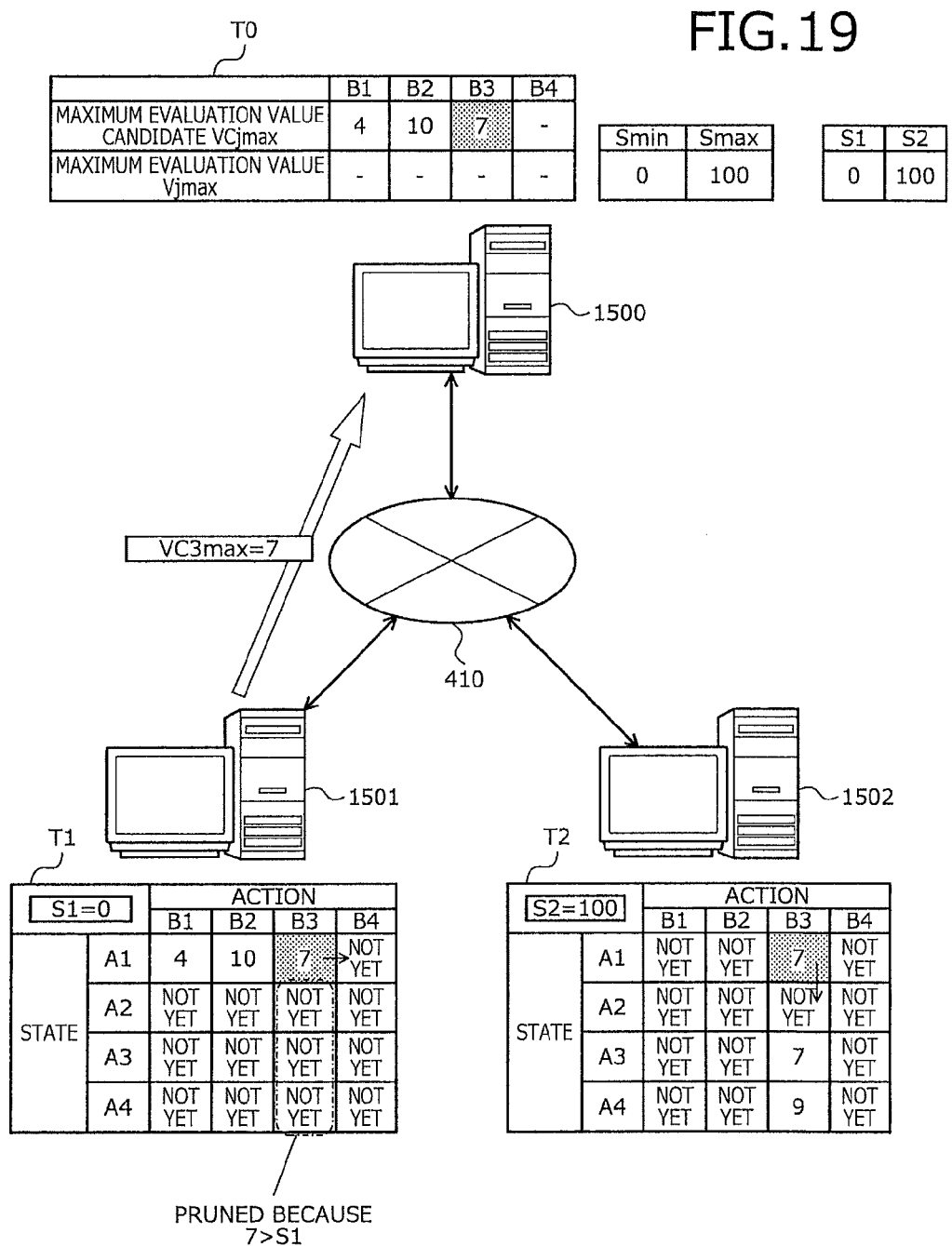
FIG. 19 is an explanatory view of the minimax parallel search example (part four) according to the third embodiment.

FIG. 19 is an explanatory view of the minimax parallel search example (part four) according to the third embodiment. In FIG. 19, because of the termination of the evaluation for the action B2 due to the pruning, the slave calculator 1501 acquires the evaluation value Vij from the position C13. In this example, the evaluation value V13=7 of the position C13 is acquired. Since the evaluation value V13=7 is larger than the presumed minimax S1, the pruning rule is applied. Therefore, the evaluation of the states A2 to A4 for the action B3 is skipped and states are selected in order from the state A1 for the action B4.

Because of the termination of evaluation for the action B3, the slave calculator 1501 transmits the evaluation value V13=7 at the time of occurrence of the pruning as the maximum evaluation value candidate VC3max for the action B3 to the master calculator 1500. The master calculator 1500 receives and writes the maximum evaluation value candidate VC3max=7 from the slave calculator 1501 into the evaluation value table T0.

The slave calculator 1502 acquires the evaluation value V13=7 of the state A1 selected for the action B3. Since the evaluation value V13=7 is less than or equal to the presumed minimax S2, the pruning rule is not applied. Therefore, the next state A2 is selected to perform the evaluation of the state A2 for the action B3.

Figure 20:
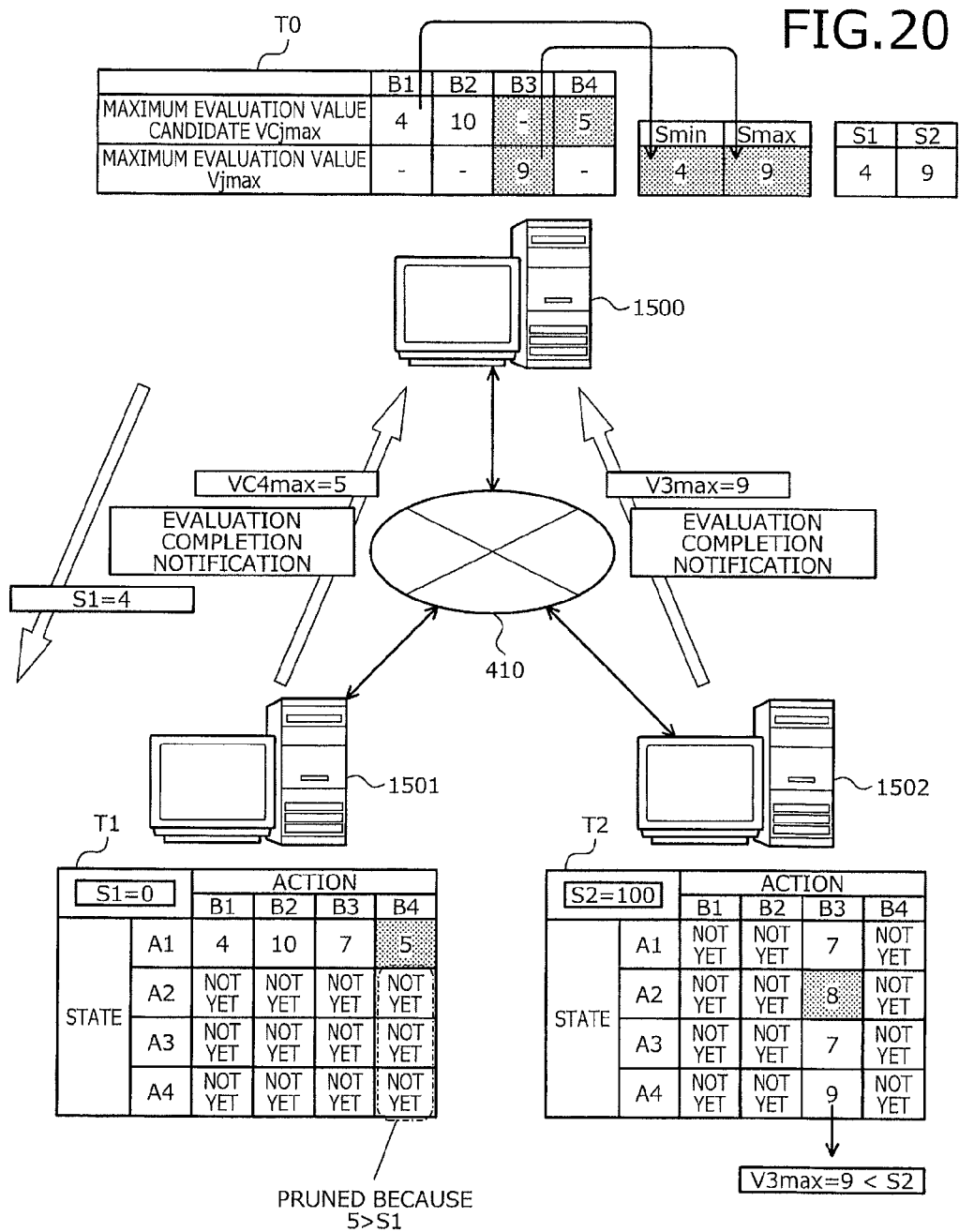
FIG. 20 is an explanatory view of the minimax parallel search example (part five) according to the third embodiment.

FIG. 20 is an explanatory view of the minimax parallel search example (part five) according to the third embodiment. In FIG. 20, because of the termination of the evaluation for the action B1 due to the pruning, the slave calculator 1501 acquires the evaluation value Vij from the position C14. In this example, the evaluation value V14=5 of the position C14 is acquired. Since the evaluation value V14=5 is larger than the presumed minimax S1, the pruning rule is applied. Therefore, the evaluation of the states A2 to A4 for the action B4 is skipped.

Because of the termination of evaluation for the action B4, the slave calculator 1501 transmits the evaluation value V14=5 at the time of occurrence of the pruning as the maximum evaluation value candidate VC4max for the action B4 to the master calculator 1500. The master calculator 1500 receives and writes the maximum evaluation value candidate VC4max=5 from the slave calculator 1501 into the evaluation value table T0. Since the evaluation has been terminated for all the actions B1 to B4, the slave calculator 1501 transmits evaluation completion notification to the master calculator 1500.

The slave calculator 1502 acquires the evaluation value V23=8 of the state A2 selected for the action B3. Since the evaluation value V23=8 is less than or equal to the presumed minimax S2, the pruning rule is not applied. Since an unselected state no longer exists for the action B3, the maximum evaluation value V3max=9 for the action B3 is transmitted to the master calculator 1500. The master calculator 1500 writes the received maximum evaluation value V3max=9 for the action B3 into the evaluation value table T0. As a result, the maximum evaluation value V3max=9 is determined for the action B3. Since the maximum evaluation value V3max=9 is acquired for the action B3, the slave calculator 1502 transmits evaluation completion notification of calculation to the master calculator 1500.

The master calculator 1500 updates the presumed minimax sequence {Sp} in response to the evaluation completion notification received first from the slave calculator 1501. For example, the master calculator 1500 refers to the evaluation value table T0 to update the presumed minimax lower limit Smin to the smallest value among the maximum evaluation value candidates. In this example, VC1max=4 is defined as the presumed minimax lower limit Smin. The master calculator 1500 refers to the evaluation value table T0 to update the presumed minimax upper limit Smax to the smallest value among the maximum evaluation values. In this example, V3max=9 is defined as the presumed minimax upper limit Smax.

The master calculator 1500 then uses the updated presumed minimax lower limit Smin and presumed minimax upper limit Smax to regenerate the presumed minimax sequence {Sp}. As a result, the presumed minimax S1=4 and the presumed minimax S2=9 are defined. The master calculator 1500 transmits the updated presumed minimax S1=4 to the slave calculator 1501. Although the master calculator 1500 has accepted the evaluation completion notification from the slave calculator 1502 at this time point, it is assumed that the presumed minimax S2 is not yet transmitted because of a wait state.

Figure 21:
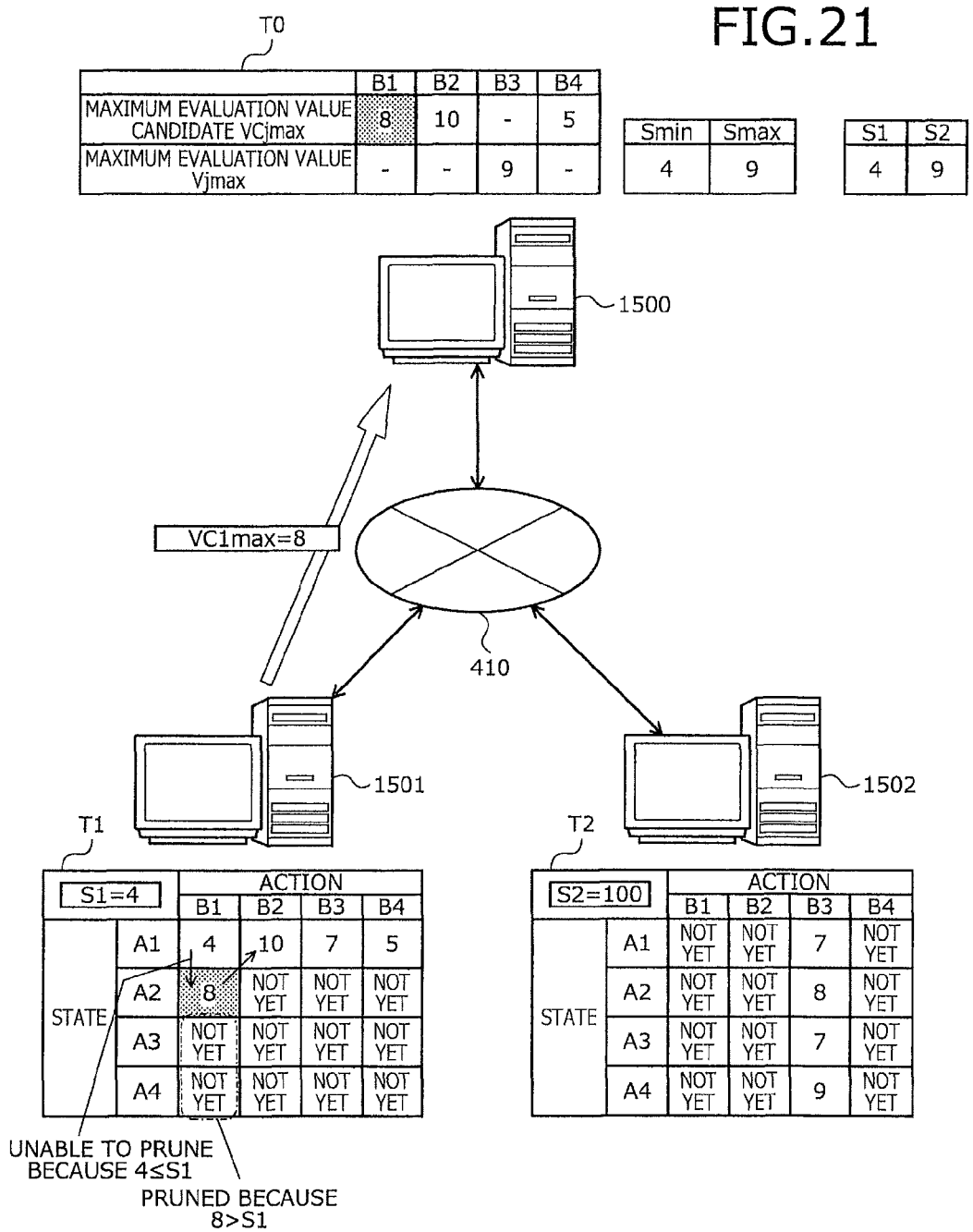
FIG. 21 is an explanatory view of the minimax parallel search example (part six) according to the third embodiment.

FIG. 21 is an explanatory view of the minimax parallel search example (part six) according to the third embodiment. In FIG. 21, the slave calculator 1501 uses the presumed minimax S1 newly transmitted from the master calculator 1500 to perform evaluation from the search start position SP1. Since the evaluation value V11 of the position C11 is V11=4 and the evaluation value V11=4 is the same as the received presumed minimax S1=4, the pruning rule is not applied.

Therefore, the next state A2 is selected to perform the evaluation of the state A2 for the action B1. It is assumed that the evaluation value V21=8 of the state A2 for the action B1 is acquired. Since the evaluation value V21=8 is larger than the presumed minimax S1=4, the pruning rule is applied. Therefore, the evaluation of the states A3 and A4 for the action B1 is skipped and states are selected in order from the state A1 for the action B2.

Because of the termination of evaluation for the action B1, the slave calculator 1501 transmits the evaluation value V21=8 at the time of occurrence of the pruning as the maximum evaluation value candidate VC1max for the action B1 to the master calculator 1500. The master calculator 1500 receives and writes the maximum evaluation value candidate VC1max=8 from the slave calculator 1501 into the evaluation value table T0.

Figure 22:
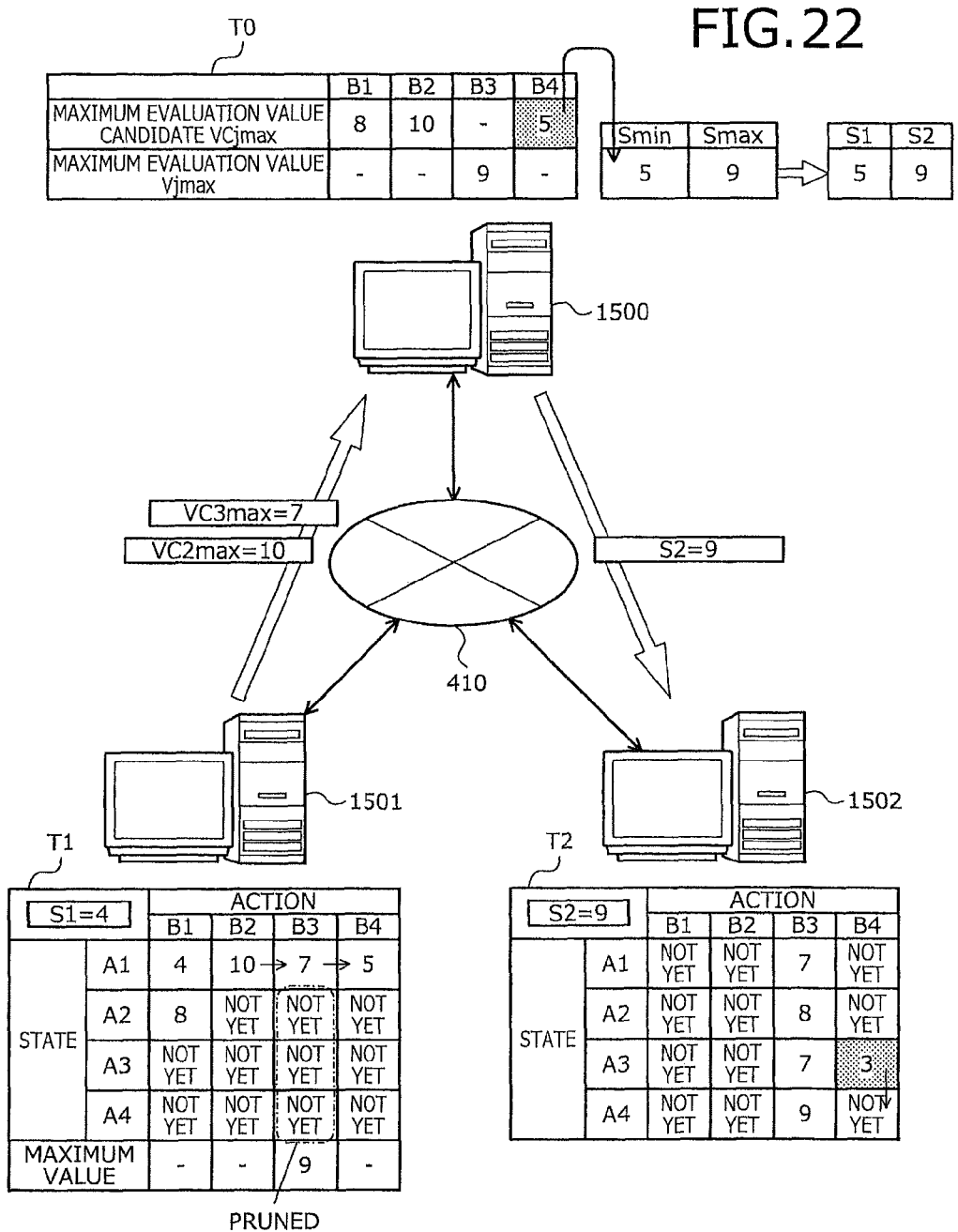
FIG. 22 is an explanatory view of the minimax parallel search example (part seven) according to the third embodiment.

FIG. 22 is an explanatory view of the minimax parallel search example (part seven) according to the third embodiment. In FIG. 22, because of the termination of the evaluation for the action B1 due to the pruning, the slave calculator 1501 acquires the evaluation value Vij from the position C12. In this example, since the evaluation value V12=10 of the position C12 is acquired and is larger than the presumed minimax S1=4, the pruning rule is applied. Therefore, the evaluation of the states A2 to A4 for the action B2 is skipped and states are selected in order from the state A1 for the action B3.

Because of the termination of evaluation for the action B2, the slave calculator 1501 transmits the evaluation value V12=10 at the time of occurrence of the pruning as the maximum evaluation value candidate VC2max for the action B2 to the master calculator 1500. The master calculator 1500 receives and writes the maximum evaluation value candidate VC2max=10 from the slave calculator 1501 into the evaluation value table T0.

Because of the termination of the evaluation for the action B2 due to the pruning, the slave calculator 1501 acquires the evaluation value Vij from the position C13. In this example, since the evaluation value V13=7 of the position C13 is acquired and is larger than the presumed minimax S1=4, the pruning rule is applied. Therefore, the evaluation of the states A2 to A4 for the action B3 is skipped and states are selected in order from the state A1 for the action B4.

Because of the termination of evaluation for the action B3, the slave calculator 1501 transmits the evaluation value V13=7 at the time of occurrence of the pruning, as the maximum evaluation value candidate VC3max for the action B3 to the master calculator 1500. Although the master calculator 1500 receives the maximum evaluation value candidate VC3max=7 from the slave calculator 1501, the maximum evaluation value V3max of the action B3 is already determined as "9" and therefore, the master calculator 1500 does not write the maximum evaluation value candidate any more.

The master calculator 1500 updates the presumed minimax sequence {Sp} in response to the evaluation completion notification from the slave calculator 1502 forced to wait. For example, the master calculator 1500 refers to the evaluation value table T0 to update the presumed minimax lower limit Smin to the smallest value among the maximum evaluation value candidates. In the case of this example, VC4max=5 is defined as the presumed minimax lower limit Smin. The master calculator 1500 refers to the evaluation value table T0 to update the presumed minimax upper limit Smax to the smallest value among the maximum evaluation values. In the case of this example, the maximum evaluation value V3max=9 is defined as the presumed minimax upper limit Smax.

The master calculator 1500 then uses the updated presumed minimax lower limit Smin and presumed minimax upper limit Smax to regenerate the presumed minimax sequence {Sp}. As a result, the presumed minimax S1=5 and the presumed minimax S2=9 are defined. The master calculator 1500 transmits the updated presumed minimax S2=9 to the slave calculator 1502. Since the master calculator 1500 has not yet received the evaluation completion notification from the slave calculator 1501 at this time point, the presumed minimax S1=5 is not transmitted to the slave calculator 1501.

Upon receiving the presumed minimax S2=9, the slave calculator 1502 starts the evaluation from the search start position SP2. Since the evaluation for the action B3 at the search start position SP2=C33 has been terminated, the evaluation is started from the state A3 for the action B4.

The slave calculator 1502 acquires the evaluation value V34=3 of the state A3 selected for the action B4. Since the evaluation value V34=3 is less than or equal to the presumed minimax S2=9, the pruning rule is not applied. Therefore, the next state A4 is selected to perform the evaluation of the state A4 for the action B4.

Figure 23:
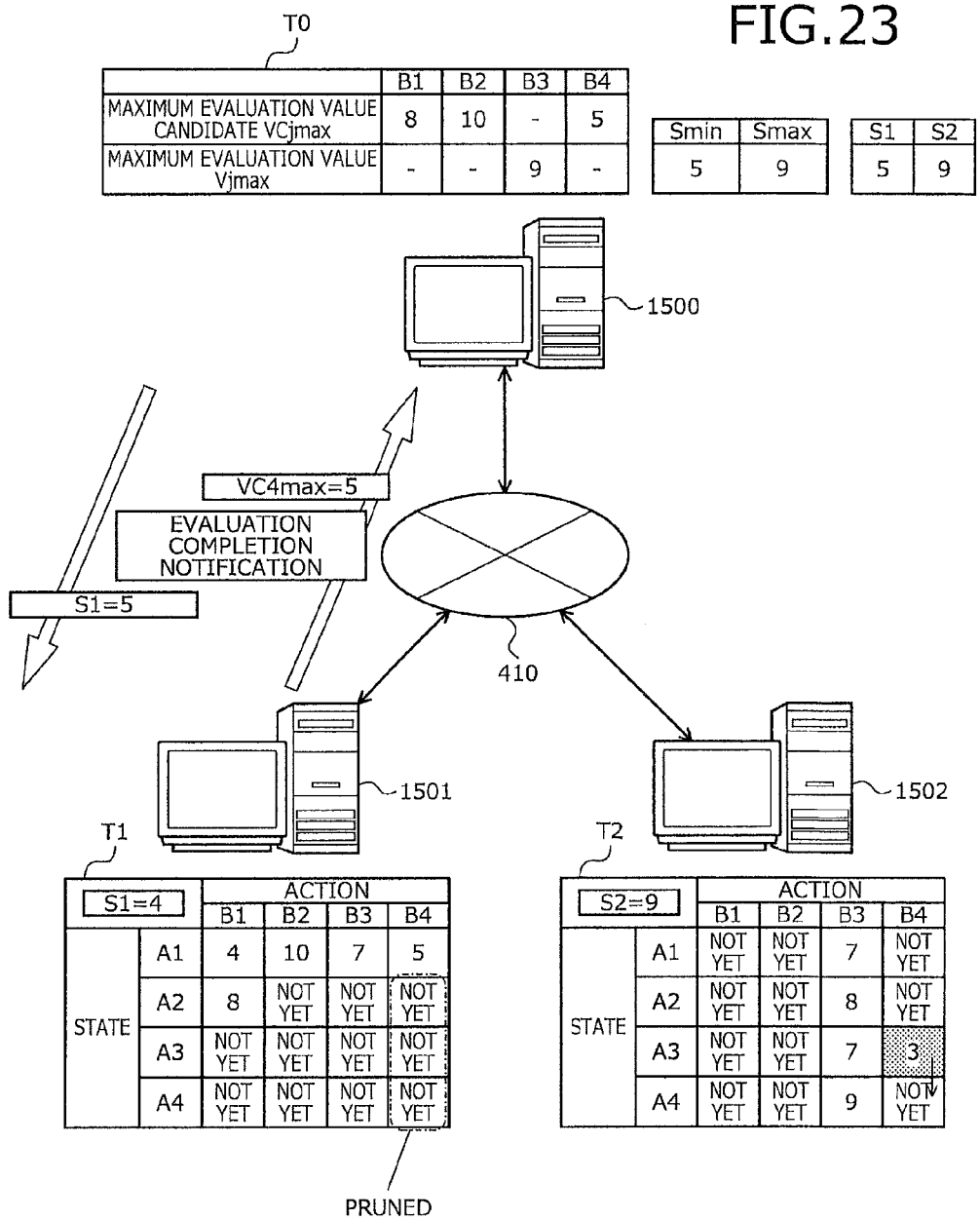
FIG. 23 is an explanatory view of the minimax parallel search example (part eight) according to the third embodiment.

FIG. 23 is an explanatory view of the minimax parallel search example (part eight) according to the third embodiment. In FIG. 23, because of the termination of the evaluation for the action B3 due to the pruning, the slave calculator 1501 acquires the evaluation value Vij from the position C14. In this example, since the evaluation value V14=5 of the position C14 is acquired and is larger than the presumed minimax S1=4, the pruning rule is applied. Therefore, the evaluation of the states A2 to A4 for the action B4 is skipped.

Because of the termination of evaluation for the action B4, the slave calculator 1501 transmits the evaluation value V14=5 at the time of occurrence of the pruning as the maximum evaluation value candidate VC4max for the action B4 to the master calculator 1500. The master calculator 1500 receives and writes the maximum evaluation value candidate VC4max=5 from the slave calculator 1501 into the evaluation value table T0. Since the evaluation has been terminated for all the actions B1 to B4, the slave calculator 1501 transmits an evaluation completion notification to the master calculator 1500.

The master calculator 1500 updates the presumed minimax sequence {Sp} in response to the evaluation completion notification received from the slave calculator 1501. For example, the master calculator 1500 refers to the evaluation value table T0 to update the presumed minimax lower limit Smin to the smallest value among the maximum evaluation value candidates. In the case of this example, VC4max=5 is defined as the presumed minimax lower limit Smin. The master calculator 1500 refers to the evaluation value table T0 to update the presumed minimax upper limit Smax to the smallest value among the maximum evaluation values. In the case of this example, the maximum evaluation value V3max=9 is defined as the presumed minimax upper limit Smax.

The master calculator 1500 then uses the updated presumed minimax lower limit Smin and presumed minimax upper limit Smax to regenerate the presumed minimax sequence {Sp}. As a result, the presumed minimax S1=5 and the presumed minimax S2=9 are defined. The master calculator 1500 transmits the updated presumed minimax S1=5 to the slave calculator 1501. Since the master calculator 1500 does not yet accept the evaluation completion notification from the slave calculator 1502 at this time point, the presumed minimax S2 is not transmitted.

Figure 24:
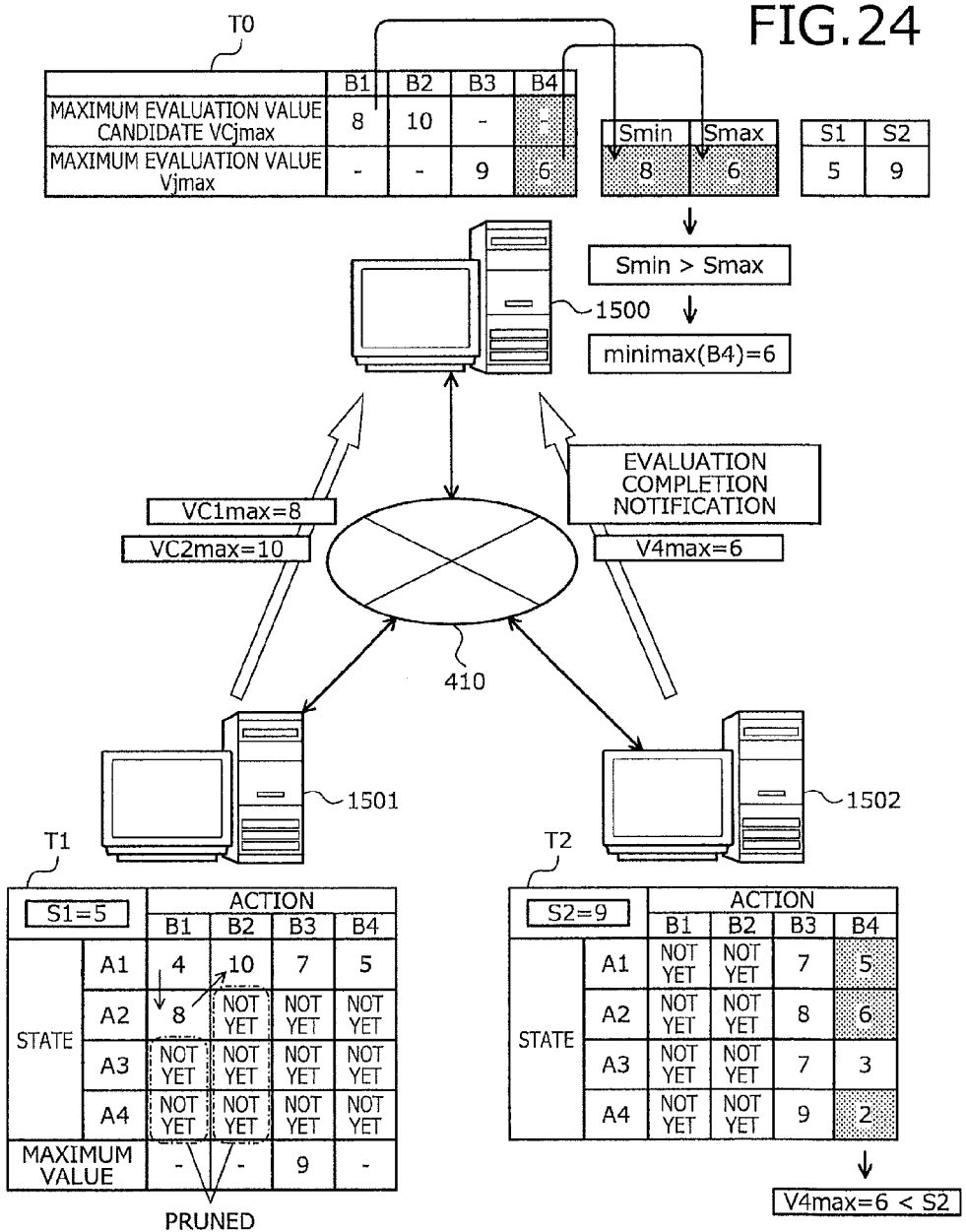
FIG. 24 is an explanatory view of the minimax parallel search example (part nine) according to the third embodiment.

FIG. 24 is an explanatory view of the minimax parallel search example (part nine) according to the third embodiment. In FIG. 24, the slave calculator 1501 acquires the evaluation value Vij from the search start position SP1=C11. Since the presumed minimax S1 is S1=5 at this time point, the states A3 and A4 for the action B1 and the states A2 to A4 for the action B3 are pruned in the slave calculator 1501. Therefore, the slave calculator 1501 transmits the maximum evaluation value candidates VC1max=8 and VC2max=10 to the master calculator 1500. As a result, the evaluation value table T0 is updated.

On the other hand, the slave calculator 1502 selects the state A4 for the action B4 and acquires the evaluation value V44=2. Since the evaluation value V44=2 is less than or equal to the presumed minimax S2=9, the pruning rule is not applied. The slave calculator 1502 selects the next state A1 for the action B4 and acquires the evaluation value V14=5. Since the evaluation value V14=5 is less than or equal to the presumed minimax S2=9, the pruning rule is not applied.

The slave calculator 1502 selects the next state A2 for the action B4 and acquires the evaluation value V24=6. Since the evaluation value V24=6 is less than or equal to the presumed minimax S2=9, the pruning rule is not applied. As a result, the evaluation for the action B4 is terminated and, since the maximum evaluation value V4max=V24=6 is acquired, the slave calculator 1502 transmits the maximum evaluation value V4max=6 and the evaluation completion notification to the master calculator 1500.

The master calculator 1500 updates the presumed minimax sequence {Sp} in response to the evaluation completion notification from the slave calculator 1502. For example, the master calculator 1500 refers to the evaluation value table T0 to update the presumed minimax lower limit Smin to the smallest value among the maximum evaluation value candidates. In the case of this example, VC1max=8 is defined as the presumed minimax lower limit Smin. The master calculator 1500 refers to the evaluation value table T0 to update the presumed minimax upper limit Smax to the smallest value among the maximum evaluation values. In the case of this example, V4max=6 is defined as the presumed minimax upper limit Smax.

In this case, because of Smin>Smax, the master calculator 1500 does not update the presumed minimaxes S1 and S2 and determines the smallest value among the maximum evaluation values in the evaluation table T0 as the minimax. In this example, the maximum evaluation value V4max=6 of the action B4 is determined as the minimax. As a result, it is found that the optimum action is the action B4 and that the minimax is "6". Lastly, the master calculator 1500 transmits evaluation completion notification to the slave calculators 1501 and 1502 performing the evaluation and the evaluation is terminated in the slave calculators 1501 and 1502.

Although no search space is shared by the master calculator 1500 and the slave calculators 1501 to 150p in the case taken as an example in the description, a search space may be shared by the master calculator 1500 and the slave calculators 1501 to 150p. In this case, the memory apparatus 501 of the master calculator 1500 further retains the search space, and the slave calculator 150p writes a calculated evaluation value Vij into the search spaces of the master calculator 1500 and the other slave calculators through remote direct memory access (RDMA).

<Functional Configuration Example of Slave Calculator>

Figure 25:
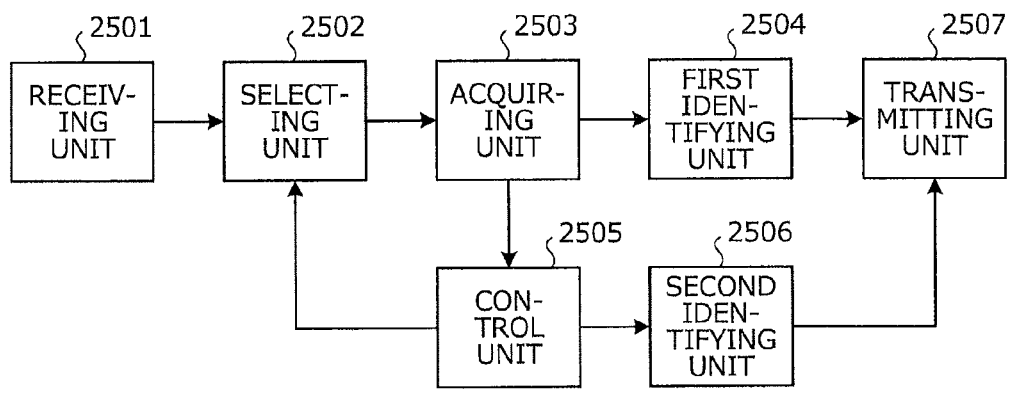
FIG. 25 is a block diagram of a functional configuration example of a slave calculator 150p according to the third embodiment.

FIG. 25 is a block diagram of a functional configuration example of the slave calculator 150p according to the third embodiment. The slave calculator 150p includes a receiving unit 2501, a selecting unit 2502, an acquiring unit 2503, a first identifying unit 2504, a control unit 2505, a second identifying unit 2506, and a transmitting unit 2507. For example, the functions of the receiving unit 2501 to the transmitting unit 2507 are implemented by causing the processor 504 to execute a program stored in the memory apparatus 501 depicted in FIG. 5. The selecting unit 2502, the acquiring unit 2503, the first identifying unit 2504, and the controlling unit 2505 are the same as the selecting unit 1101, the acquiring unit 1102, the identifying unit 1103, and the control unit 1104 of the second embodiment and therefore will not be described.

The receiving unit 2501 receives the presumed minimax having a start position specified by an action and state in the search space Tp stored in the memory apparatus 501 and the presumed minimax having an arbitrary value from the master calculator 1500. For example, the receiving unit 2501 receives a search start position SPp generated by the master calculator 1500. For example, in the case of the slave calculator 1501, the search start position SP1=C11 is received. As a result, the selecting unit 2502 performs the evaluation from the search start position SPp.

The receiving unit 2501 receives the presumed minimax Sp acquired by the master calculator 1500. The presumed minimax Sp is received at the start of search and if the evaluation completion notification is transmitted from the slave calculator 150p.

If the selection for the currently selected action has been terminated, the second identifying unit 2506 identifies an evaluation value at the time of occurrence of termination as the maximum evaluation value candidate for the currently selected action. For example, as depicted in FIG. 17, since the pruning occurs at the evaluation value V11 of the state A1 for the action B1 in the slave calculator 1501, the evaluation value V11 is identified as the maximum evaluation value candidate VC1max of the action B1.

The transmitting unit 2507 transmits a maximum evaluation value or a maximum evaluation value candidate identified for the currently selected action to the master calculator 1500. For example, as depicted in FIG. 20, since the maximum evaluation value V3max=9 is identified for the action B3 in the slave calculator 1502, the maximum evaluation value V3max=9 is transmitted to the master calculator 1500. As depicted in FIG. 17, since the maximum evaluation value candidate V1max=4 is identified in the slave calculator 1501, the maximum evaluation value candidate V1max=4 is transmitted to the master calculator 1500.

If a maximum evaluation value of any action is acquired or if the maximum evaluation value candidates of the actions are acquired, the transmitting unit 2507 transmits the evaluation completion notification to the master calculator 1500. For example, as depicted in FIG. 20, since the maximum evaluation value V3max=9 is identified for the action B3 in the slave calculator 1502, the evaluation completion notification is transmitted to the master calculator 1500. As depicted in FIG. 20, since the maximum evaluation value candidates VC1max to VC4max of all the actions B1 to B4 are identified in the slave calculator 1501, the evaluation completion notification is transmitted to the master calculator 1500.

<Functional Configuration Example of Master Calculator 1500>

Figure 26:
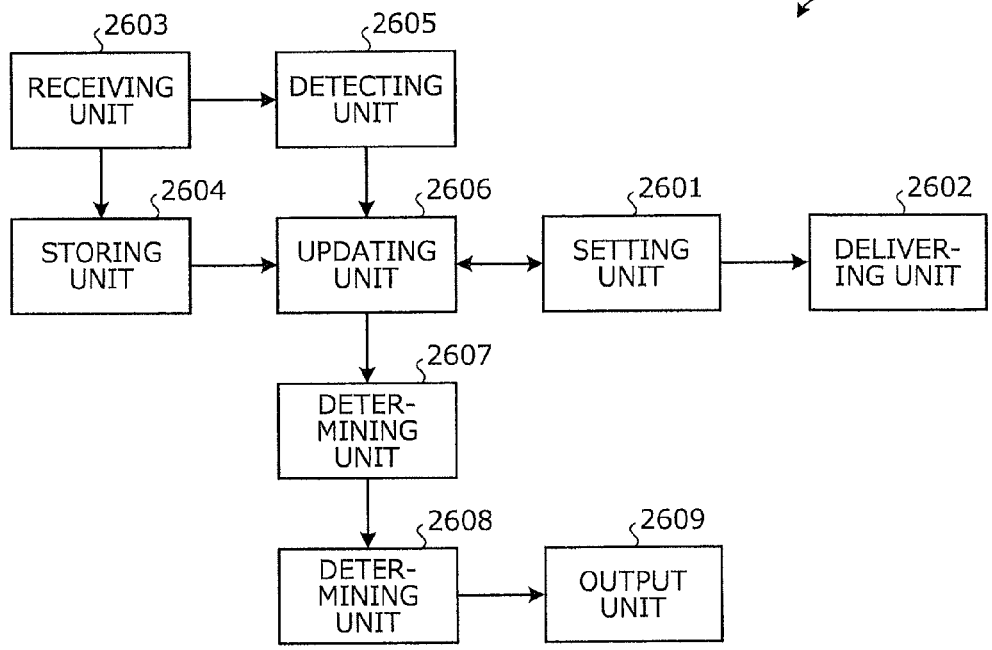
FIG. 26 is a block diagram of a functional configuration example of a master calculator 1500 according to the third embodiment.

FIG. 26 is a block diagram of a functional configuration example of the master calculator 1500 according to the third embodiment. The master calculator 1500 includes a setting unit 2601, a delivering unit 2602, a receiving unit 2603, a storing unit 2604, a detecting unit 2605, an updating unit 2606, a determining unit 2607, a determining unit 2608, and an output unit 2609. For example, the functions of the setting unit 2601 to the output unit 2609 are implemented by causing the processor 504 to execute a program stored in the memory apparatus 501 depicted in FIG. 5.

The setting unit 2601 sets differently for each of the slave calculators 150p, a start position specified by an action and state in the search space Tp enabling specification of each state of the state set for each action of the action set. The start positions SPp may randomly be decided given that the start positions SPp differ from each other.

The setting unit 2601 may set a different start position for each slave calculator based on the number P of the slave calculators. For example, the actions B1 to Bm in the search space Tp are divided by P and the states A1 to An are divided by P. Any position Cij in a divided block is allocated to each of the slave calculators 150p.

For example, in the example of FIG. 16, since P=2, the actions B1 to B4 are divided into two parts and the states A1 to A4 are divided into two parts. The setting unit 2601 sets, for example, the position C11 as the search start position SP1 from the block of the actions B1, B2 and the states A1, A2 and sets, for example, the position C33 as the search start position SP2 from the block of the actions B3, B4 and the states A3, A4.

The overlapping evaluation at the same position between the slave calculators can be reduced by disposing a search start position sequence in a diagonal direction as in the case of the positions C11 and C33. If a diagonal direction is used, the positions C22 and C44 may also be available along with the combination of the positions C11 and C33. Since the possibility of overlapping evaluation increases if an interval between positions is short as in the combination of the positions C11 and C22, the positions are preferably arranged at equal distances.

The setting unit 2601 sets a presumed minimax Sp having an arbitrary value that is different for each of the slave calculators 150p. For example, the setting unit 2601 sets the presumed minimax Sp to be different for each of the slave calculators 150p, based on the increase amount $\Delta S$ of the presumed minimax Sp and the number P of the slave calculators. For example, the initial value of the presumed minimax lower limit Smin is set to 0 as an example of a sufficiently small value, and the initial value of the presumed minimax upper limit Smax is set to 100 as an example of a sufficiently large value. In this case, the setting unit 2601 updates the increase amount $\Delta S$ based on whether Equation (1) is satisfied.

$$Smin+\Delta S \times (P-1) \leq Smax \quad (1)$$

When the initial value of the increase amount $\Delta S$ is set to $\Delta S$=100 along with P=2 and the values are substituted in Equation (1), the left side is 0+100×(2−1)=100. The right side is 100. In this case, since Equation (1) is satisfied, the presumed minimax sequence {Sp} is the arithmetic progression {0, 100} having the first term Smin=100, the increase amount $\Delta S$=100, and the number P of elements. Therefore, as depicted in FIG. 16, the presumed minimax S1 of the slave calculator 1501 is S1=0, and the presumed minimax S2 of the slave calculator 1502 is S2=100.

By repeating the setting of the presumed minimax sequence {Sp}, the presumed minimax lower limit Smin always comes closer to the actual minimax as the search proceeds and therefore, it is assured that the presumed minimax Sp is updated to a value closer to the minimax by the presumed minimax lower limit Smin.

If Equation (1) is not satisfied, the increase amount $\Delta S$, i.e., a search increment width, is updated by Equation (2).

$$\Delta S=(Smax-Smin)/(P-1) \quad (2)$$

Therefore, when all the states can be evaluated for a given action, the presumed minimax upper limit Smax has been found that is the minimax candidate less than or equal to the calculated presumed minimax Sp. The presumed minimax upper limit Smax can be effectively utilized for updating the increase amount $\Delta S$ that is a search increment width. Therefore, as represented by Equation (2), $\Delta S$ is updated to reset the presumed minimax sequence {Sp}. In short, if the presumed minimax upper limit Smax is a value lower than the presumed minimax Sp calculable with the given increase amount $\Delta S$, the increase amount $\Delta S$ can be made finer. In this case, the increase amount $\Delta S$ is updated by Equation (2) to reset the presumed minimax sequence {Sp}.

The delivering unit 2602 delivers the start position and the presumed minimax set for each slave calculator by the setting unit 2601 to each slave calculator. For example, the delivering unit 2602 transmits the search start position SPp to the slave calculator 150p. The delivering unit 2602 similarly transmits the presumed minimax Sp to the slave calculator 150p.

The receiving unit 2603 receives information transmitted from the slave calculators. For example, the receiving unit 2603 receives the maximum evaluation value Vjmax, the maximum evaluation value candidate VCjmax, and the evaluation completion notification from the slave calculator 150p.

The storing unit 2604 writes a maximum evaluation value or a maximum evaluation value candidate transmitted from each slave calculator into a memory area of a corresponding action in the memory apparatus 501. For example, as depicted in FIGS. 16 to 24, the storing unit 2604 writes the maximum evaluation value Vjmax or the maximum evaluation value candidate VCjmax for the corresponding action in the evaluation value table. If the maximum evaluation value Vjmax is already stored, the maximum evaluation value candidate VCjmax does not need to be written when received for the same action Bj. As a result, the process load of the master calculator 1500 due to writing of the maximum evaluation value candidate VCjmax can be reduced.

The detecting unit 2605 detects evaluation completion notification from any one of multiple slave calculators. The evaluation completion notification is a trigger of resetting of the presumed minimax sequence {Sp}.

If the detecting unit 2605 detects the evaluation completion notification, the updating unit 2606 updates the presumed minimax lower limit Smin to the smallest value among the maximum evaluation value candidates stored in the memory apparatus 501. For example, as depicted in FIG. 20, the updating unit 2606 updates the presumed minimax lower limit Smin to the smallest maximum evaluation value candidate VC1max=4 in the evaluation value table T0. The updating unit 2606 updates the presumed minimax upper limit Smax to the smallest value among the maximum evaluation values stored in the memory apparatus 501. For example, as depicted in FIG. 20, the updating unit 2606 updates the presumed minimax upper limit Smax to the smallest maximum evaluation value V3max=9 in the evaluation value table T0.

When the presumed minimax lower limit Smin and the presumed minimax upper limit Smax are updated in this way, the setting unit 2601 resets the presumed minimax sequence {Sp} by using Equation (1). As a result, the presumed minimax Sp is updated and redelivered by the delivering unit 2602.

The determining unit 2607 determines whether the presumed minimax lower limit updated by the updating unit 2606 is larger than the presumed minimax upper limit updated by the updating unit 2606. For example, the determining unit 2607 determines whether Smin>Smax is achieved. The achievement of this state means that the minimax is not present in the unsearched range.

The determining unit 2608 decides the minimax as the updated presumed minimax upper limit when the determining unit 2607 determines that the presumed minimax lower limit is larger. In other words, if Smin>Smax is achieved, the determining unit 2608 decides the minimax as the latest presumed minimax upper limit Smax. As a result, the minimax is found. For example, in FIG. 24, since the presumed minimax upper limit Smax=6 when Smin>Smax is achieved, it is ascertained that the minimax is the evaluation value V24=6 of the state A2 for the action B4.

The output unit 2609 outputs the action having the minimax decided by the determining unit 2608. For example, the output unit 2609 outputs the name (e.g., a character string indicative of the action such as "storage battery operation plan 1") of the action having the minimax decided. The (value of) minimax or the (name of) state may be output in addition to the action. In the example of FIG. 24, for example, {action B4, state A2, minimax=6} is output as an output result. The output unit 2609 outputs such an output result to the output apparatus 503 or the memory apparatus 501. The output result output to the output apparatus 503 is output (displayed on a screen, printed, transmitted to another apparatus, or read in voice) depending on the output apparatus 503. The output result output to the memory apparatus 501 is stored in the memory apparatus 501.

<Example of Minimax Search Process Procedure by Master Calculator 1500>

FIG. 27 is a flowchart of an example of a minimax search process procedure (first half) by the master calculator 1500. First, in FIG. 27, the master calculator 1500 waits for the start of calculation (step S2701: NO) and, when calculation starts (step S2701: YES), the master calculator 1500 acquires the number of slave calculators (the number of calculation processes) P, the presumed minimax upper limit Smax, the presumed minimax lower limit Smin, and the increase amount ΔS (step S2702). These may be acquired by reading a file preliminarily retained in the memory apparatus 501 or by accepting operation input from the input apparatus 502.

The master calculator 1500 causes the setting unit 2601 to set the search start position sequence {SPp} (step S2703) and transmits the corresponding search start positions SPp to the slave calculators 150p (step S2704). The master calculator 1500 then causes the setting unit 2601 to execute a presumed minimax setting process (step S2705). As a result of the presumed minimax setting process (step S2705) described later in detail with reference to FIG. 29, the presumed minimax sequence {Sp}, i.e., the presumed minimax Sp for each slave calculator is set. Therefore, the master calculator 1500 transmits the corresponding presumed minimaxes Sp to the slave calculators 150p (step S2706) and goes to step S2801 of FIGS. 28A and 28B.

Figure 28A:
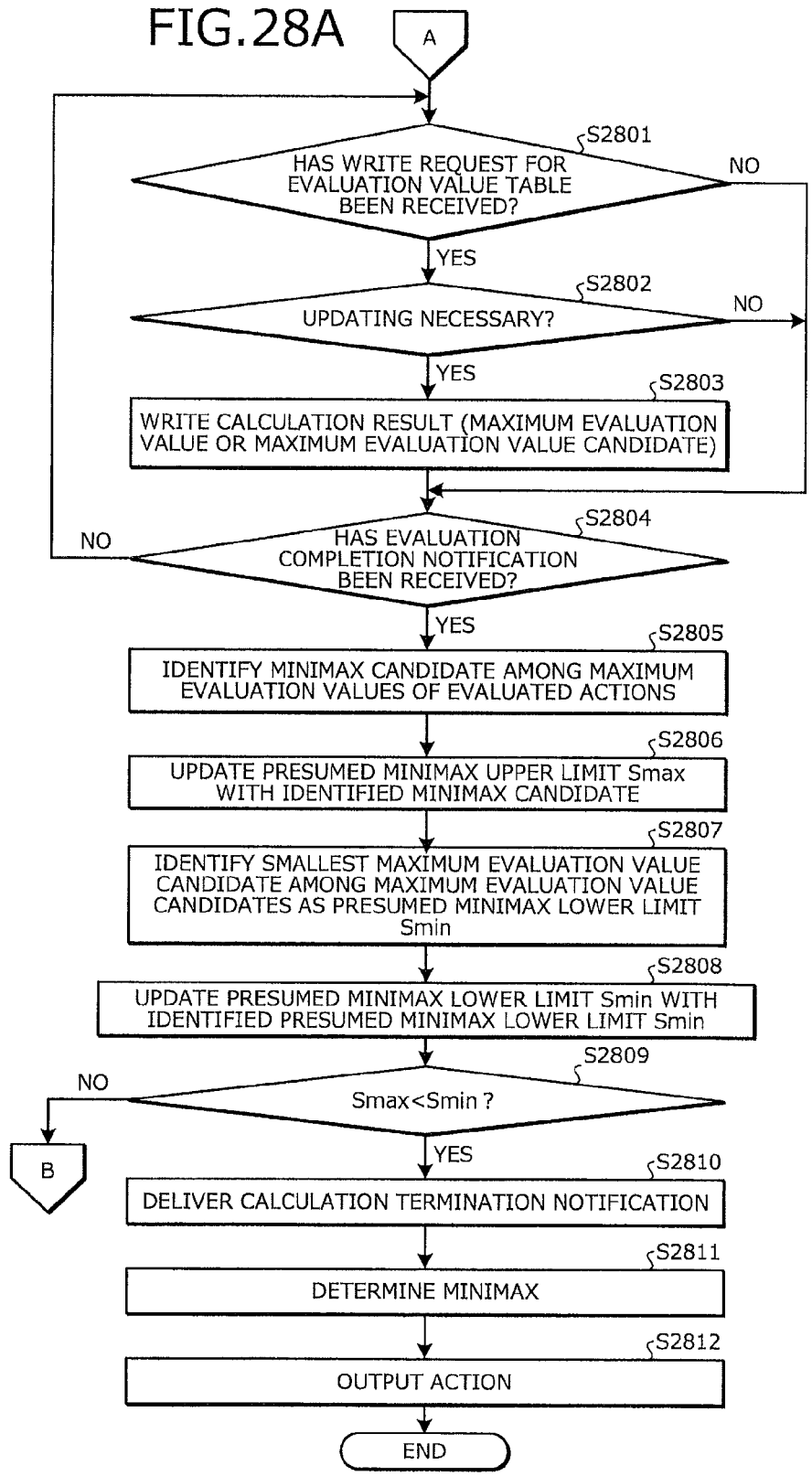
FIG. 28A is a flowchart of the example of a minimax search process procedure (second half) by the master calculator 1500.

FIG. 28A is a flowchart of the example of a minimax search process procedure (second half) by the master calculator 1500. In FIG. 28A, the master calculator 1500 judges whether a write request requesting writing to the evaluation value table T0 has been received (step S2801). In other words, it is judged whether the maximum evaluation value Vjmax or the maximum evaluation value candidate VCjmax has been received from any of the slave calculators 150p. If not (step S2801: NO), the procedure goes to step S2804. On the other hand, if so (step S2801: YES), the master calculator 1500 determines if update is to be performed for the maximum evaluation value Vjmax or the maximum evaluation value candidate VCjmax of the write request as compared to those recorded in the evaluation value table T0 (step S2802). Step S2802 is executed because a state already calculated by another slave calculator may have been redundantly calculated.

If update is not necessary at step S2802 (step S2802: NO), the procedure goes to step S2804. On the other hand, if update is necessary (step S2802: YES), the master calculator 1500 writes the maximum evaluation value Vjmax or the maximum evaluation value candidate VCjmax included in the write request into the evaluation value table T0 (step S2803) and goes to step S2804.

At step S2804, the master calculator 1500 judges whether evaluation completion notification has been received from any of the slave calculators 150p (step S2804). If not (step S2804: NO), the master calculator 1500 refers to the evaluation value table T0 and identifies the minimax candidate among the maximum evaluation values of the evaluated actions (step S2805). In other words, the master calculator 1500 identifies the smallest maximum evaluation value among the maximum evaluation values. The master calculator 1500 updates the presumed minimax upper limit Smax with the identified minimax candidate (step S2806). As a result, the presumed minimax upper limit Smax is lowered in stages.

The master calculator 1500 refers to the evaluation value table T0 and identifies the smallest maximum evaluation value candidate among the maximum evaluation value candidates as the presumed minimax lower limit Smin (step S2807). The master calculator 1500 updates the presumed minimax lower limit Smin with the identified presumed minimax lower limit Smin (step S2808).

The master calculator 1500 then judges whether Smax<Smin is satisfied (step S2809). In other words, it is determined whether the presumed minimax lower limit Smin exceeds the presumed minimax upper limit Smax. If Smax<Smin is not satisfied (step S2809: NO), the master calculator 1500 returns to step S2705 depicted in FIG. 27 and executes the presumed minimax setting process (step S2705).

On the other hand, if Smax<Smin is satisfied (step S2809: YES), the master calculator 1500 delivers calculation termination notification to the slave calculators 150p (step S2810). As a result, the evaluation process in the slave calculators 150p is stopped. The master calculator 1500 then causes the determining unit 2608 to determine the presumed minimax upper limit Smax as the minimax (step S2811) and outputs the action Bj resulting in the decided minimax (step S2812). A sequence of the process is then terminated.

Figure 29:
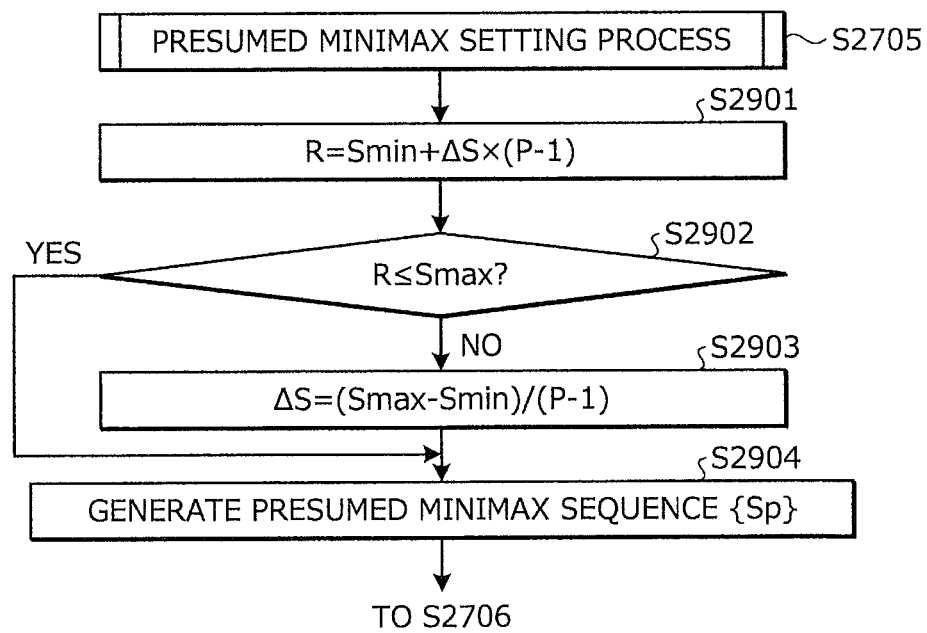
FIG. 29 is a flowchart of a detailed example of a process procedure of a presumed minimax setting process (step S2705) depicted in FIG. 27.

FIG. 29 is a flowchart of a detailed example of a process procedure of the presumed minimax setting process (step S2705) depicted in FIG. 27. First, the master calculator 1500 calculates R that is the left side of Equation (1) (step S2901). The master calculator 1500 determines whether Equation (1) is satisfied (step S2902). If satisfied (step S2902: YES), the procedure goes to step S2904. On the other hand, if not satisfied (step S2902: NO), the master calculator 1500 updates the increase amount ΔS with Equation (2) (step S2903) and goes to step S2904. As a result, the increase amount ΔS can be corrected to a proper amount and the presumed minimax Sp can properly be adjusted.

At step S2904, the arithmetic progression having the presumed minimax lower limit Smin as the first term, the increase amount ΔS, and the number P of elements is generated as the presumed minimax sequence {Sp} (step S2904) and the procedure goes to step S2706. By generating the arithmetic progression in this way, the minimax can be found regardless of the position at which the actual minimax resides between the presumed minimax lower limit Smin and the presumed minimax upper limit Smax. By repeating the resetting of the presumed minimax sequence {Sp}, a range from the presumed minimax lower limit Smin to the presumed minimax upper limit Smax is narrowed and therefore, the minimax can be narrowed down efficiently.

<Example of Minimax Search Process Procedure by Slave Calculator 150p>

Figure 30A:
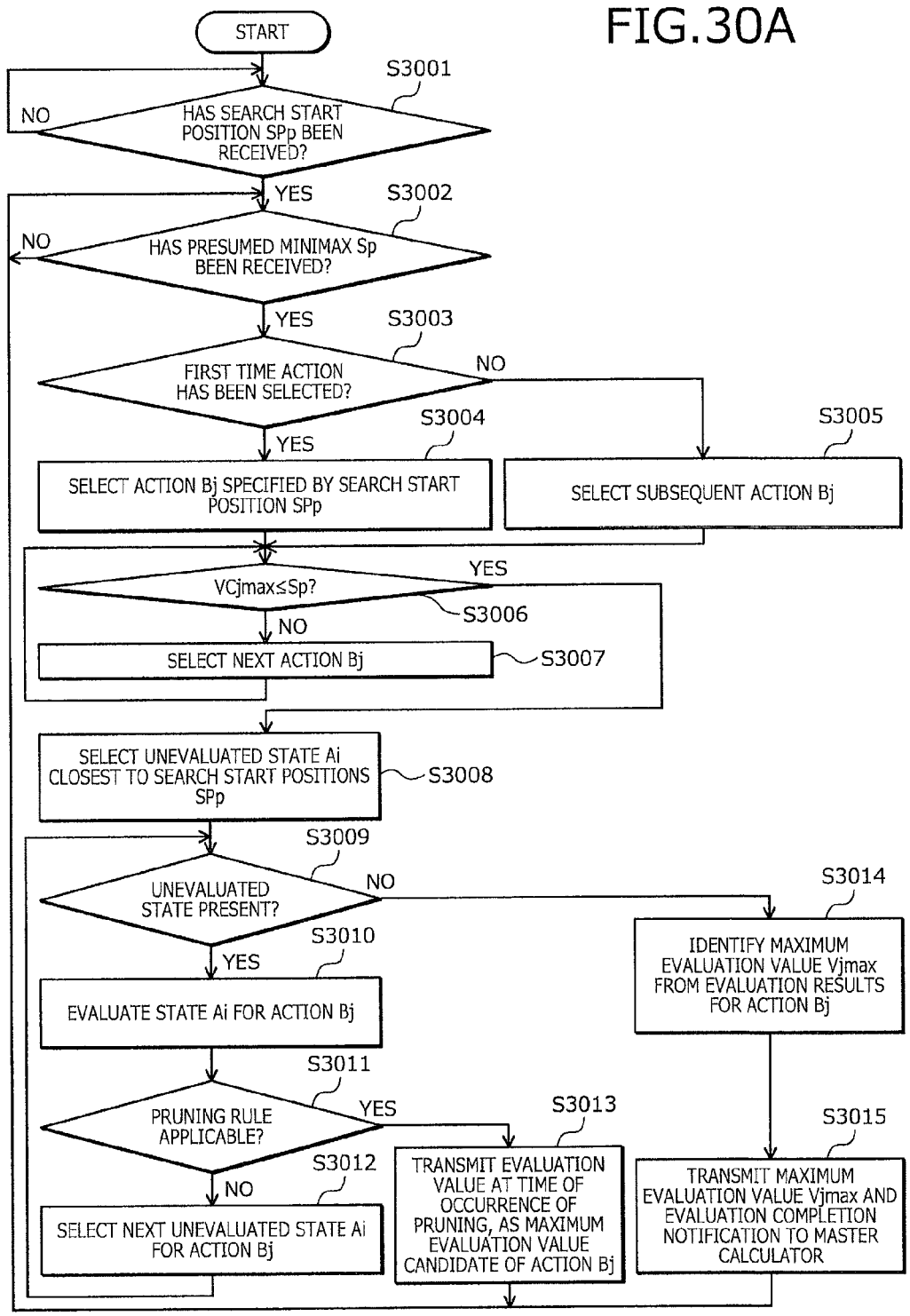
FIG. 30A is a flowchart (part one) of an example of a minimax search process procedure by the slave calculator 150p.

FIG. 30A is a flowchart (part one) of an example of a minimax search process procedure by the slave calculator 150p. First, the slave calculator 150p waits for reception of the search start position SPp (step S3001: NO) and, when the search start position SPp is received (step S3001: YES), the slave calculator 150p waits for reception of the presumed minimax Sp (step S3002: NO).

When the presumed minimax Sp is received (step S3002: YES), the slave calculator 150p judges whether this is the first time an action has been selected (step S3003). If this is the first time an action has been selected (step S3003: YES), the slave calculator 150p selects the action Bj specified by the search start position SPp (step S3004) and goes to step S3006. On the other hand, if this is not the first time an action has been selected (step S3003: NO), the action Bj specified by the search start position SPp has already been selected. In this case, the action Bj next to the last selected action is selected (step S3005). The procedure goes to step S3006.

At step S3006, the slave calculator 150p determines if the maximum evaluation value Vjmax for the action Bj is less than or equal to the presumed minimax Sp (step S3006). If Vjmax≤Sp is not satisfied (step S3006: NO), the pruning rule is applied and therefore, the slave calculator 150p selects the next action Bj (step S3007) and returns to step S3006. As a result, the applicability of the pruning rule can be judged repeatedly.

On the other hand, if Vjmax≤Sp is satisfied at step S3003 (step S3006: YES), the slave calculator 150p selects an unevaluated state Ai closest to the search start positions SPp (step S3008). If an unevaluated state is present (step S3009: YES), the slave calculator 150p evaluates the state Ai for the action Bj (step S3010). The slave calculator 150p judges whether the pruning rule is applicable to the acquired evaluation value Vij (step S3011).

If the pruning rule is not applicable (step S3011: NO), the slave calculator 150p selects the next unevaluated state Ai for the action Bj (step S3012) and returns to step S3009.

On the other hand, if the pruning rule is applicable (step S3011: YES), the slave calculator 150p transmits the evaluation value Vij at the time of occurrence of the pruning as the maximum evaluation value candidate VCjmax of the action Bj to the master calculator 1500 (step S3013) and returns to step S3002 to wait until the new presumed minimax Sp is received.

If no unevaluated state Ai is present (step S3009: NO), this means that the evaluation values V1j to Vnj of all the states A1 to An for the Bj have been acquired. Therefore, the slave calculator 150p identifies the maximum evaluation value Vjmax (i.e., the minimax candidate) from the evaluation results, i.e., the evaluation values V1j to Vnj (evaluation results) of the action Bj (step S3014). The slave calculator 150p transmits the maximum evaluation value Vjmax and the evaluation completion notification to the master calculator 1500 (step S3015) and returns to step S3002 to wait until the new presumed minimax Sp is received.

In any case, if calculation termination notification is accepted from the master calculator 1500, the slave calculator 150p retains the currently selected action and terminates the process even if in the middle of the process.

As described, according to the third embodiment, the multiple slave calculators 150p calculate evaluation of the states in a distributed manner without overlap to clarify the presumed minimax upper limit Smax and the presumed minimax lower limit Smin. To efficiently find the minimax, the presumed minimax upper limit Smax and the presumed minimax lower limit Smin can be fed back from the master collector 1500 for efficiently finding the minimax.

Although neither a search space nor the evaluation table T0 is shared by the master calculator 1500 and the slave calculators 150p in the case described in the third embodiment, a search space and the evaluation table T0 may be shared by the master calculator 1500 and the slave calculators 150p. Specifically, the evaluation values Vij of the states Ai for the actions Bj, the maximum evaluation value candidate VCjmax, and the maximum evaluation value Vjmax are shared by the master calculator 1500 and the slave calculators 150p.

In particular, when an evaluation value Vij is acquired in one of the slave calculators 150p, the evaluation value Vij is transmitted to the master calculator 1500 and the other slave calculators 150p and is written if the evaluation value Vij is not evaluated in the master calculator 1500 and the other slave calculators 150p. Similarly, if the maximum evaluation value candidate VCjmax is acquired in one of the slave calculators 150p, the maximum evaluation value candidate VCjmax is transmitted to the master calculator 1500 and the other slave calculators 150p and is written in the master calculator 1500 and the other slave calculators 150p. The same applies to the maximum evaluation value Vjmax. In the case of the maximum evaluation value Vjmax, once registered, update is not needed.

These write processes are executed through remote direct memory access (RDMA). Therefore, the processes can be executed without using the processor of the calculator at the write destination and thus, an increase in process load can be suppressed at the write destination. If the search space and the evaluation value table T0 are shared, the search space and the evaluation value table T0 may be given to only one calculator (e.g., the master calculator 1500) such that the other calculators are allowed to write and read values. In any case, all the calculators 1500 and 150p can always refer to the search space and the evaluation value table T0 in the latest state.

In this case, with regard to the master calculator 1500, the example of minimax search process procedure (second half) by the master calculator 1500 in FIG. 28A is as depicted in FIG. 28B.

FIG. 28B is a flowchart of another example of the minimax search process procedure (second half) by the master calculator 1500. In FIG. 28B, the same steps as FIG. 28A are denoted by the same reference numerals. FIG. 28B depicts a process procedure acquired by removing step S2802 from FIG. 28A. The process corresponding to the step S2802 is executed by the slave calculators 150p. Therefore, the flowchart (part one) of the example of minimax search process procedure by the slave calculator 150p depicted in FIG. 30A is as depicted in FIG. 30B.

FIG. 30B is a flowchart (part two) of the example of the minimax search process procedure by the slave calculator 150p. In FIG. 30B, steps S3001 to S3008 are the same as FIG. 30A and therefore are not depicted in FIG. 30B. In FIG. 30B, the same steps as FIG. 30A are denoted by the same reference numerals.

In FIG. 30B, when the state Ai for the action Bj is evaluated at step S3010, the evaluation is written into the search space of the master calculator 1500 and the search spaces of the other slave calculators 150p (step S3020). As a result, overlapping calculation in the other slave calculators 150p can be prevented and the minimax search process can be accelerated.

If the pruning rule is applicable at step S3011 (step S3011: YES), the slave calculator 150p determines whether the evaluation value table T0 is to be updated to set the evaluation value Vij at the time of occurrence of the pruning as the maximum evaluation value candidate VCjmax of the action Bj (step S3021). Since update is needed if the evaluation value Vij is larger than the currently registered maximum evaluation value candidate VCjmax (step S3021: YES), the slave calculator 150p updates the evaluation value table T0 and sets the evaluation value Vij at the time of occurrence of the pruning as the maximum evaluation value candidate VCjmax of the action Bj (step S3022) and goes to step S3002. On the other hand, since update is not needed if the evaluation value Vij is not larger than the currently registered maximum evaluation value candidate VCjmax (step S3021: NO), the procedure goes to step S3007 and the next action Bj is selected.

At step S3014, if the maximum evaluation value Vjmax is identified, the slave calculator 150p determines whether the maximum evaluation value Vjmax is to be registered in the evaluation value table T0 (step S3023). Since registration is needed if not registered for the action Bj (step S3023: YES), the slave calculator 150p registers the maximum evaluation value Vjmax in the evaluation value table T0, transmits evaluation completion notification to the master calculator 1500 (step S3024), and goes to step S3002. If already registered at step S3023 (step S3023: NO), the procedure returns to step S3007 and the next action Bj is selected.

Since information can be shared between the calculators as described above, calculation overlapping with another slave calculator 150p can be prevented and the minimax search process can be accelerated.

As described above, according to this embodiment, in the process of evaluating the states Ai in order for the selected action Bj for finding the minimax, the pruning is performed when it is ascertained that the maximum evaluation value Vjmax of the evaluation values Vij of the possible states Ai for the action Bj cannot be the minimax.

By omitting the calculation of the states Ai that need not be evaluated for the action Bj that is unpromising (that includes a maximum value higher than the minimax), efficient minimax search can be realized. The evaluation of the maximum evaluation value of the action that includes the minimax that is sought is performed for all the states without omission, and by using the minimax candidate acquired in the course of calculation, the calculation for the actions Bj that do not need calculation is omitted. Therefore, efficient calculation can be realized while the minimax is certainly found as is the case with the calculation without the pruning.

A specific example of the action deciding problem based on the minimax loss criterion depicted in the first to third embodiments will be described. An operation plan creating apparatus is taken as an example in this description. The operation plan creating apparatus corresponds to the calculator 401 depicted in FIG. 4.

The operation plan creating apparatus is the calculator 401 creating an initial operation plan indicative of an operation plan from an operation plan start time point to a correction time point in prospect of correction of an operation plan for daily operation of a storage battery such that any variations of weather can be supported after the correction time point. The operation plan start time point is 0 o'clock, for example, and the correction time point is 13 o'clock, for example. Although the case of the operation plan creating apparatus creating the initial operation plan will be described in a first example, this is not a limitation.

Figure 31:
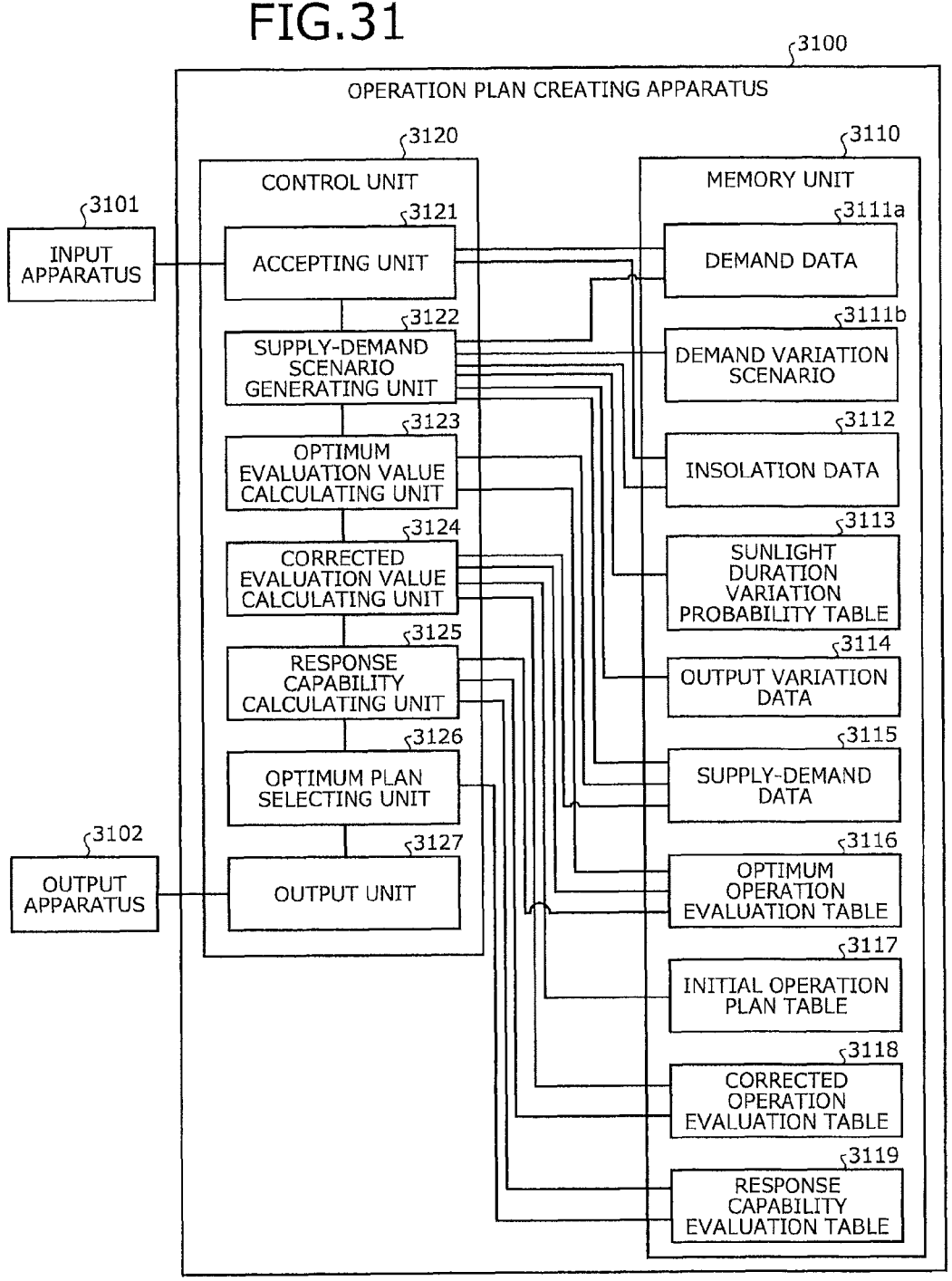
FIG. 31 is a block diagram of a functional configuration example of an operation plan creating apparatus.

For example, the operation plan creating apparatus may create a corrected operation plan indicative of an operation plan after the correction point in prospect of further correction of the corrected operation plan as is the case with the initial operation plan. The operation plan start time point and the correction time point are not limited to this exemplification and may be set to any values by a user of the operation plan creating apparatus FIG. 31 is a block diagram of a functional configuration example of the operation plan creating apparatus. As depicted in FIG. 31, an operation plan creating apparatus 3100 has a memory unit 3110 and a control unit 3120. The operation plan creating apparatus 3100 is connected to an input apparatus 3101 and an output apparatus 3102.

The input apparatus 3101 accepts input of various types of information. For example, the input apparatus 3101 accepts demand data 3111a and insolation data 3112. The input apparatus 3101 accepts, for example, an operation start time, an operation end time, and an operation plan correction time of a storage battery as conditions specifying the operation plan to be created. For example, the input apparatus 3101 accepts a start time t0, an end time t_e, an initial sunlight duration h0, and a time increment width $\Delta t$ as conditions identifying a range of insolation variation to be considered in creation of the operation plan. For example, the input apparatus 3101 corresponds to a keyboard, a mouse, a media reader, etc. The information accepted by the input apparatus 3101 will be described later.

The output apparatus 3102 outputs various types of information. For example, the output apparatus 3102 accepts various types of information from an output unit 3127 described later and outputs the accepted information. For example, the output apparatus 3102 corresponds to a display, a monitor, etc.

The memory unit 3110 has the demand data 3111a, a demand variation scenario 3111b, the insolation data 3112, a sunlight duration variation probability table 3113, output variation data 3114, and supply-demand data 3115. The memory unit 3110 also has an optimum operation evaluation table 3116, an initial operation plan table 3117, a corrected operation evaluation table 3118, and a response capability evaluation table 3119. The memory unit 3110 corresponds to, for example, a semiconductor memory device such as RAM, ROM, and flash memory, and a memory apparatus such as a magnetic disk apparatus, an optical disk apparatus, or an optical disk apparatus.

The demand data 3111a is time-series data having a demand power value as an element. For example, the demand data 3111a is data correlating a time period of a day and a demand power value. The demand power value is calculated from statistical data of past power consumption values.

The demand variation scenario 3111b represents possibility of change in demand on the day of the operation plan development object. For example, the demand variation scenario 3111b indicates changes in the power demand value for each time period of a day and is generated based on the demand data 3111a.

Figures 32, 33:
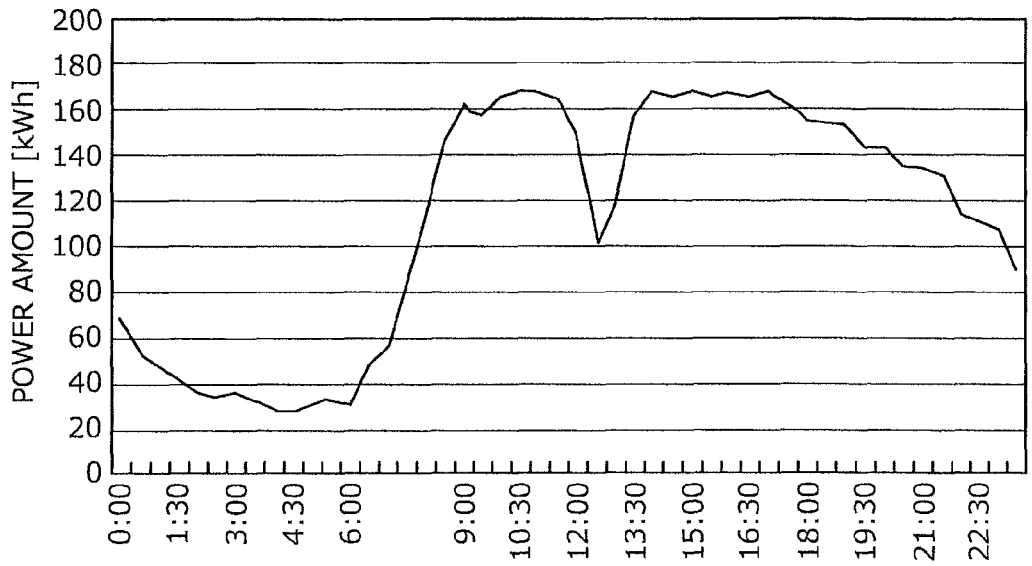
FIG. 32 is an explanatory view of an example of a demand variation scenario.
FIG. 33 is an explanatory view of an example of a sunlight duration variation probability table.

FIG. 32 is an explanatory view of an example of a demand variation scenario. The horizontal axis of FIG. 32 indicates time and the vertical axis indicates power amount [kWh]. FIG. 32 depicts an example of the demand variation scenario 3111b of one day in a factory. Although FIG. 32 depicts a case in which the demand variation scenario 3111b has one pattern, this is not a limitation. For example, the demand variation scenarios 3111b may have M patterns if multiple ways of changing are expected due to differences depending on the day of the week or the time of the year. M is a natural number.

The insolation data 3112 are records of a past insolation per predetermined time. The insolation includes a value measured in units of sunlight duration. The sunlight duration is a value defined as a period of direct sunlight on the ground without being blocked by the clouds, etc., at an intensity greater than or equal to a predetermined value (generally, $0.12$ kW/m$^2$). For example, the insolation data 3112 represents the monthly sunlight duration and a cumulative insolation per unit area in July 2007 recorded every hour. The insolation data 3112 is data acquired from a database of the Japan Meteorological Agency, for example.

The sunlight duration variation probability table 3113 is a table indicative of conditional probability P ($H_{after}|H_{before}$) of variation from sunlight duration $H_{before}$ before variation to sunlight duration $H_{after}$ after variation when a unit time has elapsed.

FIG. 33 is an explanatory view of an example of the sunlight duration variation probability table. The horizontal direction of FIG. 33 indicates the sunlight duration $H_{before}$ before variation and is categorized into four fields of "0.0", "0.1-0.5", "0.6-0.9", and "1.0". The vertical direction indicates the sunlight duration $H_{after}$ after variation and is categorized into eleven fields from "0.0" to "1.0" by "0.1". As depicted in FIG. 33, the sunlight duration variation probability table 3113 stores the conditional probability P($H_{after}|H_{before}$) of variation from the sunlight duration $H_{before}$ before variation to the sunlight duration $H_{after}$ after variation when one hour has elapsed. The conditional probability P is a value represented by 0 to 1.

As depicted in FIG. 33, the sunlight duration variation probability table 3113 stores information indicating that the conditional probability P of variation from the sunlight duration $H_{before}$ "0.0" to the sunlight duration $H_{after}$ "0.0" after one hour is "0.86". The sunlight duration variation probability table 3113 stores information indicating that the conditional probability P of variation from the sunlight duration $H_{before}$ "0.1-0.5" to the sunlight duration $H_{after}$ "0.3" after one hour is "0.07". The sunlight duration variation probability table 3113 also stores the other conditional probabilities P. The data structure of the sunlight duration variation probability table 3113 depicted in FIG. 33 is an example and is not limited hereto. For example, the sunlight duration $H_{before}$ before variation may be categorized into eleven fields from "0.0" to "1.0" by "0.1".

The output variation data 3114 is time-series data having a power generation amount of solar power generation as an element. For example, the output variation data 3114 is data correlating each time period of a day and a power generation amount. For example, the output variation data 3114 is generated by a supply-demand scenario generating unit 3122 described later and is stored in the memory unit 3110. For example, the output variation data 3114 includes an output variation scenario representative of a change in power generation amount of solar power generation for each time period of a day. The output variation scenario will be described later.

The supply-demand data 3115 is time-series data having a difference in the power demand in a power grid in which the storage battery is operated and the output of solar power generation as an element. For example, the supply-demand data 3115 is a set of supply-demand scenarios representative of possible subsequent changes in supply-demand power amount after a given initial state. For example, the supply-demand data 3115 is generated by the supply-demand scenario generating unit 3122 described later and is stored in the memory unit 3110. The supply-demand scenario will be described later.

The optimum operation evaluation table 3116 stores an operation plan resulting in a first evaluation value that is the best evaluation value when the storage battery is operated (hereinafter referred to as an "optimum operation plan") for each of multiple scenarios. For example, the optimum operation evaluation table 3116 stores a supply-demand scenario, an evaluation value from the optimum operation plan, and an optimum control parameter in a correlated manner. The "supply-demand scenario" of the optimum operation evaluation table 3116 indicates identification information identifying a supply-demand scenario.

The evaluation value from the optimum operation plan indicates the best evaluation value among evaluation values acquired from simulation results when the operation of the storage battery is simulated with various control parameters for the supply-demand scenario. For example, if the storage battery is operated in a peak-cut mode of discharging electricity when power demand exceeds a predetermined power value, a peak-cut effect is used for the evaluation value. The predetermined power value is also referred to as a discharge reference value. The optimum control parameter indicates a control parameter of the storage battery resulting in the evaluation value from the optimum operation plan. For example, the discharge reference value is used for the control parameter if the storage battery is operated in the peak-cut mode.

The evaluation value is not limited to the peak-cut effect and may be, for example, an environmental load reduction effect, a cost reduction effect, or a combination of these values. The control parameter is not limited to the discharge reference value. For example, if the storage battery is operated in a constant discharge mode, the control parameter is a combination of a time period in which electricity should be discharged and a discharge amount. For example, if the storage battery is operated in a surplus power absorption mode, the control parameter is an initial power amount of the storage battery. In the following description, the storage battery is operated in the peak-cut mode, and the peak-cut effect is used as the evaluation value.

The peak-cut effect will be described. The peak cut effect is an evaluation value indicative of an effect when the storage battery is operated in the peak-cut mode, and is a value evaluated depending on how much a demand value can be reduced. For example, the peak-cut effect is represented by Equation (31).

$$\text{(peak-cut effect)}=\text{(demand value without peak-cut measures)}-\text{(demand value with peak-cut measures)} \quad (31)$$

The demand value corresponds to average power usage [kW] per 30 minutes and is a value calculated through simulation, for example. For example, the demand value is represented by Equation (32).

$$\text{(demand value [kW])}=\text{(average power usage [kW] of 30 minutes)}\times 2 \quad (32)$$

Figures 34, 35, 36:
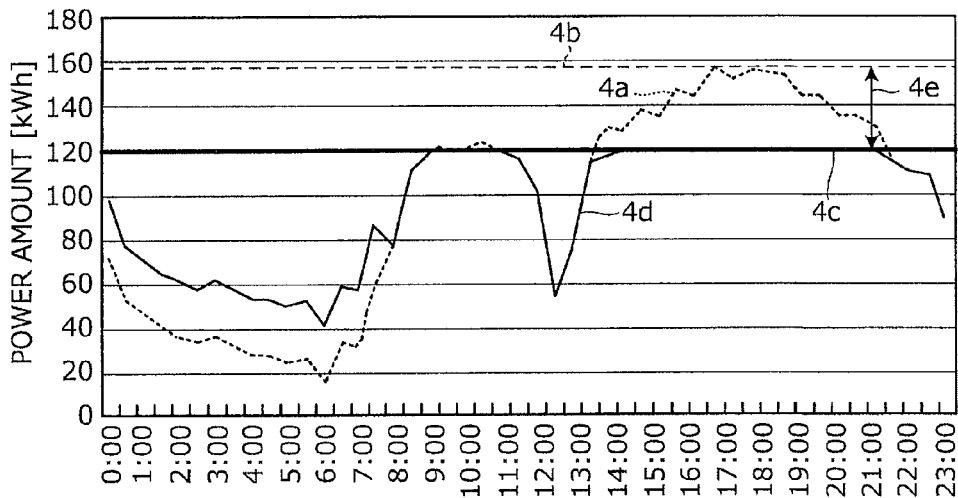
FIG. 34 is an explanatory view of a peak-cut effect.
FIG. 35 is an explanatory view of an example of an optimum operation evaluation table 3116 depicted in FIG. 31.
FIG. 36 is an explanatory view of an example of an initial operation plan table 3117 depicted in FIG. 31.

FIG. 34 is an explanatory view of the peak-cut effect. The horizontal axis of FIG. 34 indicates time and the vertical axis indicates power amount [kWh]. The case of calculating the peak-cut effect through simulation will be described with reference to FIG. 34. As depicted in FIG. 34, a supply-demand status 4a indicates a supply-demand status without peak-cut measures acquired through simulation. Since the maximum power usage of 30 minutes is 157 kWh in the supply-demand status 4a, a demand value 4b is 157×2=314 [kW].

If the demand value 4b is successfully reduced to a demand value 4c by operating the storage battery with peak-cut control, the supply-demand status 4a is improved to a supply-demand status 4d. Since the demand value 4c is 118×2=236 [kW], a peak-cut effect 4e is 314−236=78 [kW]. The supply-demand status is represented by Equation (33).

$$\text{(supply-demand status [kWh])}=\text{(demand power amount [kWh])}+\text{(solar power generation amount [kWh])}-\text{(storage battery discharge amount [kWh]) (or storage battery charge amount)} \quad (33)$$

FIG. 35 is an explanatory view of an example of the optimum operation evaluation table 3116 depicted in FIG. 31. For example, the optimum operation evaluation table 3116 stores the supply-demand scenario "1", the evaluation value "36" from the optimum operation plan, and the optimum control parameter "278" in a correlated manner. Therefore, the optimum operation evaluation table 3116 indicates that the best discharge reference value for the supply-demand scenario "1" is 278 [kWh] and that the peak-cut effect is 36 [kWh] if the storage battery is operated at this discharge reference value.

The optimum operation evaluation table 3116 also stores the supply-demand scenarios, the evaluation values from the optimum operation plan, and the optimum control parameters in a correlated manner in the same way for the other supply-demand scenarios. The evaluation value from the optimum operation plan is an example of the first evaluation value. If a storage battery charge amount is used in Equation (33), the corresponding term is changed to a positive term.

FIG. 36 is an explanatory view of an example of the initial operation plan table 3117 depicted in FIG. 31. The initial operation plan table 3117 stores an initial operation plan and a control parameter in a correlated manner. The "initial operation plan" of the initial operation plan table 3117 indicates identification information identifying a candidate for the initial operation plan. The "control parameter" indicates a control parameter of the initial operation plan. For example, if the storage battery is operated in the peak-cut mode, the control parameter corresponds to the discharge reference value.

For example, the initial operation plan table 3117 stores the initial operation plan "1" and the control parameter "50" in a correlated manner. Therefore, the initial operation plan table 3117 indicates that the discharge reference value of the initial operation plan "1" is 50 [kW]. The initial operation plan table 3117 also stores the initial operation plans and the control parameters in a correlated manner in the same way for the other initial operation plan candidates.

FIG. 37 is an explanatory view of an example of the corrected operation evaluation table 3118 depicted in FIG. 31. The corrected operation evaluation table 3118 stores an initial operation plan, a supply-demand scenario, and an evaluation value of an optimum corrected operation plan for the initial operation plan in a correlated manner. The "initial operation plan" of the corrected operation evaluation table 3118 indicates identification information identifying a candidate for the initial operation plan. The "supply-demand scenario" indicates identification information identifying a supply-demand scenario. The "evaluation value of an optimum corrected operation plan for the initial operation plan Q" indicates an evaluation value for a corresponding initial operation plan when the storage battery is operated according to the optimum corrected operation plan indicative of an optimum operation plan after the correction time point, for each supply-demand scenario.

For example, the corrected operation evaluation table 3118 stores the initial operation plan "1", the supply-demand scenario "1", and the evaluation value "34" of the optimum corrected operation plan for the initial operation plan Q in a correlated manner. Therefore, the corrected operation evaluation table 3118 indicates that the evaluation value is "34" when the storage battery is operated according to the optimum corrected operation plan after the storage battery is operated according to the initial operation plan "1" for the supply-demand scenario "1".

The corrected operation evaluation table 3118 stores for the initial operation plan "1" another supply-demand scenario and another evaluation value of the optimum corrected operation plan for the initial operation plan in a correlated manner. In this way, the corrected operation evaluation table 3118 stores multiple supply-demand scenarios and multiple evaluation values of the optimum corrected operation plan for the initial operation plan Q in a correlated manner for one initial operation plan. The corrected operation evaluation table 3118 also stores the initial operation plans, the supply-demand scenarios, and the evaluation values of the optimum corrected operation plan for the initial operation plan in a correlated manner in the same way for the other initial operation plans. The evaluation value of an optimum corrected operation plan for an initial operation plan is an example of a second evaluation value.

FIG. 38 is an explanatory view of an example of the response capability evaluation table 3119 depicted in FIG. 31. The response capability evaluation table 3119 stores an initial operation plan, a supply-demand scenario, and a response capability evaluation for the initial operation plan in a correlated manner. The "initial operation plan" of the response capability evaluation table 3119 indicates identification information identifying a candidate for the initial operation plan. The "supply-demand scenario" indicates identification information identifying a supply-demand scenario.

The "response capability evaluation for the initial operation plan" indicates a regret value calculated for each supply-demand scenario for a corresponding initial operation plan. The regret value is a value evaluated in terms of how close an evaluation value of the optimum corrected operation plan for each supply-demand scenario comes to an evaluation value from the optimum operation plan for each scenario, and a lower regret value indicates higher response capability.

For example, the response capability evaluation table 3119 stores the initial operation plan "1", the supply-demand scenario "1", and the response capability evaluation "2" for the initial operation plan in a correlated manner. Therefore, the response capability evaluation table 3119 indicates that the evaluation value of the response capability is "2" when the storage battery is operated according to the initial operation plan "1" for the supply-demand scenario "1".

The response capability evaluation table 3119 stores another supply-demand scenario and another response capability evaluation for the supply-demand scenario in a correlated manner for the initial operation plan "1". In this way, the response capability evaluation table 3119 stores multiple supply-demand scenarios and multiple response capability evaluations in a correlated manner for one initial operation plan. The response capability evaluation table 3119 also stores the initial operation plans, the supply-demand scenarios, and the response capability evaluations for the other initial operation plans in a correlated manner in the same way for the other initial operation plans.

Returning to the description of FIG. 31, the control unit 3120 has an accepting unit 3121, the supply-demand scenario generating unit 3122, an optimum evaluation value calculating unit 3123, a corrected evaluation value calculating unit 3124, a response capability calculating unit 3125, an optimum plan selecting unit 3126, and the output unit 3127.

The accepting unit 3121 accepts various types of information from the input apparatus 3101. For example, the accepting unit 3121 accepts the demand data 3111*a* and the insolation data 3112 from the input apparatus 3101 and stores the accepted demand data 3111*a* and insolation data 3112 into the memory unit 3110.

For example, the accepting unit 3121 accepts the start time t0, the end time t_e, the initial sunlight duration h0, and the time increment width Δt from the input apparatus 3101 as conditions identifying a range of insolation variation to be considered in creation of the operation plan. The start time t0 and the end time t_e correspond to the start time and the end time, respectively, of a time period while power generation output may vary at a considerable level or more due to an effect of a change in weather, i.e., a time period while sufficient power generation output is expected in the case of fine weather. For example, the start time t0 is 9 o'clock and the end time t_e is 15 o'clock. The initial sunlight duration h0 is insolation at the start time t0 on the day for which the initial operation plan is created and is calculated based on the weather at the start time t0 forecasted in the weather report on the previous day. For example, if the forecasted weather at the start time t0 is "clear", the initial sunlight duration h0 is "1". Although the accepting unit 3121 accepts the initial sunlight duration h0 in the description, this is not a limitation.

For example, the accepting unit 3121 may accept initial insolation. The insolation is converted into sunlight duration to calculate the initial sunlight duration h0. For example, a correlation between the sunlight duration and the insolation for each month is used for this conversion. For example, the sunlight duration is calculated by using an equation of a regression line acquired by regression analysis of the sunlight duration and the insolation. The time increment width Δt corresponds to a time interval of the sunlight duration recorded on the insolation data 3112. For example, the time increment width Δt is one hour. The accepting unit 3121 outputs the accepted start time t0, the end time t_e, the initial sunlight duration h0, and the time increment width Δt to the supply-demand scenario generating unit 3122.

The supply-demand scenario generating unit 3122 generates multiple scenarios representative of possibility of change in the supply-demand power value. For example, the supply-demand scenario generating unit 3122 constructs a weather variation model modeling weather variation per unit time as a Markov process based on the insolation data 3112. The supply-demand scenario generating unit 3122 performs the Monte Carlo simulation based on the constructed weather variation model to generate multiple output variation scenarios O.

The supply-demand scenario generating unit 3122 obtains a difference between the multiple output variation scenarios O and a demand variation scenario indicated by the demand data 3111*a* to generate multiple supply-demand scenarios. The supply-demand scenarios are time-series data having as an element a difference between the power demand in the power grid in which the storage battery is operated and the output of the power solar generation. The supply-demand scenario generating unit 3122 is an example of a generating unit. The supply-demand power value corresponds to a difference between the power demand in the power grid in which the storage battery is operated and the output of the power solar generation and is also referred to as a supply-demand difference or a supply-demand balance. The supply-demand scenario is an example of a scenario.

A process executed by the supply-demand scenario generating unit 3122 will hereinafter be described in detail. For example, the supply-demand scenario generating unit 3122 generates the sunlight duration variation probability table 3113 from the insolation data 3112. Specifically, the supply-demand scenario generating unit 3122 models the variation of sunlight duration per unit time as a Markov process on the assumption that sunlight duration at a certain time is affected by sunlight duration at a time immediately before.

The supply-demand scenario generating unit 3122 can model the variation of sunlight duration as a Markov process because the sunlight duration is affected by the clouds and the states of the amount and density of the clouds continuously change with time. In other words, the reason is that when sunlight duration is measured at time intervals enabling perception of a continuous change in the state of the clouds, the sunlight duration is considered to be affected by the weather at the time immediately before.

Figure 39:
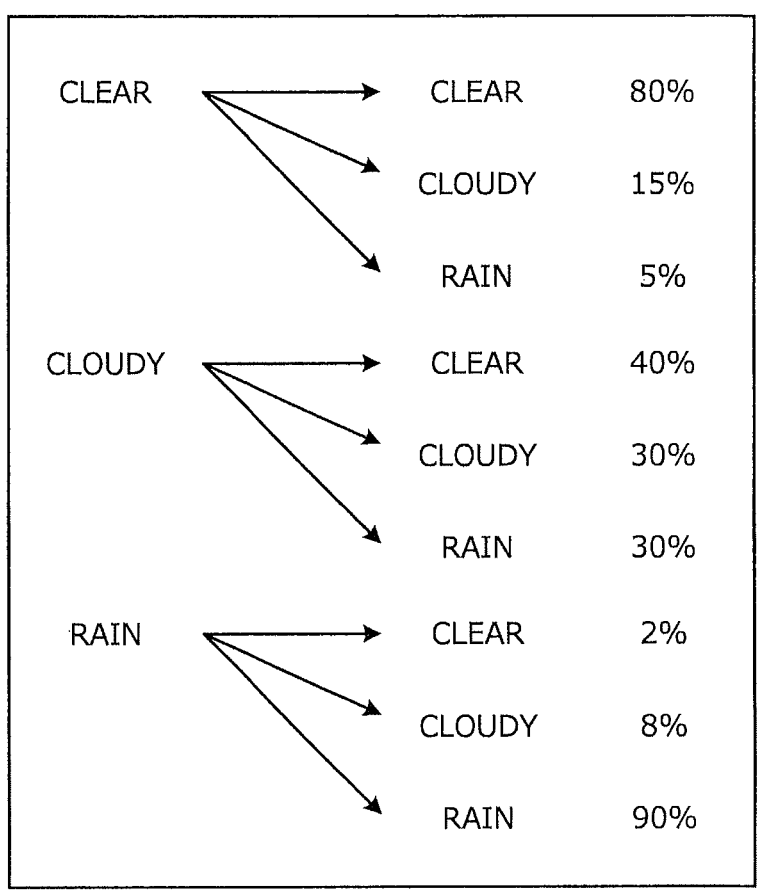
FIG. 39 is an explanatory view of a weather variation model.

FIG. 39 is an explanatory view of a weather variation model. For example, as depicted in FIG. 39, the supply-demand scenario generating unit 3122 classifies the weather into three types, i.e., clear, cloudy, and rain. The supply-demand scenario generating unit 3122 calculates a probability of variation from the current weather to the weather after one hour (three types of clear, cloudy, and rain) from data recording the past weather, thereby generating the weather variation model. The supply-demand scenario generating unit 3122 repeatedly applies the weather variation model every hour to output multiple scenarios representative of possibilities of daily weather variation. The weather variation model depicted in FIG. 39 is an example. In particular, the supply-demand scenario generating unit 3122 classifies the weather depending on sunlight duration and models how the sunlight duration changes after each type of sunlight duration.

For example, the supply-demand scenario generating unit 3122 calculates the conditional probability $P(H_{after}|H_{before})$ of variation from the sunlight duration $H_{before}$ to the sunlight duration $H_{after}$ when a unit time has elapsed by using Equation (34).

$P(H_{after}|H_{before})$=(number of data with sunlight duration $H_{after}$ appearing after sunlight duration $H_{before}$)/(number of data with sunlight duration $H_{before}$ appearing) (34)

By calculating the conditional probability $P(H_{after}|H_{before})$ from the past insolation data 3112 by utilizing Equation (34), the supply-demand scenario generating unit 3122 generates the sunlight duration variation probability table 3113 depicted in FIG. 33.

For example, the supply-demand scenario generating unit 3122 generates multiple output variation scenarios based on the generated sunlight duration variation probability table 3113. For example, the supply-demand scenario generating unit 3122 accepts the start time t0, the end time t_e, the initial sunlight duration h0, and the time increment width Δt from the accepting unit 3121. The supply-demand scenario generating unit 3122 uses the initial sunlight duration h0 as an initial value and applies the sunlight duration variation probability table 3113 from the start time t0 to the end time t_e for each unit time to probabilistically generate the N insolation variation scenarios through the Monte Carlo simulation. N is a sufficiently large natural number, for example, 10000. For example, the supply-demand scenario generating unit 3122 generates a uniform random number r and sets smallest x to H(t+Δt) when the integrated value of the conditional probability P (x|H(t)) less than or equal to x becomes larger than r. For example, if the sunlight duration H(t) is "0.1", the supply-demand scenario generating unit 3122 refers to the column of "0.1-0.5" of the insolation duration before variation in the sunlight duration variation probability table 3113 depicted in FIG. 33.

The supply-demand scenario generating unit 3122 acquires "H(t+Δt)=0.0" if the generated random number is "r<0.45" and acquires "H(t+Δt)=0.1" if the generated random number is "0.45≤r≤0.6". As described above, the supply-demand scenario generating unit 3122 acquires sunlight duration H(t+Δt), which varies for each time increment width Δt from the start time t0 to the end time t_e.

The supply-demand scenario generating unit 3122 uses the correlation between the sunlight and the insolation described above to convert the acquired sunlight duration H(t+Δt) into insolation I(t+Δt). The supply-demand scenario generating unit 3122 generates variation in the insolation I(t+Δt) from the start time t0 to the end time t_e as an insolation variation scenario I. The supply-demand scenario generating unit 3122 repeatedly executes the same process to generate the N insolation variation scenarios I. N is a sufficiently large natural number, for example, 10000.

Figure 40:
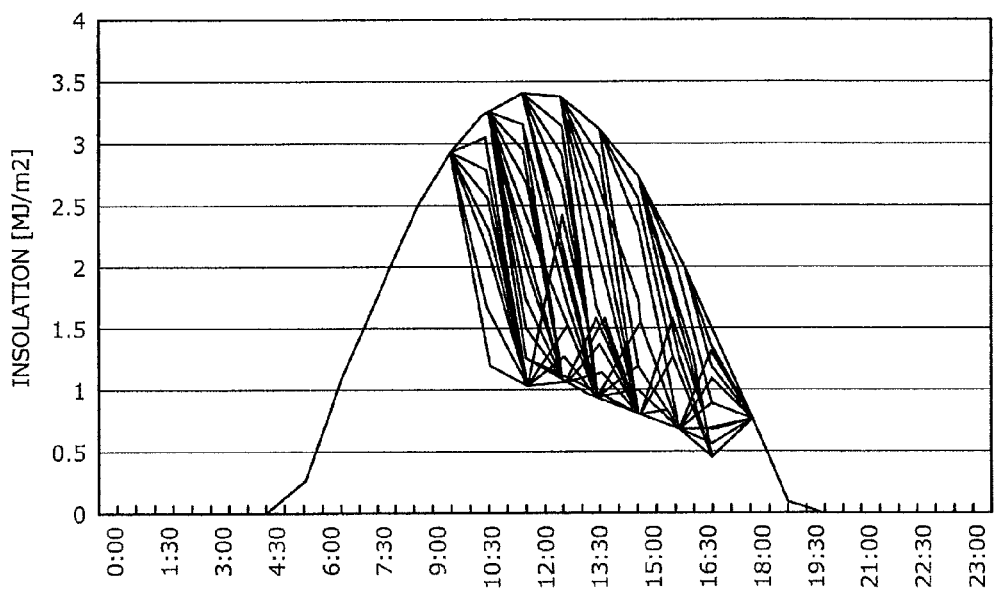
FIG. 40 is an explanatory view of an example of an insolation variation scenario.

FIG. 40 is an explanatory view of an example of the insolation variation scenario. The horizontal axis of FIG. 40 indicates time and the vertical axis indicates insolation [MJ/m$^2$]. A time period of the insolation variation scenario I from 9 o'clock to 16 o'clock is the insolation variation scenario I representative of variation in insolation from 9 o'clock to 16 o'clock and includes N scenarios. A time period from 0 o'clock to 9 o'clock and a time period from 16 o'clock to 24 o'clock are portions generated based on the past insolation data 3112 and include one scenario.

For example, the supply-demand scenario generating unit 3122 generates an output variation scenario O in the solar power generation based on the generated insolation variation scenario I. For example, the supply-demand scenario generating unit 3122 converts insolation I(t) [MJ/m$^2$] included in the insolation variation scenario I into a power generation amount O(t) [kWh] from the solar power generation. This conversion is performed by correlating insolation with conversion efficiency that varies depending on the scale and type of panels and the ambient temperature, and estimating the power generation amount.

As described above, the supply-demand scenario generating unit 3122 calculates the power generation amount O(t) from the insolation I(t) included in the insolation variation scenario I to generate the scenario from the start time t0 to the end time t_e. For example, supply-demand scenario generating unit 3122 refers to the past data of the power generation amount of the solar power generation and calculates an average value of the power generation amount in each time period to generate the power generation amount from 0 o'clock to the start time t0 and the scenario from the end time t_e to 24 o'clock.

The supply-demand scenario generating unit 3122 combines the scenario from the start time t0 to the end time t_e with the power generation amount from 0 o'clock to the start time t0 and the scenario from the end time t_e to 24 o'clock to generates the output variation scenario O of a day. The supply-demand scenario generating unit 3122 stores the generated output variation scenario O as the output variation data 3114 into the memory unit 3110. Although conversion efficiency is used in the description, this is not a limitation. For example, correlation between the insolation I(t) and the power generation amount O(t) may be used. For example, the power generation amount O(t) is calculated by substituting the insolation I(t) in an equation of a regression line acquired by regression analysis of the insolation I(t) and the power generation amount O(t).

For example, the supply-demand scenario generating unit 3122 obtains a difference between the multiple output variation scenarios O and the demand variation scenario depicted in FIG. 32 to generate multiple supply-demand scenarios. For example, the supply-demand scenario generating unit 3122 subtracts a power generation amount of a corresponding time period in the output variation scenarios O from a demand power value of each time period in the demand variation scenario to generate the supply-demand scenarios. Therefore, the supply-demand scenarios act as an index of a demand power amount for the storage battery.

Figure 41:
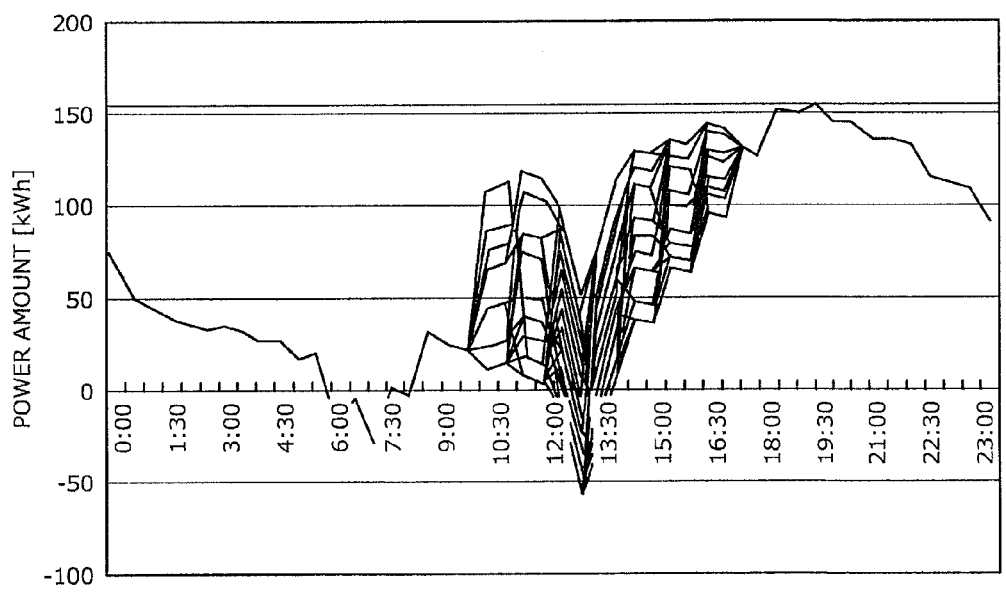
FIG. 41 is an explanatory view of an example of supply-demand scenarios.

FIG. 41 is an explanatory view of an example of the supply-demand scenarios. The horizontal axis of FIG. 41 indicates time and the vertical axis indicates a power amount [kWh]. When this power amount is larger, demand is higher. As depicted in FIG. 41, the supply-demand scenarios represent changes in the supply-demand power amounts for each time period of a day. For example, if the M supply-demand variation scenarios and the N output variation scenarios are used, the supply-demand scenario generating unit 3122 generates M×N supply-demand scenarios. The supply-demand scenario generating unit 3122 stores the generated supply-demand scenarios as the supply-demand data 3115 into the memory unit 3110.

Returning to description of FIG. 31, the optimum evaluation value calculating unit 3123 calculates for each scenario, an operation plan resulting in the best evaluation value of evaluation values when the storage battery is operated, and records the best evaluation value as the first evaluation value for each scenario. For example, the optimum evaluation value calculating unit 3123 creates the optimum operation plan that is the operation plan resulting in the best evaluation value from simulation for each of the supply-demand scenarios generated by the supply-demand scenario generating unit 3122. The optimum evaluation value calculating unit 3123 stores the supply-demand scenario, the evaluation value from the optimum operation plan, and the optimum control parameter resulting in the best evaluation value, in a correlated manner into the optimum operation evaluation table 3116 depicted in FIG. 35. The optimum evaluation value calculating unit 3123 is an example of a first calculating unit.

An optimum operation plan creating process executed by the optimum evaluation value calculating unit 3123 will hereinafter be described in detail. The storage battery is operated in the peak-cut mode in this description. For example, the optimum evaluation value calculating unit 3123 selects the supply-demand scenarios generated by the supply-demand scenario generating unit 3122 one-by-one to execute the following process.

The optimum evaluation value calculating unit 3123 applies various discharge reference values to the selected supply-demand scenario to perform simulation and calculate evaluation values. The discharge reference values are, for example, discharge reference values included in a search range of a control parameter applied in order by a predetermined increment width. The discharge reference value resulting in the best evaluation value is selected for the optimum operation plan. The search range of a control parameter will be described.

Figure 42:
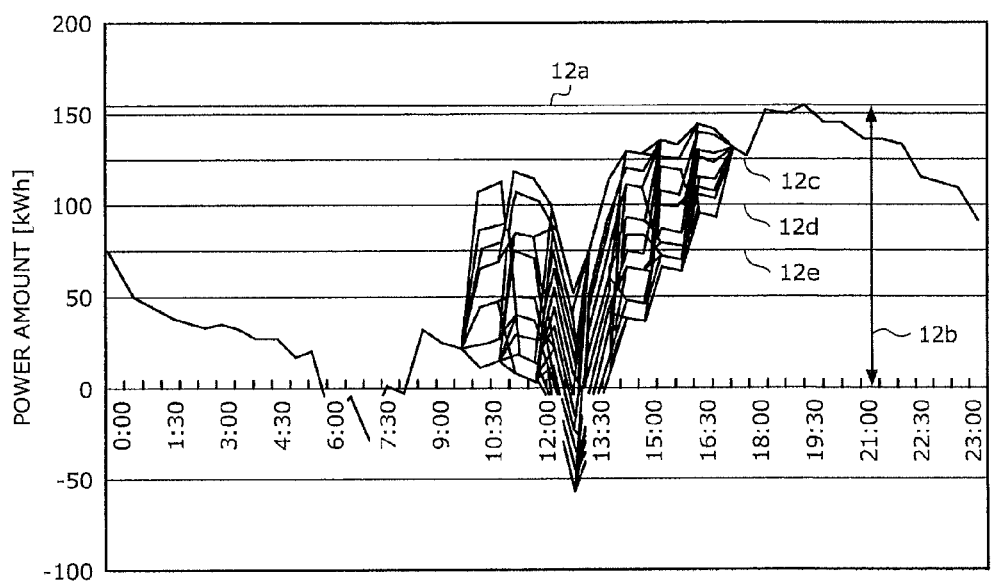
FIG. 42 is a diagram for explaining the search range of a control parameter.

FIG. 42 is a diagram for explaining the search range of a control parameter. The horizontal axis of FIG. 42 indicates time and the vertical axis indicates power amount [kWh]. FIG. 42 depicts the search range of a control parameter for the supply-demand scenarios depicted in FIG. 41. If the storage battery is operated in the peak-cut mode, the discharge reference value is a positive value not exceeding the maximum demand value of the supply-demand scenarios. Therefore, in the example depicted in FIG. 42, the optimum evaluation value calculating unit 3123 uses a range from a maximum demand value 12a to the power value of 0 [kW] as a search range 12b. Therefore, the optimum evaluation value calculating unit 3123 uses an arbitrary power value from the search range 12b as a discharge reference value and uses the selected discharge reference value in the simulation. For example, discharge reference values 12c, 12d, and 12e are 125 [kW], 100 [kW], and 75 [kW], respectively.

For example, the optimum evaluation value calculating unit 3123 selects the highest discharge reference value of 157 [kW] among the discharge reference values included in the search range 12b and performs simulation of operation of the storage battery at the selected discharge reference value of 157 [kW]. The optimum evaluation value calculating unit 3123 repeats the process of selecting a value lower by a decrement width of 1 [kW] as the next discharge reference value and performing the simulation in the same way to the lower limit of the search range 12b.

The optimum evaluation value calculating unit 3123 selects as the optimum operation plan the discharge reference value resulting in the best peak-cut effect among the discharge reference values acquired by the simulation. The optimum evaluation value calculating unit 3123 stores the supply-demand scenario, the best peak-cut effect, and the discharge reference value resulting in the best peak-cut effect in a correlated manner into the optimum operation evaluation table 3116. The best peak-cut effect corresponds to the evaluation value from the optimum operation plan, and the discharge reference value resulting in the best peak-cut effect corresponds to the optimum control parameter.

The optimum evaluation value calculating unit 3123 executes the same process for the other supply-demand scenarios to generate the optimum operation evaluation table 3116. The optimum operation plan search process executed by the optimum evaluation value calculating unit 3123 is not limited to the method described above. For example, the discharge reference values may be selected in order from the lowest discharge reference value of 0 [kW] of the discharge reference values included in the search range 12b at intervals of 1 [kW]. For example, the discharge reference values may be selected at intervals of 5 [kW]. Alternatively, the optimum plan may be searched by using an optimization algorithm such as particle swarm optimization and a genetic algorithm.

The corrected evaluation value calculating unit 3124 creates multiple operation plan candidates and calculates for each operation plan candidate the second evaluation value acquired when the storage battery is operated until the plan correction time according to the operation plan candidate for each scenario. For example, the corrected evaluation value calculating unit 3124 creates multiple candidates for the initial operation plan. The corrected evaluation value calculating unit 3124 calculates for a created initial operation plan, the evaluation value when the storage battery is operated according to the plan until the correction time point and is then operated in the subsequent state (storage battery remaining amount) according to the optimum corrected operation plan indicative of the optimum operation plan after the correction time point for each supply-demand scenario. The corrected evaluation value calculating unit 3124 is an example of a second calculating unit.

A process executed by the corrected evaluation value calculating unit 3124 will hereinafter be described in detail. First, the corrected evaluation value calculating unit 3124 creates a candidate of the initial operation plan. The corrected evaluation value calculating unit 3124 creates a candidate of the initial operation plan within a range from the minimum value to the maximum value of the optimum control parameter in the optimum operation evaluation table 3116 depicted in FIG. 35.

This is because if the storage battery is operated in the peak-cut mode, the peak-cut effect for each supply-demand scenario has the property of decreasing when a discharge reference value deviates from the optimum discharge reference value for the supply-demand scenario and becoming zero when the deviation reaches a certain level or more. For example, the corrected evaluation value calculating unit 3124 uses the discharge reference values from 50 [kW] to 150 [kW] at intervals of 10 [kW] to create the candidates of the initial operation plan.

The corrected evaluation value calculating unit 3124 stores an initial operation plan and a control parameter in a correlated manner into the initial operation plan table 3117 depicted in FIG. 36. The candidate of the initial operation plan corresponds to the initial operation plan and the discharge reference value corresponds to the control parameter. The method of creating a candidate of the initial operation plan is not limited to the method described above. For example, the corrected evaluation value calculating unit 3124 may arbitrarily create a candidate in the search range 12b depicted in FIG. 42.

The corrected evaluation value calculating unit 3124 creates the optimum corrected operation plan for each initial operation plan candidate. For example, the corrected evaluation value calculating unit 3124 performs simulation of the case that the storage battery is operated according to an initial operation plan candidate for each supply-demand scenario. The corrected evaluation value calculating unit 3124 calculates a storage battery remaining amount if the storage battery is operated until the correction time from the simulation result. The corrected evaluation value calculating unit 3124 creates an optimum operation plan resulting in the best evaluation value when the storage battery is operated from the correction time to the operation end time with the calculated storage battery remaining amount used as the initial remaining amount of the storage battery, and records the optimum operation plan as the optimum corrected operation plan for a combination of the initial operation plan candidate and the scenario. This optimum corrected operation plan creating process is executed with the same procedure as the optimum operation plan creating process executed by the optimum evaluation value calculating unit 3123.

The corrected evaluation value calculating unit 3124 calculates an evaluation value when the storage battery is operate according to the initial operation plan candidate until the correction time and according to the optimum corrected operation plan after the correction time, and stores the evaluation value as the second evaluation value for a combination of the initial operation plan candidate and each scenario into the corrected operation evaluation table 3118 depicted in FIG. 37. The corrected evaluation value calculating unit 3124 executes the same process for the other initial operation plans. Alternatively, the optimum plan may be searched by using an optimization algorithm such as particle swarm optimization and a genetic algorithm.

The response capability calculating unit 3125 calculates for each operation plan candidate a difference between the first evaluation value and the second evaluation value of each scenario. For example, the response capability calculating unit 3125 calculates the difference of an evaluation value from the optimum operation plan depicted in the optimum operation evaluation table 3116 of FIG. 35 and an evaluation value of the optimum corrected operation plan for the initial operation plan Q depicted in the corrected operation evaluation table 3118 of FIG. 37, thereby evaluating the response capability. In other words, the response capability calculating unit 3125 evaluates the response capability in terms of how close an evaluation value of the optimum corrected operation plan for each supply-demand scenario comes to an evaluation value from the optimum operation plan for each scenario. The response capability calculating unit 3125 is an example of a third calculating unit.

For example, the response capability calculating unit 3125 uses Equation (35) to calculate the regret value. For example, the response capability calculating unit 3125 evaluates that the response capability is higher when the regret value is lower.

(regret value)=(evaluation value from optimum operation plan)−(evaluation value of optimum corrected operation plan for initial operation plan) (35)

For example, the response capability calculating unit 3125 stores the initial operation plan, the supply-demand scenario, and the response capability evaluation for the initial operation plan in a correlated manner into the response capability evaluation table 3119 depicted in FIG. 38. The regret value corresponds to the response capability evaluation for the initial operation plan. The response capability calculating unit 3125 executes the process in the same way for the other initial operation plans.

The optimum plan selecting unit 3126 selects an operation plan of the storage battery from multiple operation plans based on a difference between the first evaluation value and the second evaluation value. For example, the optimum plan selecting unit 3126 tabulates distribution of regret values for each initial operation plan candidate and selects the initial operation plan based on the distribution of the tabulated regret values. The optimum plan selecting unit 3126 is an example of a selecting unit.

Figure 43:
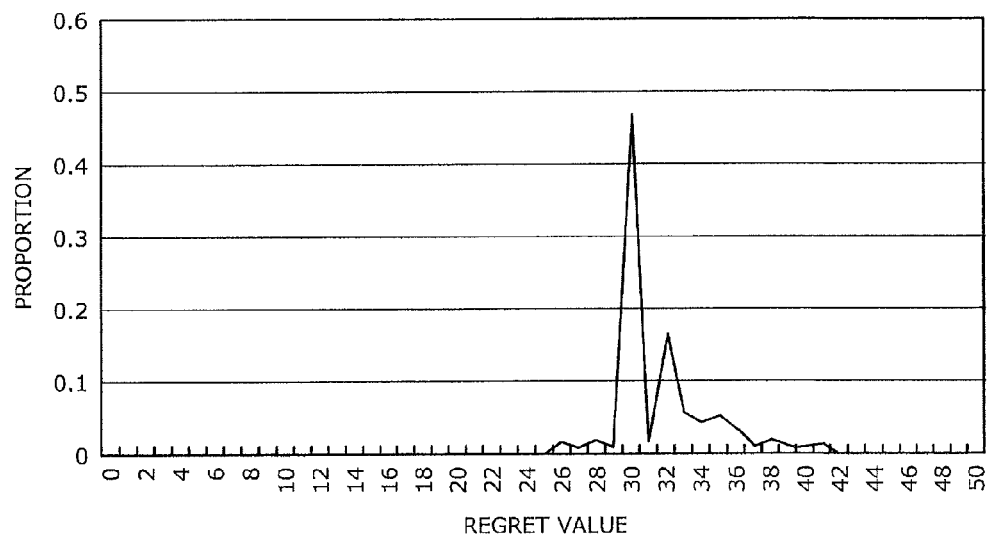
FIGS. 43, 44, and 45 are diagrams of examples of distribution of regret values.
Figure 44:
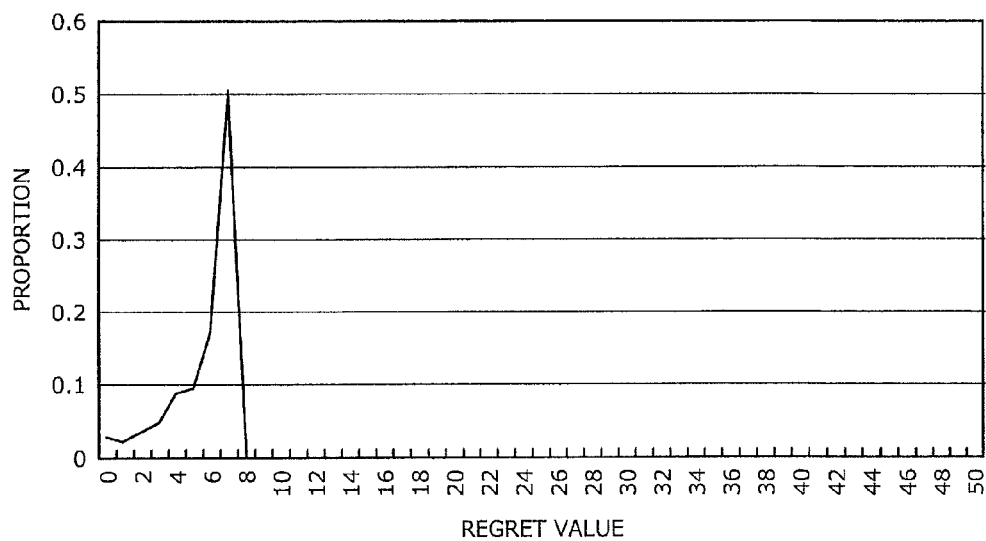
Figure 45:
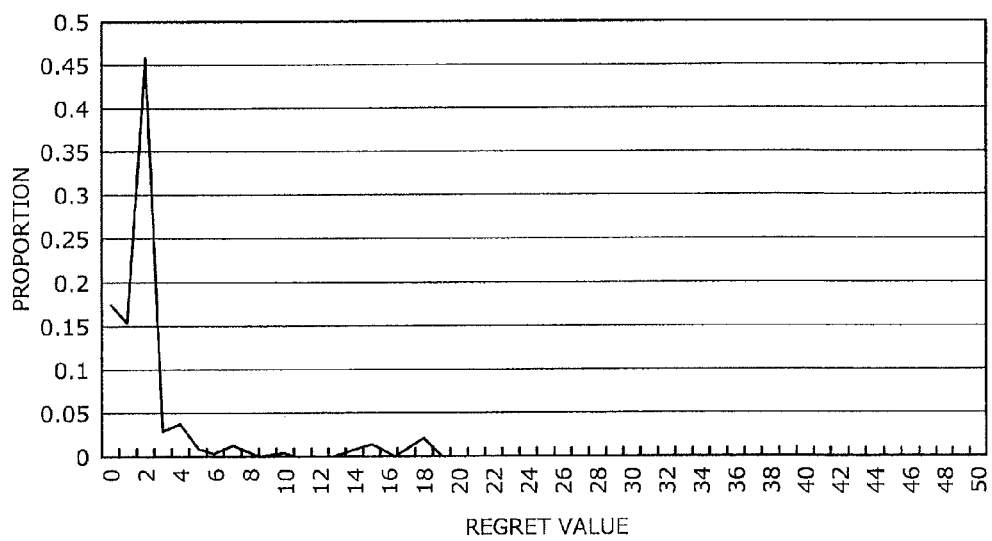

FIGS. 43, 44, and 45 are diagrams of examples of distribution of regret values. The horizontal axes of FIGS. 43 to 45 indicate regret values and the vertical axes indicate the proportion of supply-demand scenarios corresponding to the regret value. FIG. 43 depicts an example of distribution of regret values of an initial operation plan A. As depicted in FIG. 43, the initial operation plan A has the best regret value of 21 and the worst regret value of 42. FIG. 44 depicts an example of distribution of regret values of an initial operation plan B. As depicted in FIG. 44, the initial operation plan B has the best regret value of 0 and the worst regret value of 7. FIG. 45 depicts an example of distribution of regret values of an initial operation plan C. As depicted in FIG. 45, the initial operation plan C has the best regret value of 0 and the worst regret value of 19.

Description will be made of the case of making a comparison between the initial operation plan A depicted in FIG. 43 and the initial operation plan B depicted in FIG. 44 based on the Wald criterion. The Wald criterion is a criterion for selecting an operation plan having the best value of the evaluation values in the worst scenarios for the respective operation plans (worst evaluation values). While the initial operation plan A has the best regret value of 21, the initial operation plan B has the regret value of 7 even in the worst case.

Therefore, the initial operation plan B is an operation plan with high response capability in which an almost optimum effect is expected as compared to the initial operation plan A on any assumption of the supply-demand scenario. Therefore, the optimum plan selecting unit 3126 selects the initial operation plan B if the comparison is made based on the Wald criterion. Selecting the regret value according to the Wald criterion in this way is referred to as the Savage criterion or the minimax loss criterion.

Description will be made of the case of making a comparison between the initial operation plan B depicted in FIG. 44 and the initial operation plan C depicted in FIG. 45 based on the Wald criterion. The initial operation plan C is an operation plan having a lower average regret value and a few numbers of supply-demand scenarios resulting in a higher regret value as compared to the initial operation plan B. Therefore, the initial operation plan C can be considered as an operation plan in which an effect close to the optimum operation plan is expected in the supply-demand scenarios with higher probability of occurrence while a larger loss may occur in rare cases as compared to the initial operation plan B.

Therefore, the initial operation plan B is an operation plan with high response capability in which an almost optimum effect is expected as compared to the initial operation plan C on any assumption of the supply-demand scenario. Therefore, the optimum plan selecting unit 3126 selects the initial operation plan B if the comparison is made based on the Wald criterion. The criterion of selection of the initial operation plan by the optimum plan selecting unit 3126 is not limited to the Wald criterion. For example, the optimum plan selecting unit 3126 may select the initial operation plan based on the criterion that the plan with the best average regret value is selected. In this case, the optimum plan selecting unit 3126 selects the initial operation plan C having the average regret value lower than the initial operation plan B.

For example, the optimum plan selecting unit 3126 may select the initial operation plan based on the criterion that the plan with the smallest dispersion of regret values is selected. In this case, the optimum plan selecting unit 3126 calculates the dispersions of regret values of the initial operation plans B and C and compares the calculated dispersions of regret values with each other. If the initial operation plan B has the smallest dispersion of regret values, the optimum plan selecting unit 3126 selects the initial operation plan B. For example, the optimum plan selecting unit 3126 may use the selection criteria described above in a combined manner. For example, the optimum plan selecting unit 3126 may select the initial operation plan having the worst regret value less than a predetermined value and the average regret value greater than a predetermined value.

The output unit 3127 outputs various pieces of information to the output apparatus 3102. For example, the output unit 3127 outputs the best initial operation plan selected by the optimum plan selecting unit 3126 to the output apparatus 3102. The information output by the output unit 3127 is not limited to the best initial operation plan. For example, the output unit 3127 outputs the supply-demand scenario along with the initial operation plan selected by the optimum plan selecting unit 3126.

Figure 46:
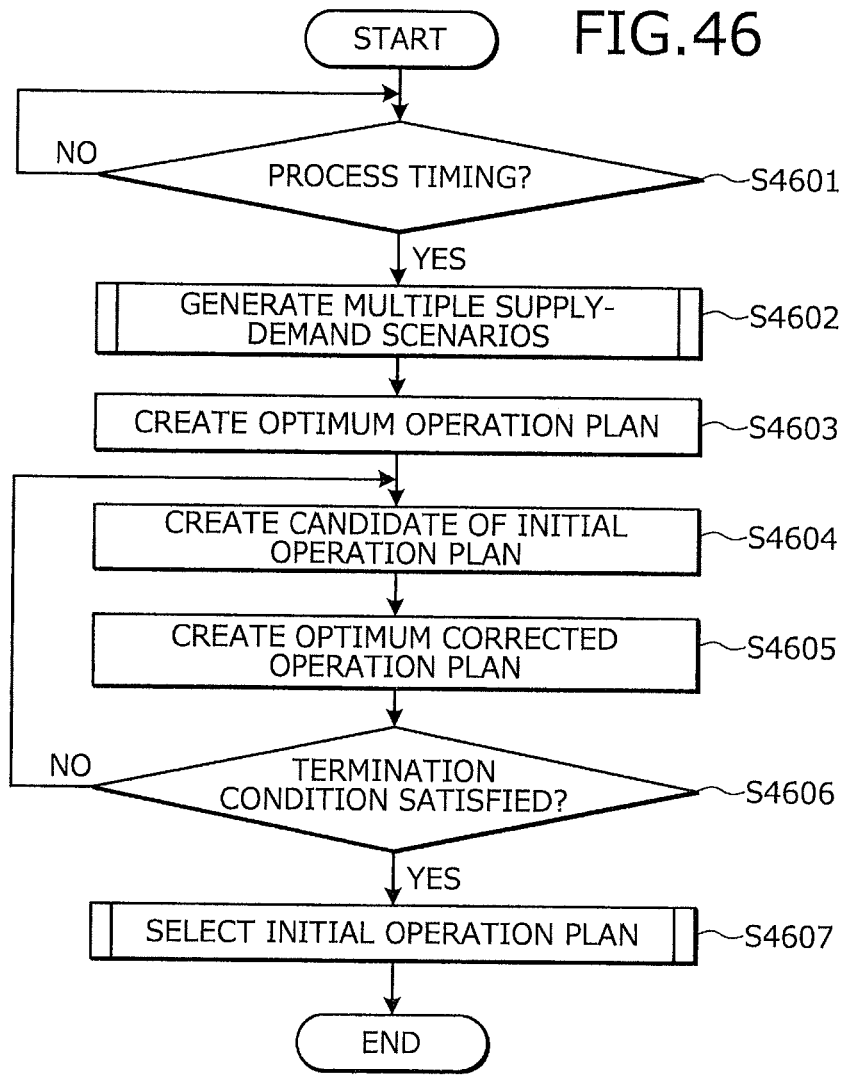
FIG. 46 is a flowchart of a process procedure of the operation plan creating apparatus.

A process procedure of the operation plan creating apparatus 3100 will be described. FIG. 46 is a flowchart of the process procedure of the operation plan creating apparatus. The process depicted in FIG. 46 is executed, for example, when the accepting unit 3121 accepts the start time t0, the end time t_e, the initial sunlight duration h0, and the time increment width Δt.

As depicted in FIG. 46, the supply-demand scenario generating unit 3122 generates multiple supply-demand scenarios (step S4602). A process procedure of the supply-demand scenario generating process depicted at step S4602 of FIG. 46 will be described with reference to FIG. 47.

Figure 47:
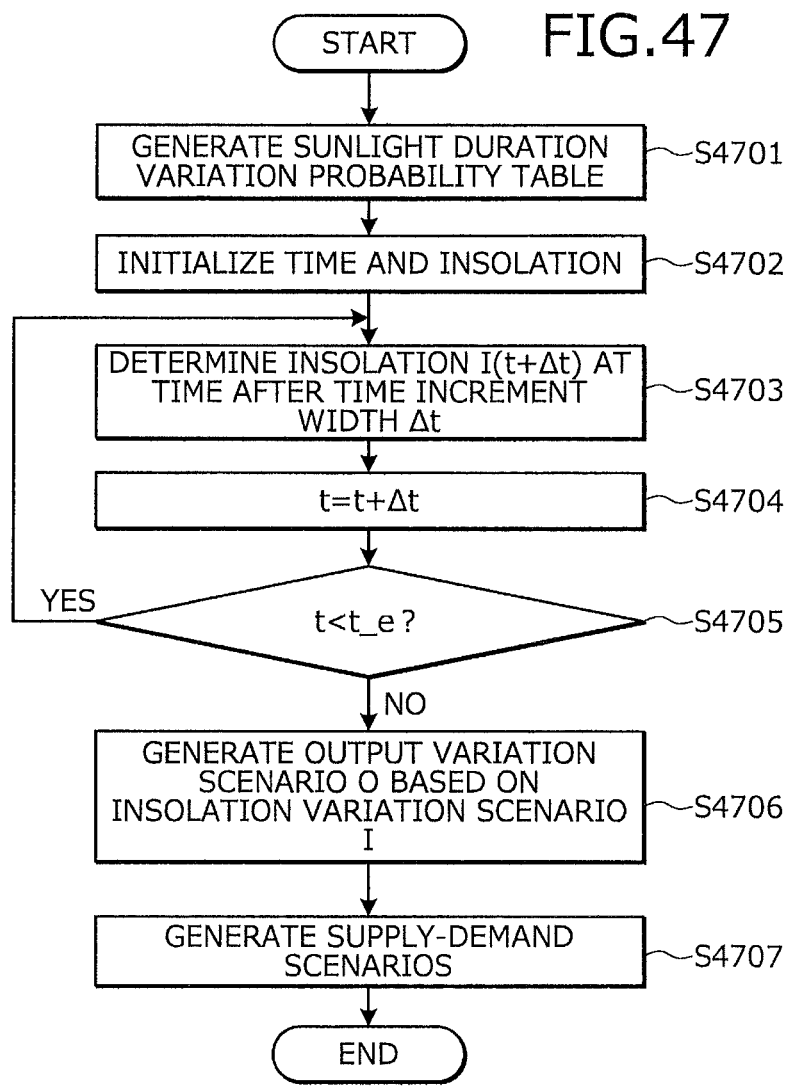
FIG. 47 is a flowchart of the process procedure of a supply-demand scenario generating process (step S4602)

FIG. 47 is a flowchart of the process procedure of the supply-demand scenario generating process (step S4602). As depicted in FIG. 47, the supply-demand scenario generating unit 3122 generates the sunlight duration variation probability table 3113 from the insolation data 3112 (step S4701). The supply-demand scenario generating unit 3122 initializes the time t and the insolation I (step S4702). In other words, the supply-demand scenario generating unit 3122 sets the time t=t0 and the insolation I(t)=h0.

The supply-demand scenario generating unit 3122 decides the insolation I(t+Δt) at the time after the time increment width Δt (step S4703). The supply-demand scenario generating unit 3122 uses the initial sunlight duration h0 as an initial value to acquire the sunlight duration H(t+Δt) at the time after the time increment width Δt. The supply-demand scenario generating unit 3122 uses the correlation between the sunlight duration and the insolation described above to convert the acquired sunlight duration H(t+Δt) into the insolation I(t+Δt).

The supply-demand scenario generating unit 3122 adds the time increment width Δt to the current time t (step S4704). The supply-demand scenario generating unit 3122 compares the time t with the end time t_e to determine whether t<t_e is satisfied (step S4705). If t<t_e is satisfied (step S4705: YES), the supply-demand scenario generating unit 3122 returns to the process of step S4703. The supply-demand scenario generating unit 3122 repeats the process from the step S4703 to step S4705 until the insolation variation scenario I is generated.

On the other hand, if t<t_e is not satisfied (step S4705: NO), the supply-demand scenario generating unit 3122 generates the output variation scenario O based on the insolation variation scenario I (step S4706). The supply-demand scenario generating unit 3122 repeats the process from the step S4702 to step S4706 until the N output variation scenarios O are generated. The supply-demand scenario generating unit 3122 obtains a difference of the N output variation scenarios O and the M demand variation scenarios to generate M×N supply-demand scenarios (step S4707).

Returning to description of FIG. 46, the optimum evaluation value calculating unit 3123 creates the optimum operation plan resulting in the best evaluation value from simulation for each of the multiple supply-demand scenarios generated by the supply-demand scenario generating unit 3122 (step S4603). The optimum evaluation value calculating unit 3123 stores the supply-demand scenario, the evaluation value from the optimum operation plan, and the optimum control parameter resulting in the best evaluation value in a correlated manner into the optimum operation evaluation table 3116.

The corrected evaluation value calculating unit 3124 creates a candidate of the initial operation plan (step S4604). The corrected evaluation value calculating unit 3124 creates the optimum corrected operation plan indicative of the optimum operation plan after the correction time point for the created candidate of the initial operation plan (step S4605). The corrected evaluation value calculating unit 3124 calculates an evaluation value when the storage battery is operate according to the optimum corrected operation plan for each of the supply-demand scenarios.

If a termination condition is not satisfied (step S4606: NO), the corrected evaluation value calculating unit 3124 returns to the process of step S4604. For example, if the process is not completed for all the created candidates for the initial operation plan, the corrected evaluation value calculating unit 3124 returns to the process of step S4604. For example, if a strong initial operation plan candidate to be evaluated next is estimated based on a combination of an initial operation plan candidate having an evaluation value calculated and a supply-demand scenario, the corrected evaluation value calculating unit 3124 returns to the process of step S4604.

On the other hand, if the termination condition is satisfied (step S4606: YES), the optimum plan selecting unit 3126 selects the initial operation plan (step S4607).

Figures 48, 49:
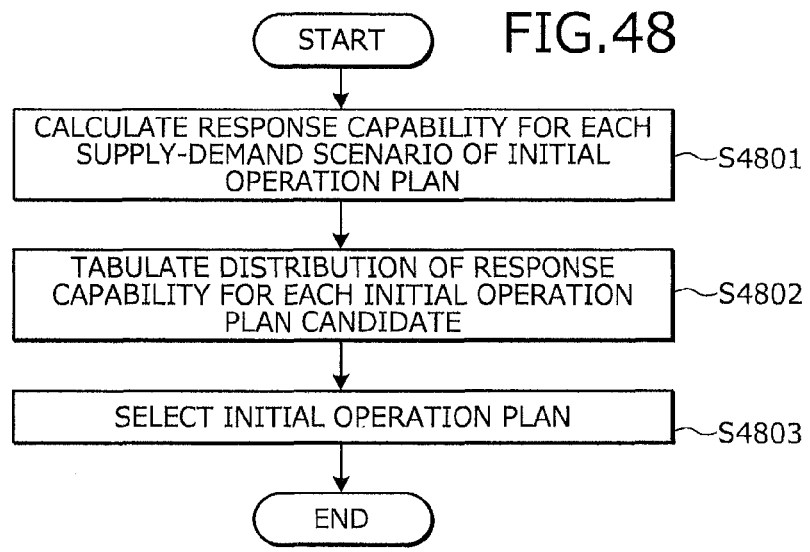
FIG. 48 is a flowchart of the process procedure of an initial operation plan selecting process.
FIG. 49 is an explanatory view of an example of the optimum operation evaluation table in the case of using an environmental load reduction effect.

A process procedure of the initial operation plan selecting process depicted at step S4607 of FIG. 46 will be described with reference to FIG. 48. FIG. 48 is a flowchart of the process procedure of the initial operation plan selecting process.

As depicted in FIG. 48, the response capability calculating unit 3125 calculates the response capability for each of the supply-demand scenarios of the initial operation plan (step S4801). Therefore, the response capability calculating unit 3125 calculates a difference between an evaluation value from the optimum operation plan recorded in the optimum operation evaluation table 3116 and an evaluation value of the optimum corrected operation plan for the initial operation plan Q recorded in the corrected operation evaluation table 3118, thereby evaluating the response capability.

The optimum plan selecting unit 3126 tabulates distribution of response capability for each initial operation plan candidate (step S4802). The optimum plan selecting unit 3126 selects the initial operation plan based on the tabulated distribution of response capability (step S4803).

The effect of the operation plan creating apparatus 3100 will be described. The operation plan creating apparatus 3100 generates multiple scenarios representative of possibility of changes in supply-demand power value. The operation plan creating apparatus 3100 calculates an operation plan resulting in the first evaluation value that is the best evaluation value when the storage battery is operated for each scenario. The operation plan creating apparatus 3100 calculates for each operation plan candidate the second evaluation value acquired when the storage battery is operated according to the plan for each scenario.

The operation plan creating apparatus 3100 calculates for each of the multiple operation plan candidates a difference between the first evaluation value and the second evaluation value for each scenario. The operation plan creating apparatus 3100 selects the operation plan of the storage battery from the multiple operation plans based on the difference. Therefore, the operation plan creating apparatus 3100 can create the operation plan capable of supporting any variations of the weather.

Since the initial operation plan candidates are evaluated by using the multiple scenarios representative of possibility of change in the supply-demand power value possibly occurring due to weather variation based on the first evaluation value that is the best value for each scenario, the initial operation plan with high response capability can be selected such that if the operation plan is properly corrected after operation according to the initial operation plan until the correction time, the acquired effect is close to that of the operation performed according to the optimum operation plan for a scenario from the beginning regardless of which scenario is realized.

The operation plan creating apparatus 3100 generates the supply-demand scenarios through modeling such that even a situation of significant variation in output of the solar power generation is included in the power generation output variation scenarios depending on probability of occurrence of variation in the past weather data. Therefore, the operation plan creating apparatus 3100 can perform the evaluation of operation plans including the possibility of rapid variation in output from the solar power generation and select a highly evaluated operation plan.

For example, when the storage battery is operated in the peak-cut mode in a conventional technique, a smaller storage battery remaining amount may make it unable to support even a relatively small brief output reduction, resulting in a great loss. In this regard, the operation plan creating apparatus 3100 can perform the evaluation of operation plans including an effect of such small-scale output reduction and therefore can select the operation plan with high response capability hardly affected by output variations of the solar power generation.

For example, the operation plan creating apparatus 3100 outputs the supply-demand scenarios along with the selected initial operation plan. For example, the operation plan creating apparatus 3100 extracts the supply-demand scenarios included in a predetermined proportion in descending order of regret value for the selected initial operation plan and outputs the extracted supply-demand scenarios. Therefore, the operation plan creating apparatus 3100 can assist a specific study of the possibility of avoiding loss, such as improvement in a control mode of the storage battery and introduction of standby power-generating equipment compensating the shortage of remaining amount of the storage battery, for the output supply-demand scenarios.

For example, the operation plan creating apparatus 3100 extracts the supply-demand scenarios included at a predetermined proportion in descending order of regret value for the selected initial operation plan and outputs the extracted supply-demand scenarios. The operation plan creating apparatus 3100 calculates an expected storage battery remaining amount indicative of a storage battery remaining amount when the storage battery is operated until the correction time according to the selected initial operation plan for the extracted supply-demand scenarios.

The operation plan creating apparatus 3100 calculates an ideal storage battery remaining amount indicative of a storage battery remaining amount when the storage battery is operated until the correction time according to the best operation plan for the extracted supply-demand scenarios. A difference between the expected storage battery remaining amount and the ideal storage battery remaining amount corresponds to a total amount of electric power to be compensated for avoiding loss.

Therefore, the operation plan creating apparatus 3100 can approximately estimate a scale of standby power-generating equipment from which introduction effects can be expected. For example, although the operation plan is evaluated by using the peak-cut effect in the example described above, this is not a limitation. For example, an environmental load reduction effect and a cost reduction effect may be used for evaluating the operation plan.

The environmental load reduction effect will be described. The environmental load reduction effect is the evaluation of how much $CO_2$ is reduced by utilizing solar power generation and a storage battery. For example, the environmental load reduction effect is represented by Equation (36).

(environmental load reduction effect)=($CO_2$ conversion factor for daytime power generation)×(daytime power usage reduction amount)−($CO_2$ conversion factor for nighttime power generation)×(nighttime power usage) (36)

The $CO_2$ conversion factor for daytime power generation is 0.462 [kg-$CO_2$/kWh], for example, and the $CO_2$ conversion factor for nighttime power generation is 0.435 [kg-$CO_2$/kWh], for example. These are based on a reference literature "Secretariat of Investigative Commission for Calculation Method of Emission Factor by Business Operators Based on Act on Promotion of Global Warming Countermeasures, "Introduction of Seasonal Average Emission Factor (Mar. 27, 2009)"". The emission factors described in this description are merely examples and arbitrary values can be used. In the following description, the optimum operation evaluation table 3116, the corrected operation evaluation table 3118, and the response capability evaluation table 3119 in the case of using the environmental load reduction effect will be exemplarily illustrated.

FIG. 49 is an explanatory view of an example of the optimum operation evaluation table in the case of using the environmental load reduction effect. For example, the optimum operation evaluation table 3116 stores the supply-demand scenario "1", the evaluation value "17" from the optimum operation plan, and the optimum control parameter "278" in a correlated manner. Therefore, the optimum operation evaluation table 3116 indicates that the best discharge reference value for the supply-demand scenario "1" is 278 [kWh] and that the environmental load reduction effect is 17 kg-$CO_2$ if the storage battery is operated at this discharge reference value. The optimum operation evaluation table 3116 also stores the supply-demand scenarios, the evaluation values from the optimum operation plan, and the optimum control parameters in a correlated manner in the same way for the other supply-demand scenarios.

FIG. 50 is an explanatory view of an example of the corrected operation evaluation table in the case of using the environmental load reduction effect. For example, the corrected operation evaluation table 3118 stores the initial operation plan "1", the supply-demand scenario "1", and the evaluation value "16" of the optimum corrected operation plan for the initial operation plan Q in a correlated manner. Therefore, the corrected operation evaluation table 3118 indicates that the environmental load reduction effect is 16 [kg-$CO_2$] when the storage battery is operated according to the optimum corrected operation plan after the storage battery is operated according to the initial operation plan "1" for the supply-demand scenario "1".

The corrected operation evaluation table 3118 stores for the initial operation plan "1" another supply-demand scenario and another evaluation value of the optimum corrected operation plan for the initial operation plan Q in a correlated manner. In this way, the corrected operation evaluation table 3118 stores multiple supply-demand scenarios and multiple evaluation values of the optimum corrected operation plan for the initial operation plan Q in a correlated manner for one initial operation plan. The corrected operation evaluation table 3118 also stores the initial operation plans, the supply-demand scenarios, and the evaluation values of the optimum corrected operation plan for the initial operation plan Q in a correlated manner in the same way for the other initial operation plans.

The initial operation plans 1 to Q depicted in FIG. 50 correspond to the actions B1 to Bm in the first to third embodiments. The supply-demand scenarios 1 to M×N correspond to the states A1 to An in the first to third embodiments. Therefore, for example, if a request for the evaluation value V11 of the state A1 for the action B1 is transmitted from the calculator 402 to the calculator 401, the evaluation value V11=16 [kg-$CO_2$] is transmitted from the calculator 401 to the calculator 402.

FIG. 51 is an explanatory view of an example of the response capability evaluation table 3119. For example, the response capability evaluation table 3119 stores the initial operation plan "1", the supply-demand scenario "1", and the response capability evaluation "1" for the initial operation plan Q in a correlated manner. Therefore, the response capability evaluation table 3119 indicates that the deviation from the ideal value of the environmental load reduction effect is 1 [kg-$CO_2$] when the storage battery is operated according to the initial operation plan "1" for the supply-demand scenario "1".

The response capability evaluation table 3119 stores for the initial operation plan "1" another supply-demand scenario and another response capability evaluation for the initial operation plan Q in a correlated manner. In this way, the response capability evaluation table 3119 stores multiple supply-demand scenarios and multiple response capability evaluations for the initial operation plan Q in a correlated manner for one initial operation plan. The response capability evaluation table 3119 also stores the initial operation plans, the supply-demand scenarios, and the response capability evaluations for the initial operation plan in a correlated manner in the same way for the other initial operation plans.

The initial operation plans 1 to Q depicted in FIG. 51 correspond to the actions B1 to Bm in the first to third embodiments. The supply-demand scenarios 1 to M×N correspond to the states A1 to An in the first to third embodiments. Therefore, for example, if a request for the evaluation value V11 of the state A1 for the action B1 is transmitted from the calculator 402 to the calculator 401, the evaluation value V11=1 [kg-$CO_2$] is transmitted from the calculator 401 to the calculator 402.

As described above, even when the environmental load reduction effect is used, the operation plan creating apparatus 3100 stores the supply-demand scenario, the evaluation value from the optimum operation plan, and the optimum control parameter resulting in the best evaluation value in a correlated manner into the optimum operation evaluation table 3116 depicted in FIG. 49. The operation plan creating apparatus 3100 stores the initial operation plan, the supply-demand scenario, and the evaluation value of the optimum corrected operation plan for the initial operation plan Q in a correlated manner into the corrected operation evaluation table 3118 depicted in FIG. 50.

The operation plan creating apparatus 3100 calculates a difference between the evaluation value from the optimum operation plan depicted in the optimum operation evaluation table 3116 depicted of FIG. 49 and the evaluation value of the optimum corrected operation plan for the initial operation plan Q depicted in the corrected operation evaluation table 3118 depicted of FIG. 50, thereby evaluating the response capability. Therefore, the operation plan creating apparatus 3100 can create the operation plan resulting in an effect close to the best environmental load reduction effect regardless of variation of the weather.

The cost reduction effect will be described. The cost reduction effect is the evaluation of how much the cost is reduced in terms of a money amount by utilizing solar power generation and a storage battery. For example, the cost reduction effect is represented by Equation (37).

(cost reduction effect)=(power usage charge per 1 kWh)×{(power usage before measures)−(power usage after measures)}+{(basic charge before measures)−(basic charge after measures)}   (37)

The basic charge is calculated from the maximum demand value and set depending on an electric power company, for example. In the following description, the optimum operation evaluation table 3116, the corrected operation evaluation table 3118, and the response capability evaluation table 3119 in the case of using the cost reduction effect will be exemplarily illustrated.

FIG. 52 is an explanatory view of an example of the optimum operation evaluation table 3116 in the case of using the cost reduction effect. For example, the optimum operation evaluation table 3116 stores the supply-demand scenario "1", the evaluation value "36" from the optimum operation plan, and the optimum control parameter "278" in a correlated manner. Therefore, the optimum operation evaluation table 3116 indicates that the best discharge reference value for the supply-demand scenario "1" is 278 [kWh] and that the cost reduction effect is 36 million yen if the storage battery is operated at this discharge reference value. The optimum operation evaluation table 3116 also stores the supply-demand scenarios, the evaluation values from the optimum operation plan, and the optimum control parameters in a correlated manner in the same way for the other supply-demand scenarios.

FIG. 53 is an explanatory view of an example of the corrected operation evaluation table 3118 in the case of using the cost reduction effect. For example, the corrected operation evaluation table 3118 stores the initial operation plan "1", the supply-demand scenario "1", and the evaluation value "34" of the optimum corrected operation plan for the initial operation plan Q in a correlated manner. Therefore, the corrected operation evaluation table 3118 indicates that the cost reduction effect is 34 million yen when the storage battery is operated according to the optimum corrected operation plan after the storage battery is operated according to the initial operation plan "1" for the supply-demand scenario "1".

The corrected operation evaluation table 3118 stores for the initial operation plan "1" another supply-demand scenario and another evaluation value of the optimum corrected operation plan for the initial operation plan Q in a correlated manner. In this way, the corrected operation evaluation table 3118 stores multiple supply-demand scenarios and multiple evaluation values of the optimum corrected operation plan for the initial operation plan Q in a correlated manner for one initial operation plan. The corrected operation evaluation table 3118 also stores the initial operation plans, the supply-demand scenarios, and the evaluation values of the optimum corrected operation plan for the initial operation plan Q in a correlated manner in the same way for the other initial operation plans.

The initial operation plans 1 to Q depicted in FIG. 53 correspond to the actions B1 to Bm in the first to third embodiments. The supply-demand scenarios 1 to M×N correspond to the states A1 to An in the first to third embodiments. Therefore, for example, if a request for the evaluation value V11 of the state A1 for the action B1 is transmitted from the calculator 402 to the calculator 401, the evaluation value V11=34 [ten thousand yen] is transmitted from the calculator 401 to the calculator 402.

FIG. 54 is a diagram of an example of the response capability evaluation table 3119. For example, the response capability evaluation table 3119 stores the initial operation plan "1", the supply-demand scenario "1", and the response capability evaluation "2" for the initial operation plan Q in a correlated manner. Therefore, the response capability evaluation table 3119 indicates that the deviation from the ideal value of the cost reduction effect is 2 million yen when the storage battery is operated according to the initial operation plan "1" for the supply-demand scenario "1".

The response capability evaluation table 3119 stores for the initial operation plan "1" another supply-demand scenario and another response capability evaluation for the initial operation plan Q in a correlated manner. In this way, the response capability evaluation table 3119 stores multiple supply-demand scenarios and multiple response capability evaluations for the initial operation plan Q in a correlated manner for one initial operation plan. The response capability evaluation table 3119 also stores the initial operation plans, the supply-demand scenarios, and the response capability evaluations for the initial operation plan Q in a correlated manner in the same way for the other initial operation plans.

The initial operation plans 1 to Q depicted in FIG. 54 correspond to the actions B1 to Bm in the first to third embodiments. The supply-demand scenarios 1 to M×N correspond to the states A1 to An in the first to third embodiments. Therefore, for example, if a request for the evaluation value V11 of the state A1 for the action B1 is transmitted from the calculator 402 to the calculator 401, the evaluation value V11=2 [ten thousand yen] is transmitted from the calculator 401 to the calculator 402.

As described above, even when the cost reduction effect is used, the operation plan creating apparatus 3100 stores the supply-demand scenario, the evaluation value from the optimum operation plan, and the optimum control parameter resulting in the best evaluation value in a correlated manner into the optimum operation evaluation table 3116 depicted in FIG. 52. The operation plan creating apparatus 3100 stores the initial operation plan, the supply-demand scenario, and the evaluation value of the optimum corrected operation plan for the initial operation plan Q in a correlated manner into the corrected operation evaluation table 3118 depicted in FIG. 53.

The operation plan creating apparatus 3100 calculates a difference between the evaluation value from the optimum operation plan depicted in the optimum operation evaluation table 3116 of FIG. 52 and the evaluation value of the optimum corrected operation plan for the initial operation plan Q depicted in the corrected operation evaluation table 3118 of FIG. 53, thereby evaluating the response capability. Therefore, the operation plan creating apparatus 3100 can create the operation plan resulting in an effect close to the best cost reduction effect regardless of variation of the weather.

Among the processes described in the examples, all or a portion of the processes described as being automatically executed may manually be executed or all or a portion of the processes described as being manually executed may automatically be executed by a known method. For example, although the process of the optimum plan selecting unit 3126 is automatically executed in the description of FIG. 31, this process may manually be executed.

For example, the optimum plan selecting unit 3126 can cause the output apparatus 3102 to output a diagram representative of distribution of response capability for each initial operation plan candidate to allow a user to manually select the best operation plan. Additionally, the process procedures, the control procedures, the specific names, and the information including various data and parameters described in the document and the drawings may arbitrarily be changed unless otherwise specified. For example, the optimum operation evaluation table depicted in FIG. 35 may not necessarily store the optimum control parameters.

The constituent elements of the operation plan creating apparatus 3100 depicted in FIG. 31 are functionally conceptual elements and physical configuration may not be as depicted. In particular, the specific form of distribution/integration of the operation plan creating apparatus 3100 is not limited to the depicted form and all or a portion of the elements can be functionally or physically distributed/integrated in an arbitrary manner depending on various loads and usage situations. For example, the optimum evaluation value calculating unit 3123 and the corrected evaluation value calculating unit 3124 depicted in FIG. 31 can be configured in an integrated manner.

Although the storage battery operation plan has been described in the examples, the action plan is not limited to the storage battery and is applicable to the case of creating an effective operation plan of devices capable of adjusting an operating state of the devices depending on a change in demand. Therefore, description will hereinafter be made of the case of optimizing an operation plan adjusting the number of operating communication base stations in terms of reduction in energy necessary for the operation of the communication base stations of the operation plan depending on a change in communication demand. The creation of the operation plan assumed in this example will be described with reference to FIGS. 55 to 59.

Figure 55:
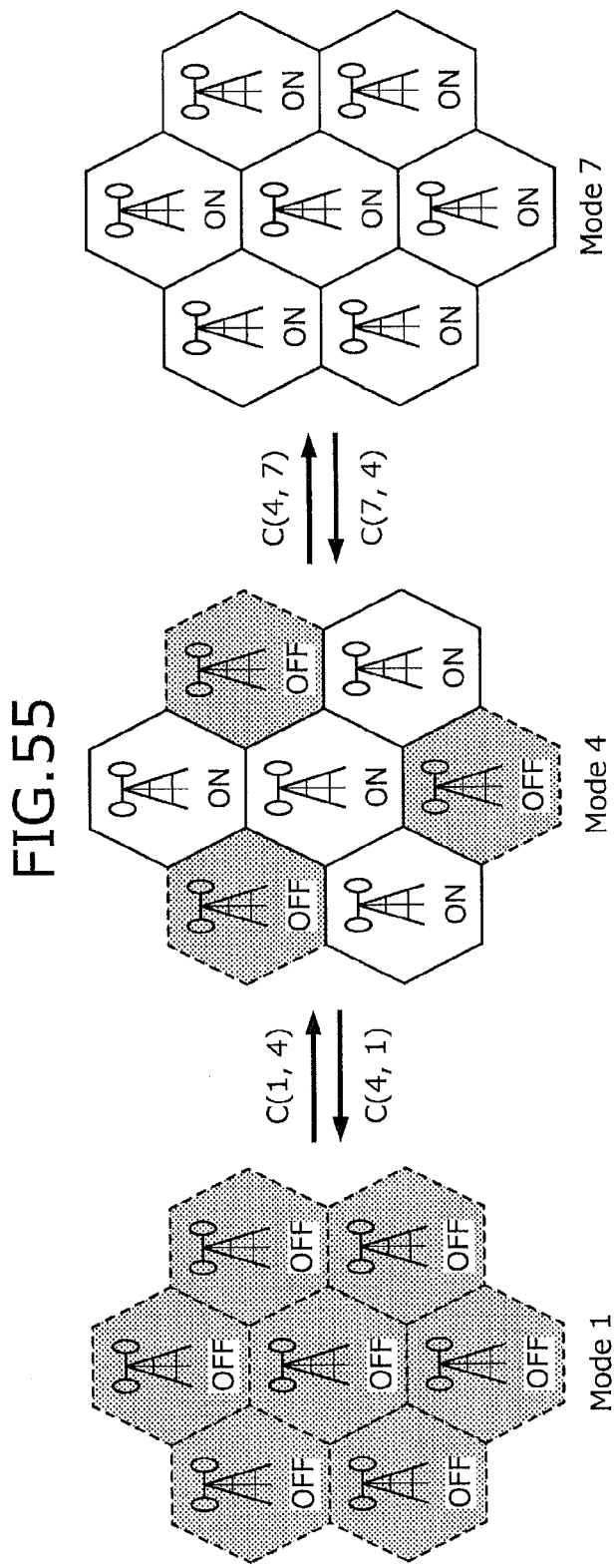
FIG. 55 is an explanatory view of an example of adjusting the number of operating communication base stations.

FIG. 55 is an explanatory view of an example of adjusting the number of operating communication base stations. In FIG. 55, an area made up of seven hexagons is the area to be covered by the communication base stations. Leftmost Mode 1 represents that the whole area is covered by one base station and, similarly, Mode 4 and Mode 7 to the right represent that the whole area is covered by four base stations and seven base stations, respectively.

In this example, a plan specifying any one of the three modes for operation in each preset time period is referred to as an operation plan. The purpose is to obtain the operation plan such that, regardless of which change occurs in communication demand expected in one day, operation can be performed with energy close to the minimum energy achieved if it is known that the change occurs in advance.

Figures 56, 57:
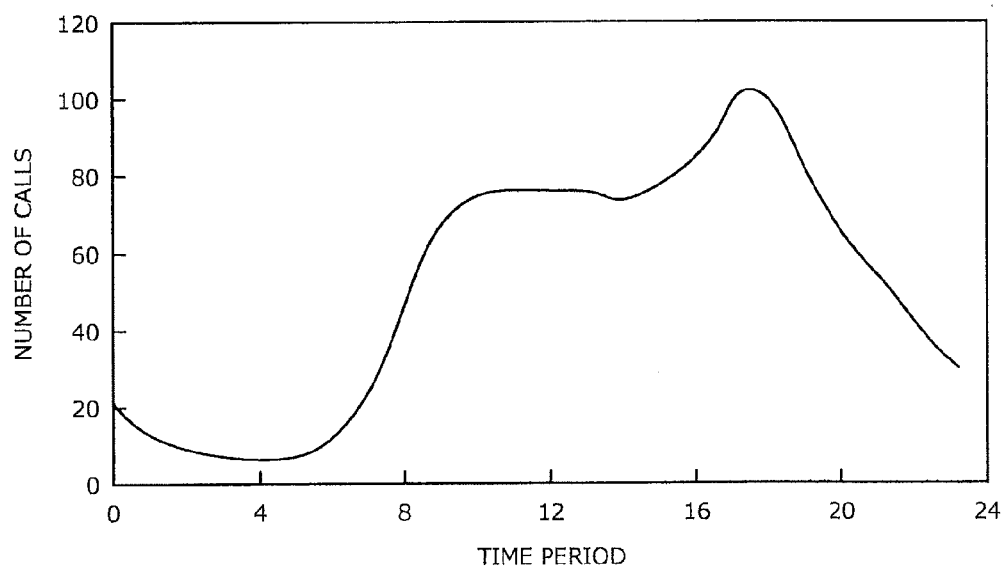
FIG. 56 is an explanatory view of an example of an operation plan.
FIG. 57 is an explanatory view of a typical data example of changes in daily communication demand.

FIG. 57 is an explanatory view of a typical data example of changes in daily communication demand. It is assumed in this example that one day is divided based on the changes into five time periods depicted in FIG. 56 and that any one of the modes in FIG. 55 is selected for operation in each time period. The time periods include 0 to 6 o'clock corresponding to a time period with low communication demand, 6 to 10 o'clock corresponding to a time period with communication demand having an increasing tendency, 10 to 14 o'clock corresponding to a time period with communication demand stable at relatively high level, 14 to 18 o'clock corresponding to a time period with the demand increasing to the peak, and 18 to 24 o'clock corresponding to a time period with the demand decreasing from the peak.

Figures 58, 59:
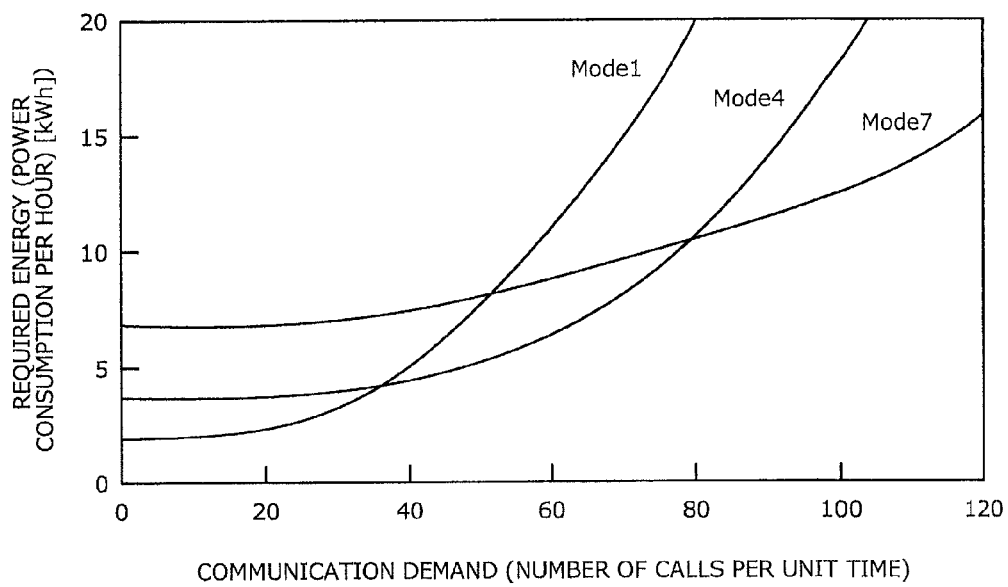
FIG. 58 is an explanatory view of the relationship between communication demand and an energy amount (power consumption per unit time) required for supporting the communication demand, for each operation mode.
FIG. 59 is an explanatory view of an example of costs required for switching the operation modes, taking another energy amount into consideration in creating the operation plan.

FIG. 58 is an explanatory view of the relationship between communication demand and an energy amount (power consumption per unit time) required for supporting the communication demand, for each operation mode. The horizontal axis is an amount of communication demand. The index of communication demand may be various indexes such as the number of calls, or communication volume, of users (mobile terminals) per unit time (e.g., about several minutes) or a combination of these indexes, and the number of calls per unit time is used in this example for simplicity of description.

The vertical axis indicates an energy amount required for supporting the communication demand in terms of a power amount consumed by the base stations per hour. For example, it is indicated that if a state with 20 calls made per unit time continues for an hour, power of about 1.5 [kWh] is consumed in Mode 1, and power of about 3 [kWh] is consumed in Mode 4 and is greater than Mode 1. Similarly, it is understood that if about 35 or more calls are made, smaller power consumption is required in Mode 4 than Mode 1. One point of creation of the operation plan of this example is to properly select an operation mode having relationship with energy efficiency varying depending on communication demand, in consideration of a change in the communication demand expected in each time period.

FIG. 59 is an explanatory view of an example of costs required for switching the operation modes, i.e., another energy amount is taken into consideration in creation of the operation plan of this example. For example, a first row is a cost for switching devices from Mode 1 to Mode 4 and corresponds to C(1,4) of FIG. 55. This example is on the assumption that the cost data is available in advance from past performance date or simulation etc.

A result of creation of the operation plan of the communication base stations described above will be described. A range of candidates of the operation plan assumed in this example is the range depicted in FIG. 56 described above. The range covers search ranges depicted in FIG. 60. The search ranges of FIG. 60 are those of operation modes worth consideration selected for the respective time periods based on changes in communication demand depicted in FIG. 57. All the combinations of the modes may be used as the operation plan candidates without considering the search ranges of FIG. 60.

Deciding the operation mode of 6 to 10 o'clock immediately before the time period of 6 to 10 o'clock will be taken as an example for describing a process procedure. First, in this example, scenarios of possible changes in communication demand are generated in the same procedure as the solar power generation output variation scenarios.

FIG. 61 is an explanatory view of an example of a variation probability table for generating communication demand scenarios. FIG. 61 includes "0-20", "20-40", "40-60", "60-80", and "80-" depicted horizontally and each corresponding to the number of calls per unit time. $N(\mu,\sigma)$ indicates that a value randomly generated according to normal distribution with an average value $\mu$ and standard deviation $\sigma$ is used as a value after variation. Probability values and values of $\sigma 1$ to $\sigma 5$ of this table may be calculated from statistical analysis of past communication demand data.

Although one variation probability table is used in the generation of the solar power generation output variation scenarios, the variation probability table as depicted in FIG. 61 is created based on past data and used for each of the five time periods in this example. Since the operation mode of 6 to 10 o'clock (operation plan from 6 o'clock to next 6 o'clock) is created in the currently described example, a value of communication demand immediately before 6 o'clock is used as an initial value for generating the communication demand.

An optimum operation plan (communicator operation mode switching plan) is created for each of the multiple created communication demand scenarios in the same procedure as the creation of the optimum operation plan of the storage battery for the supply-demand scenario. In the evaluation of the operation plan necessary for creating the optimum operation plan, an evaluation value is used that is calculated based on the following equation.

$$\text{(power consumption)} = \Sigma i(\Sigma t E(D\_t, \text{Mode}\_i)) + \Sigma i C(\text{Mode}\_i, \text{Mode}(i+1)) \quad (38)$$

In Equation (38), i is an index for each of the time periods and t is an index corresponding to a time incremented by unit time (e.g., 10 minutes) in each time period. In this example, 6 to 10 o'clock and 0 to 6 o'clock of the next data are considered as the first time period and the last time period, respectively. $D\_t$ is a communication demand value at the time corresponding to t and this is a value determined depending on a communication scenario to be evaluated. Mode_i is an operation mode specified for the time period i in the operation plan to be evaluated. $E(D\_t, \text{Mode}\_i)$ is a power amount consumed in the operation mode of Mode_i when the communication demand value of $D\_t$ continues for unit time and the value thereof is calculated from the data of FIG. 58. C( ) is the cost of the operation mode switching and the value thereof is calculated from the data of FIG. 59 (0 when the operation mode is not switched). The calculated power consumption corresponds to the evaluation value. Therefore, a lower evaluation value is a better value.

FIG. 62 is an explanatory view of an example of a created optimum operation plan. In FIG. 62, first numbers in the column of "optimum operation plan" are operation plan ID. Supplementary information for explanation is provided in parentheses and indicates how the operation modes are switched from the time period of 6 to 10 o'clock until the time period of 0 to 6 o'clock of the next day. For example, the operation plan indicated by ID14 represents operation in Mode 4 from 6 to 10 o'clock, in Mode 4 from 10 to 14 o'clock, in Mode 7 from 14 to 18 o'clock, in Mode 4 from 18 to 24 o'clock, and in Mode 1 from 0 to 6 o'clock of the next day.

Finally, the evaluation values in the case of realization of the communication demand scenarios are calculated for the two candidates Mode 1 and Mode 4 of the operation mode of the time period of 6 to 10 o'clock in the same procedure as the evaluation of the initial operation plan of the storage battery. The calculation equation of the evaluation value used in the evaluation is the same as Equation (38). For example, the evaluation value of the candidate Mode 1 is 204 when the communication demand scenario "1" is realized.

A difference between this calculated evaluation value and the evaluation value from the optimum operation plan corresponds to the regret value. For example, when the communication demand scenario "1" is realized for the candidate Mode 1, the regret value is 204−160=44. If the operation mode of the time period of 6 to 10 o'clock of the optimum operation plan for each scenario matches the operation mode to be evaluated in this example, the regret value is zero and therefore, simulation can be omitted.

FIG. 63 is an explanatory view of an evaluation result. For example, by selecting the operation plan (operation mode of 6 to 10 o'clock) having the best one of the worst evaluation values for the communication demand scenarios based on this evaluation result, it is secured that, regardless of which communication demand scenario is realized, operation can be performed with energy close to the minimum energy achieved if it is known that the change occurs in advance, given that the operation plan is corrected at 10 o'clock.

The operation modes of 6 to 10 o'clock depicted in FIG. 63 correspond to the actions B1 to Bm in the first to third embodiments. The communication supply-demand scenarios 1 to M×N correspond to the states A1 to An in the first to third embodiments. Therefore, for example, if a request for the evaluation value V11 of the state A1 for the action B1 is transmitted from the calculator 402 to the calculator 401, the evaluation value V11=204 [kWh] of the communication supply-demand scenario "1" of the operation mode "1" is transmitted from the calculator 401 to the calculator 402. As described above, various action plans are applicable in the first to third embodiments.

According to an aspect of the present embodiment, minimax can efficiently be found.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A calculating device comprising:
a memory apparatus that stores a search space specified with a state set and an action set, and a presumed minimax having an arbitrary value; and
a processor configured to:
sequentially select an action from the action set in the search space stored in the memory apparatus, and sequentially select each state in the state set corresponding to the selected action;
acquire and store into the search space, an evaluation value of the combination of the selected state and the selected action;
identify a maximum evaluation value among the evaluation values acquired for each of the selected actions;
select an unselected state for the selected action when an evaluation value of the combination of the selected action and the selected state is at most the presumed minimax, or terminate selection of an unselected state for the selected action, and select an unselected action when an evaluation value of the selected action and the selected state is greater than the presumed minimax;
determine as a minimax candidate, a lowest evaluation value among the maximum evaluation values identified for an action for which selection has not been terminated;
judge whether termination of selection has occurred for all the actions when no action to be selected is present;
determine as a minimax, the minimax candidate determined for an action for which selection has not been terminated when any action for which state selection has not been terminated is present, or else enlarge the presumed minimax and retry the calculation; and
output the action for which the minimax has been determined.

2. The calculating device according to claim 1, wherein the processor is configured to:
upon judging that the termination of selection occurs for all the actions, calculate the lowest value among the evaluation values each of which had been acquired just before the termination of state selection for the corresponding action occurred, and record that value as the presumed minimax lower limit that indicates a lower limit of the presumed minimax;

add a predetermined increase amount to the presumed minimax when the termination of state selection occurs for all the actions;

determine whether the set presumed minimax lower limit is greater than the presumed minimax after the addition of the predetermined increase amount; and update the presumed minimax from the presumed minimax after the addition of the predetermined increase amount to the presumed minimax lower limit upon determining that the presumed minimax lower limit is greater than the presumed minimax after the addition of the predetermined increase amount.

3. The calculating device according to claim 2, wherein the processor, upon performing an update from the presumed minimax after the addition of the predetermined increase amount to the presumed minimax lower limit, sequentially selects an action from the action set and sequentially selects each state in a state set corresponding to the selected action, the processor acquires an evaluation value among evaluation values of states sequentially selected for an action reselected by the processor, the processor, upon acquiring an evaluation value group of the state set for each action sequentially selected by the selecting unit, identifies for each sequentially selected action, a maximum evaluation value from the evaluation value group, the processor, upon judging that an evaluation value of the selected action and the selected state is at most the presumed minimax, selects an unselected state for the selected action, and upon judging that an evaluation value of the selected action and the selected state is greater than the updated presumed minimax, the processor terminates selection of an unselected state for the selected action and selects an unselected action.

4. The calculating device according to claim 2, wherein the processor updates the presumed minimax to the presumed minimax after the addition of the predetermined increase amount, when the presumed minimax lower limit is lower than the presumed minimax after the addition of the predetermined increase amount.

5. A calculating system comprising:

a master calculating device having a first memory apparatus that has a memory area of a maximum evaluation value candidate and a maximum evaluation value for each action in a given action set; and a slave calculating device having a second memory apparatus that stores a search space specified with an action set and a state set, wherein the slave calculating device includes a processor configured to:

receive from the master calculating device a start position specifying an action and a state among the actions and the states in the search space stored in the second memory apparatus and a presumed minimax having an arbitrary value, select actions sequentially from an action specified by the received start position and select states sequentially from a state specified by the start position for the selected action, acquire an evaluation value of the combination of the selected state and the selected action, identify a maximum evaluation value among the evaluation values acquired for the selected actions when the evaluation values concerning all the states in the state set are acquired, select an unselected state for a currently selected action when an evaluation value of the currently selected action and state is at most the presumed minimax, or terminate selection of an unselected state for the currently selected action, and select an unselected action when an evaluation value of the currently selected action and state is greater than the presumed minimax, identify, as a maximum evaluation value candidate for the currently selected action, a maximum values among those evaluation values acquired for the selected action when state selection of the selected action is terminated, and transmit to the master calculating device, a maximum evaluation value or the maximum evaluation value candidate identified for the currently selected action, and further transmit to the master calculating device, evaluation completion notification when at least any one among a maximum evaluation value of an action and the maximum evaluation value candidates of the actions are acquired, the master calculating device includes a processor configured to:

set a start position in the search space, specified by an action and a state, and a presumed minimax having an arbitrary value that differs for each slave calculating device, and to further set a presumed minimax lower limit that is a lower limit of a presumed minimax using by the slave calculating devices and a presumed minimax upper limit that is an upper limit of the presumed minimax, deliver to each of the slave calculating devices, the respective start position and the respective presumed minimax set for the slave calculating device, write into a memory area of a corresponding action in the first memory apparatus, any one among a maximum evaluation value and a maximum evaluation value candidate transmitted from each of the slave calculating devices, detect evaluation completion notification from any one of the slave calculating devices, update upon detecting evaluation completion notification, the presumed minimax lower limit to the smallest value among the maximum evaluation value candidates stored in the first memory apparatus and update the presumed minimax upper limit to the smallest value among the maximum evaluation values stored in the first memory apparatus, determine whether the updated presumed minimax lower limit is greater than the updated presumed minimax upper limit, determine the updated presumed minimax upper limit as a minimax, upon determining that the presumed minimax lower limit is larger, and output the action having the determined minimax.

6. A non-transitory, computer-readable recording medium storing a search program that causes a calculating device having a first memory apparatus that has a memory area of a maximum evaluation value candidate and a maximum evaluation value for each action in a given action set, to execute a process comprising:

setting a start position in the search space, specified by an action and a state, and a presumed minimax having an arbitrary value that differs for each slave calculating device, and further setting a presumed minimax lower limit that is a lower limit of a presumed minimax of the slave calculating devices and a presumed minimax upper limit that is an upper limit of the presumed minimax, delivering to each of the slave calculating devices, the respective start position and the respective presumed minimax set for the slave calculating device, writing into a memory area of a corresponding action in the first memory apparatus, any one among a maximum evaluation value and a maximum evaluation value candidate transmitted from each of the slave calculating devices, detecting evaluation completion notification from any one of the slave calculating devices, updating upon detecting evaluation completion notification, the presumed minimax lower limit to the smallest value among the maximum evaluation value candidates stored in the memory apparatus and updating the presumed minimax upper limit to the smallest value among the maximum evaluation values stored in the first memory apparatus, determining whether the updated presumed minimax lower limit is greater than the updated presumed minimax upper limit, determining the updated presumed minimax upper limit as a minimax, upon determining that the presumed minimax lower limit is larger, and outputting the action having the determined minimax.

* * * * *